(12) United States Patent
Davis, II

(10) Patent No.: US 10,073,426 B1
(45) Date of Patent: Sep. 11, 2018

(54) SYSTEM, APPARATUS AND METHOD FOR ENERGY MANAGEMENT, FOR USAGE BY CONSUMERS OF ENERGY FROM ELECTRIC UTILITY SERVICE PROVIDERS, AND MONITORING AND MANAGEMENT OF SAME

(71) Applicant: ENERGYBILL.COM, LLC, Lockhart, TX (US)

(72) Inventor: Michael Andrew Davis, II, Lockhart, TX (US)

(73) Assignee: ENERGYBILL.COM, LLC, Lockhart, TX (US)

(\*) Notice: Subject to any disclaimer, the term of this patent is extended or adjusted under 35 U.S.C. 154(b) by 133 days.

(21) Appl. No.: 14/880,268

(22) Filed: Oct. 11, 2015

Related U.S. Application Data

(60) Provisional application No. 62/036,019, filed on Aug. 11, 2014.

(51) Int. Cl.
*G05D 3/12* (2006.01)
*G05B 19/042* (2006.01)
*H04L 12/28* (2006.01)
*G06Q 30/04* (2012.01)
*G06N 5/02* (2006.01)

(52) U.S. Cl.
CPC .......... *G05B 19/042* (2013.01); *G06N 5/022* (2013.01); *G06Q 30/04* (2013.01); *H04L 12/2825* (2013.01); *G05B 2219/2639* (2013.01)

(58) Field of Classification Search
CPC .................................................. G05B 19/042
USPC ...................................................... 700/295
See application file for complete search history.

(56) References Cited

U.S. PATENT DOCUMENTS

| 8,457,802 B1* | 6/2013 | Steven ............ G06Q 10/00 700/291 |
| 8,649,987 B2* | 2/2014 | Steenberg ........ G05B 23/0235 702/61 |
| 2017/0083987 A1* | 3/2017 | Colby ............ G06Q 50/06 |

\* cited by examiner

*Primary Examiner* — Evral E Bodden
(74) *Attorney, Agent, or Firm* — Hunt Pennington Kumar & Dula, PLLC; Jeffrey D. Hunt

(57) ABSTRACT

Embodiments provide systems, apparatus and methods for energy management.

11 Claims, 58 Drawing Sheets

Daily temperature follows a similar sinusoidal pattern between day and night.

Dependent Load Representation

By isolating the weather dependent loads from the structure we can learn a lot about it and what's happening inside it. The cooling load Q can be represented by:

$$Q = IHG + \sum UA(T_O - T_I) + \sum Inf + \sum SHG + \sum V + \sum D$$

- IHG = Internal Heat Gain = Heat-contributing sources within a structure, such as lights, people, and equipment.

- SHG = Solar Heat Gain = Heat gained from the sun.

- U = Transmission factor for heat transfer = 1/R, R = Insulation value = resistivity to heat transfer

- A = Area of external surfaces = walls, windows, doors, roof/ceiling, floor, etc.

- Inf = Infiltration = air blowing through a structure as a result of external forces such as wind against external surfaces. This is related to size of cracks, such as under a door,

Balance Point (BP) Determination

From the dependent load we are able to determine the balance point for the structure.

$$Q = IHG + \sum UA(T_O - T_I) + \sum Inf + \sum SHG + \cancel{\sum V}^{0} + \cancel{\sum D}^{0}$$

1. We can assume balance point will happen when solar heat gain is a minimum, so we assume this is zero.

2. $V = 0$ since the vast majority of residential structures are not tight enough to require mechanical ventilation.

3. Infiltration sensible load is $1.08 cfm*(T_O-T_I)$, cfm is infiltration flow in cubic feet per minute, ft3/min.

$$0 = IHG + \sum UA(T_O - T_I) + 1.08 cfm(T_O - T_I)$$

At the balance point, $Q=0$, which is defined as the outdoor temperature where the internal heat gains balance the skin losses. Collecting terms:

$$\Rightarrow 0 = IHG + (T_O - T_I)\left(\sum UA + 1.08 cfm\right)$$

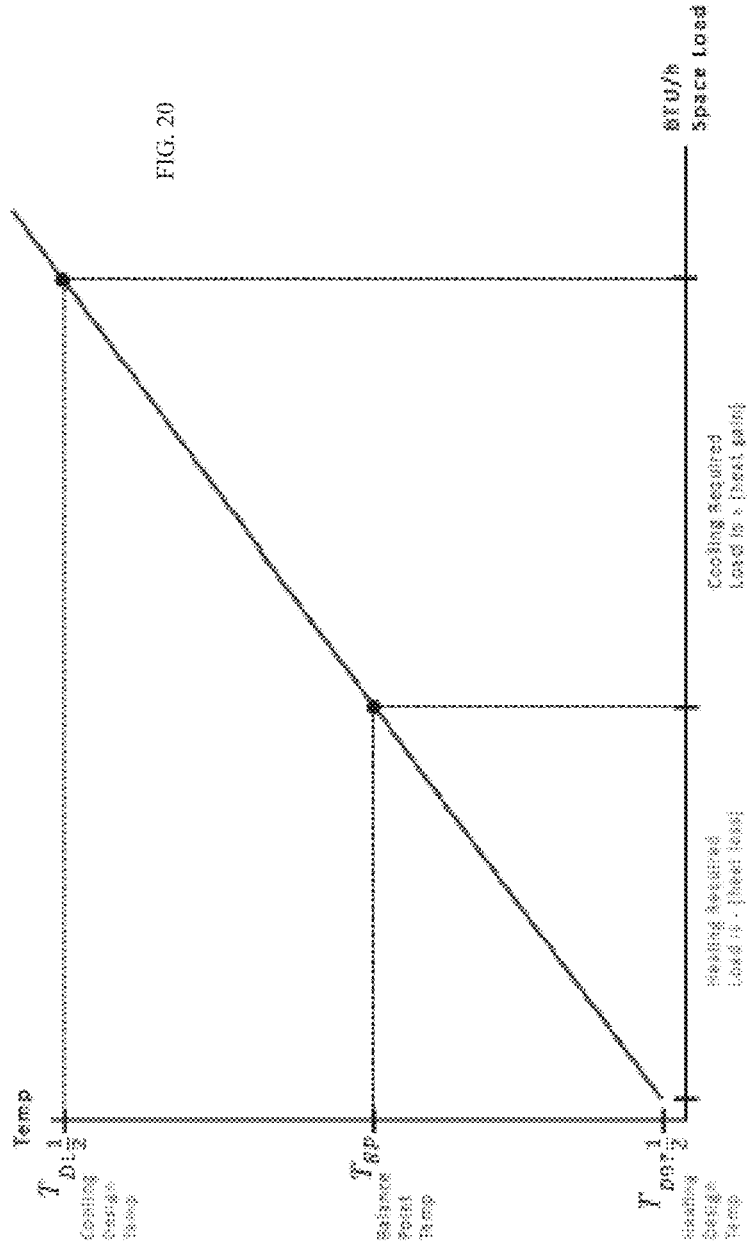

FIG. 20

With the Balance Point Depression, BPD, we are able to accurately model the system. The operation of the heating and cooling equipment is a fraction of the outdoor temperature and the balance point temperature. When Toutdoor > Tbp, the cooling equipment operates. When Toutdoor < Tbp, the heating equipment operates.
The frequency of operation depends on how far(above or below the Tbp happens to be, which is weather dependent. The load is as follows, linearity can be assumed.

$$\text{slope} = \frac{\text{load}}{\Delta T} = \frac{\text{peak cooling load}}{T_{Design\ Cooling} - T_{Balance\ Point}} = \frac{Q_{Cooling\ Load}}{(T_{D1\frac{1}{2}} - T_{BP})}$$

For example: If peak cooling load is calculated to be 22,650 BTU/hr and the TD11/2 = 103F with a TBP = 60F, slope = 22,650/(103-60) = 526.7BTU/F When the outdoor temp is 79F the hourly space load is Q = (526.7)(79-60) = 10,008 BTU/hr. From this we can determine how long the machine is meant to run. Runtime can then be estimated as a load factor. A 2-ton AC for example is 24,000 BTU/hr. For 10,008 BTUh, the load factor would be 10,008/24,000 = 41.7%. This is the percent time that the machine would operate.

FIG. 21

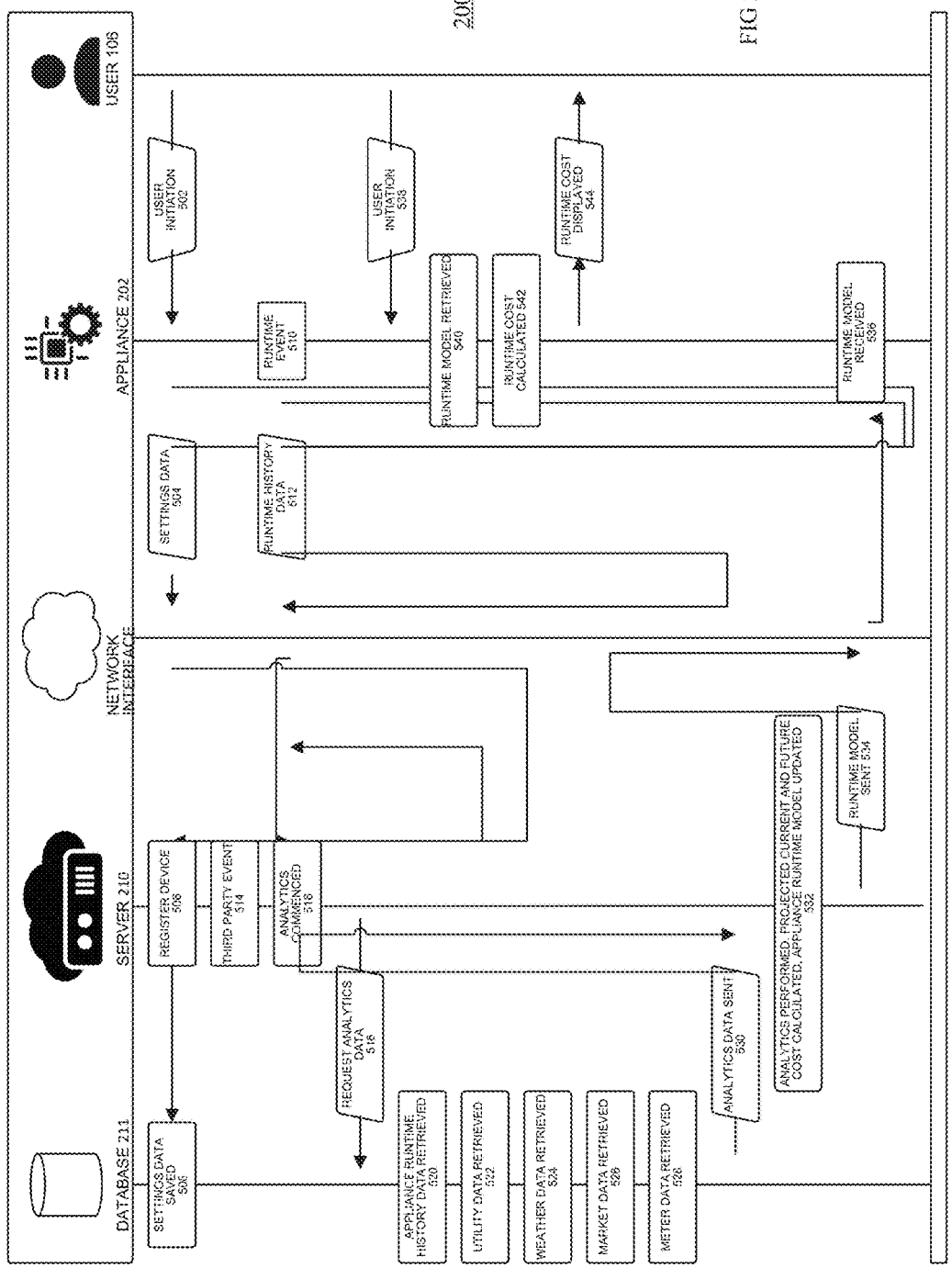

Thermostat

Operational cost is displayed and changes according to device setpoints. In this case the cost is presented in terms of a period of time, or more specifically the sum of all operation cycles over some period of time.

For certain types of appliances a single operation cycle may not have a sufficiently large enough cost to be meaningful to the user, in which case larger periods of time grouping multiple independent operation cycles would be used to put the cost in context.

The cost could be displayed in multiple units as well, for example:

$1.85/today
$15.45/this week $2.57/today
$245/this month

The cost projection for a given period may vary depending on other influencing conditions like a weather forecast and a billing rate forecast.

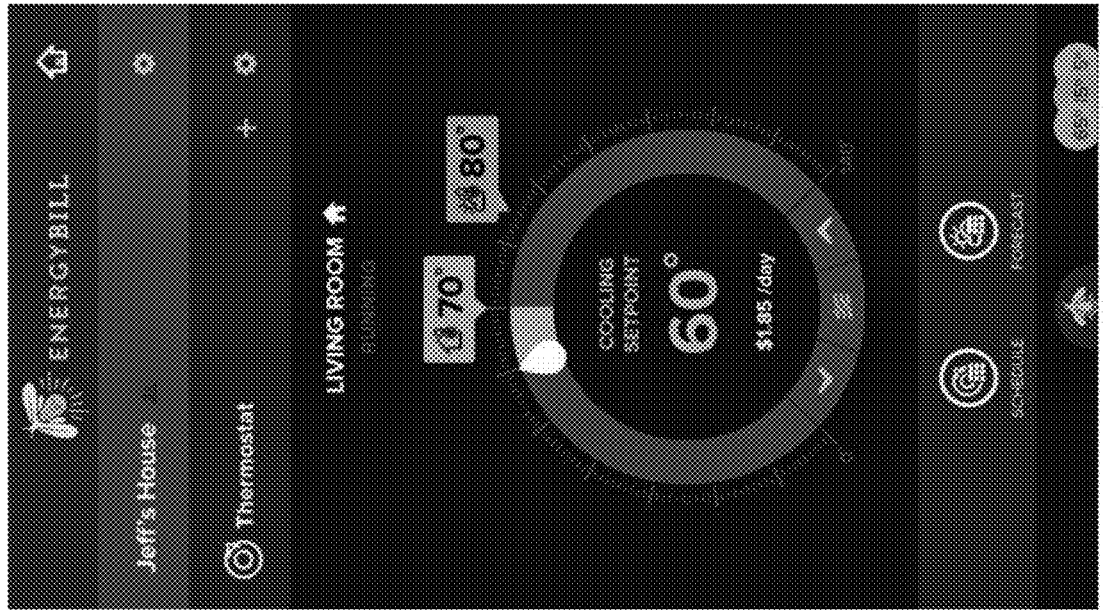

FIG 28

Dishwasher

Mockup shows the control panel on top of a dishwasher door with some example controls for illustration which would vary. Operational cost is displayed and changes according to device setpoints, such as the type of wash cycle, heated drying, etc. In this case the cost is presented in terms of a single operation cycle as well as a longer period involving multiple operation cycles based on the user's behavior patterns, i.e. how frequently they wash dishes, and during what times, etc. Behind the scenes the cost may also take into account additional factors, like the cost of hot water fed into the dishwasher.

The "Start ECO" button triggers the appliance to start but in "managed" mode. In a managed mode the appliance has been triggered to start, but rather than washing the dishes immediately it turns control over to ENERGYBILL and allows it to decide when to start the dishwasher so as to maximize both energy and money savings. EnergyBill may choose to wait for other appliances to finish operation cycles before starting the dishwasher, like waiting for the water heater to reach an optimal state point. Or maybe waiting for the temperature outside to reach a point where it will reduce the cost of the water heater having replacing the hot water used by the dishwasher. The user may also have access to special billing rates that offer savings for using energy during specific hours of the day.

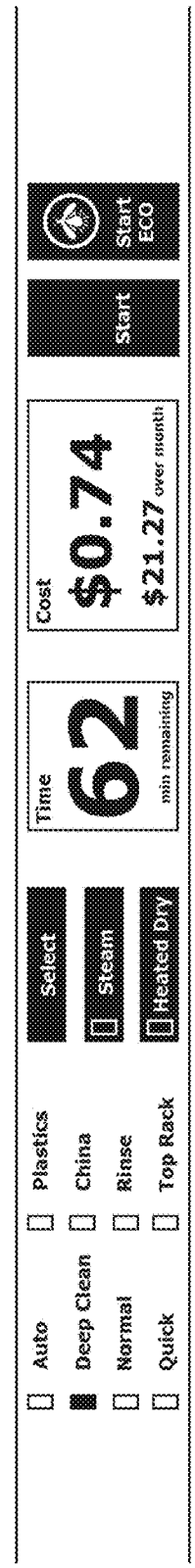

FIG 29

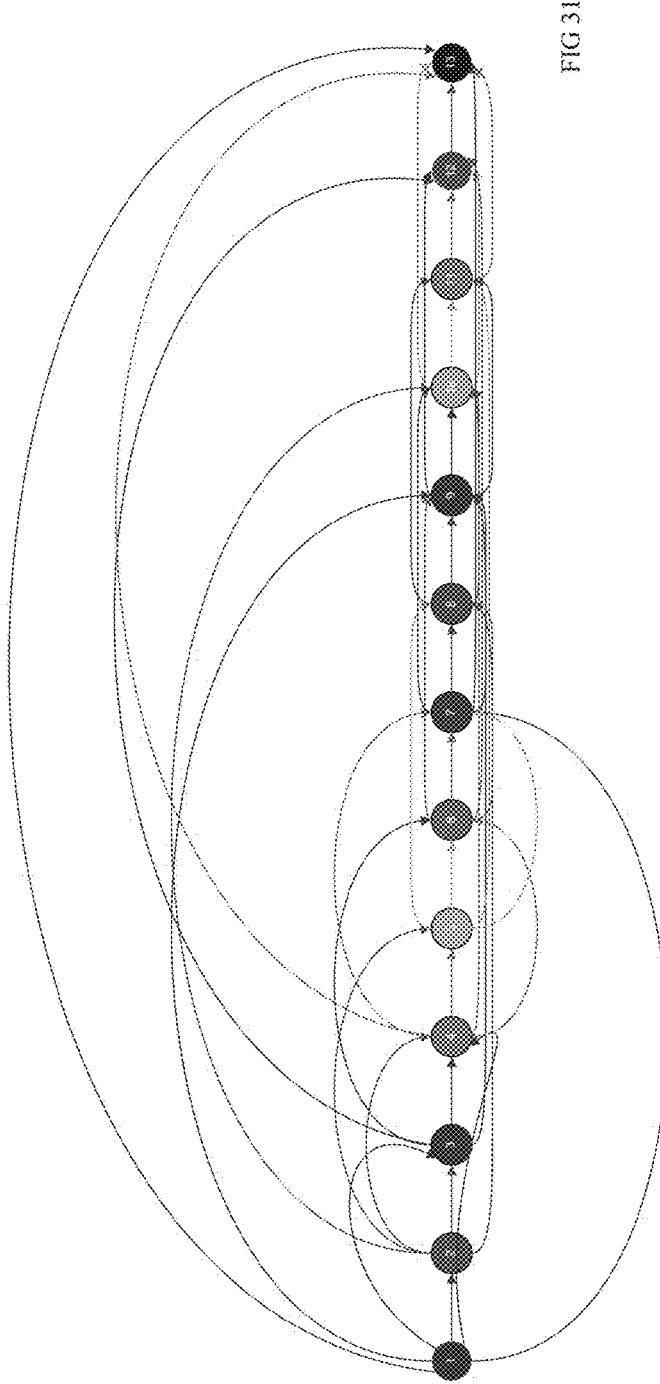

FIG 31

Shows arc lengths of 1, 2, 3, 6, 9, 12 for a network of 13 nodes, having 1059 possible paths from 1 to 13. Number of paths grows exponentially with number of nodes and arcs. In practice a real-world decision space can be very large, with millions, billions, or more, potential paths.

Presented as example of a graph representation of a time series of bounded decisions, where nodes are points in time and arcs are time bounded decisions. For contract selection nodes would represent months in the year and arcs would represent a probabilistic projection of deregulated energy contracts of some term length. For other control problems, like thermostat, nodes would represent some other time interval (ex seconds, minutes in a day) and arcs would represent some time fixed operational state for the appliance.

SYSTEM, APPARATUS AND METHOD FOR ENERGY MANAGEMENT, FOR USAGE BY CONSUMERS OF ENERGY FROM ELECTRIC UTILITY SERVICE PROVIDERS, AND MONITORING AND MANAGEMENT OF SAME

CROSS-REFERENCE TO RELATED APPLICATIONS

This application claims priority under 35 U.S.C. § 119 to U.S. Provisional Patent Appl. Ser. No. 62/036,019 entitled "METHODS AND SYSTEMS FOR CONSUMER-CENTRIC ENERGY MANAGEMENT" filed in the name of Davis II et al. on Aug. 11, 2014, the entirety of which is incorporated herein by reference.

FIELD OF THE INVENTION

This disclosure generally relates to systems, apparatus and methods for energy management. Disclosed subject matter relates to systems, apparatus and methods for usage by consumers of energy from electric and other utility service providers. Disclosed subject matter relates to systems, apparatus and methods for monitoring and management of usage by consumers of energy from electric utility service providers.

BACKGROUND OF THE INVENTION

The energy industry is seeing increasing deployment of smart devices and is being impacted by the Internet of Things (IoT), increased energy efficiency, Distributed Energy Resources (DER), and deregulation of the energy markets and electric utility service providers. A number of states have either already deregulated or are on the path to deregulating energy markets. There is need for improved systems, apparatus and methods for energy management.

BRIEF SUMMARY OF THE INVENTION

Disclosed subject matter provides improved systems, apparatus and methods for energy management. Disclosed subject matter provides improved systems, apparatus and methods for usage by consumers of energy from electric utility service providers. Disclosed subject matter provides improved systems, apparatus and methods for monitoring and management of usage by consumers of energy from electric utility service providers.

Disclosed subject matter improves consumer usage of energy, such as energy from electric utility service providers. Disclosed subject matter improves a consumer's monitoring and management of energy usage, such as energy usage from electric utility service providers. Disclosed subject matter may improve consumer usage of energy, such as energy from electric utility service providers in deregulated, regulated, and transitioning energy markets. Disclosed subject matter may improve a consumer's monitoring and management of energy usage, such as energy usage from electric utility service providers in deregulated, regulated, and transitioning energy markets. Disclosed subject matter may simplify the selecting, managing and consuming or usage of energy by consumers from electric utility service providers by providing independent, simplified, favorable and unbiased processes for monitoring and management of bills for usage or consumption of energy by consumers from electric utility service providers. Disclosed subject matter may, for example, bridge gaps between Local Energy Providers (LEP) and consumers in deregulated markets. Embodiments of disclosed subject matter may provide an improved single source for obtaining unbiased information regarding utility usage and service providers, including automated management of contracting with utility service providers, billing from utility service providers, and monitoring and management of energy usage.

Disclosed subject matter provides improved systems, apparatus and methods for usage, monitoring and management of electric energy supplied to consumers from electric utility service providers in deregulated, partially deregulated and regulated electric energy markets. As used herein, "consumer" means and includes a customer, account, energy consuming entity, or consumer of electric energy from an electric utility service provider. As used herein, "electric utility service provider" means and includes any provider or third party that provides, sells, supplies, markets, sets prices, or contracts for the providing of electric energy or electric utility service. Embodiments may provide improved systems, apparatus and methods for consumers having access to smart meter or related technology infrastructure. Embodiments may provide improved systems, apparatus and methods for electric utility service providers to monitor and manage energy usage by consumers, relationships with consumers, accounts of consumers, and may provide for management to reduce energy usage, such as peak energy usage, by each consumer, or cumulatively across a population of consumers. Embodiments may provide improved systems, apparatus and methods for consolidated management and monitoring of usage for all utility services, including, e.g. electric utility service, gas utility service, and water utility service. Embodiments may provide improved systems, apparatus and methods for usage, monitoring and management that is simplified and may include budgeting services. Embodiments may provide improved systems, apparatus and methods for usage, monitoring and management of contracts with utility service providers, and that may enable improved aggregation across communities and populations of consumers, improved rates, improved rates by aggregation, and improved rate plan optimization. Embodiments may provide improved systems, apparatus and methods for usage, monitoring and management of Distributed Energy Resources (DER). Embodiments may provide improved systems, apparatus and methods for usage, monitoring and management of aggregate smart meter data. Embodiments may make available to consumers aggregate smart meter data, and the same may be provided in a format to facilitate consumption planning or real-time decisions to maximize benefit to the consumer.

Embodiments may provide improved systems, apparatus and methods including easily installed consumer electronic devices that may utilize, have capability and provide advanced smart, real-time, or near real-time, power monitoring and control, and which may provide consumers with smart, load-based consumption information and advice, and that may provide for developing advanced usage profiles for such consumers.

Embodiments may provide improved systems, apparatus and methods including creating energy usage models of facilities, such as homes, and further may provide for usage of smart devices/appliances or IoT, trend analysis and self-performed energy audits with respect to such models.

Embodiments may provide improved systems, apparatus and methods for provide energy savings information and education to consumers. Embodiments may provide improved systems, apparatus and methods connecting consumers with 3rd party electric utility service providers.

Embodiments may provide improved systems, apparatus and methods including a central hub for controlling third-party Home Area Network (HAN) devices.

Embodiments may provide improved systems, apparatus and methods for establishing industry standards for HAN and home automation.

In embodiments, a system may include a smart appliance for use by a user within a household. A suitable smart appliance may include a mechanical component for transforming the state of an object from a first state to a second state by expending a resource; an actuator for initiating operation of the mechanical component; a display for displaying information to the user; and a wireless communication module for accomplishing bi-directional data communication over a data communication network with at least one of a utility smart meter, a utility provider server and an energy management cloud-based server.

In embodiments, a system may include a smart appliance as described in the preceding paragraph, and that further includes a logic component including a stored series of instructions enabling the smart appliance to receive an input of the actuator from the user, and responsive to the input, may retrieve historical runtime data of the appliance and a current utility rate for the resource used by the smart appliance. The logic component may further determine a projected monetary cost for resources to be used by the smart appliance during a current runtime period based on the historical runtime data of the appliance and the current utility rate for the resource. Such an appliance may then present projected monetary cost for the current runtime to the user on the display.

In various embodiments, the logic component may further enable the smart appliance to determine a projected monetary cost for resources to be used by the smart appliance during a future runtime based on the historical runtime data of the appliance and a future utility rate for the resource and present the projected monetary cost for the future runtime to the user on the display.

In various embodiments, the user may select a current or future runtime based on the display of the projected monetary cost for the current runtime and the projected monetary cost for the future runtime.

In various embodiments, the projected monetary cost during the current runtime and/or the projected monetary cost during the future runtime may be further based on, or may reference, at least one of: a current weather condition, a future weather condition, a resource budget of the user, a projected occupancy status of the household, and a schedule of other appliances within the household that will be run.

In various embodiments, the historical data may be retrieved by the wireless communication module from at least one of the smart meter, the utility server and the energy management server.

In various embodiments, the current utility rate may be retrieved by the wireless communication module from at least one of the smart meter, the utility server and the energy management server.

In various embodiments, the historical runtime data may be determined based on a load disaggregation algorithm applied to the resource usage by the smart appliance and other appliances within the household.

In various embodiments, the logic component may comprise at least one of an application-specific integrated circuit (ASIC), an electronically erasable and programmable read only memory (EEPROM), or a processor in conjunction with a memory for storing processing instructions to be executed by the processor.

In various embodiments, the display may comprise at least one of a light-emitting device (LED) and an electronic ink display device.

In various embodiments, the smart appliance may comprise a refrigerator, a dishwasher, a clothes washer, a clothes dryer, a water heater, heating/ventilation/air-conditioning equipment, a thermostats, an oven, a microwave oven, and/or lawn watering equipment. In various embodiments, the resource used by the appliance may be electricity, water, natural gas, heating oil, or any other measurable resource that may be used and metered by a utility for service to a user operating an appliance.

BRIEF DESCRIPTION OF THE DRAWINGS

The novel features believed characteristic of the disclosed subject matter will be set forth in any claims that are set forth hereinbelow or filed later. The disclosed subject matter itself, however, as well as a mode of use, further objectives, and advantages thereof, will be understood by reference to the following detailed description of illustrative embodiments when read in conjunction with the accompanying drawings. Further aspects of the present disclosure will be appreciated upon review of the detailed description of various embodiments, provided hereinbelow, when taken in conjunction with the following Figures, of which:

FIG. 18 is an illustration of model calculations that may be performed by a resource management server as shown generally in FIG. 1 in an exemplary embodiment.

FIG. 19 is an illustration of model calculations that may be performed by a resource management server as shown generally in FIG. 1 in an exemplary embodiment.

FIG. 20 is an illustration of model calculations that may be performed by a resource management server as shown generally in FIG. 1 in an exemplary embodiment.

FIG. 21 is an illustration of model calculations that may be performed by a resource management server as shown generally in FIG. 1 in an exemplary embodiment.

FIG. 27 is a simplified datagraph illustration of network communications between a smart appliance 202 and resource management server 210 shown generally in FIG. 23.

FIG. 28 illustrates an exemplary thermostat employing the present disclosure.

FIG. 29 illustrates an exemplary dishwasher employing the present disclosure.

FIG. 30 illustrates a further exemplary thermostat employing the present disclosure.

FIG. 31 provides a visualization of a time-bounded decision space as employed by embodiments of the present disclosure.

DETAILED DESCRIPTION OF ILLUSTRATIVE EMBODIMENTS

Reference now should be made to the drawings, in which the same reference numbers are used throughout the different figures to designate the same components.

Figure 1:
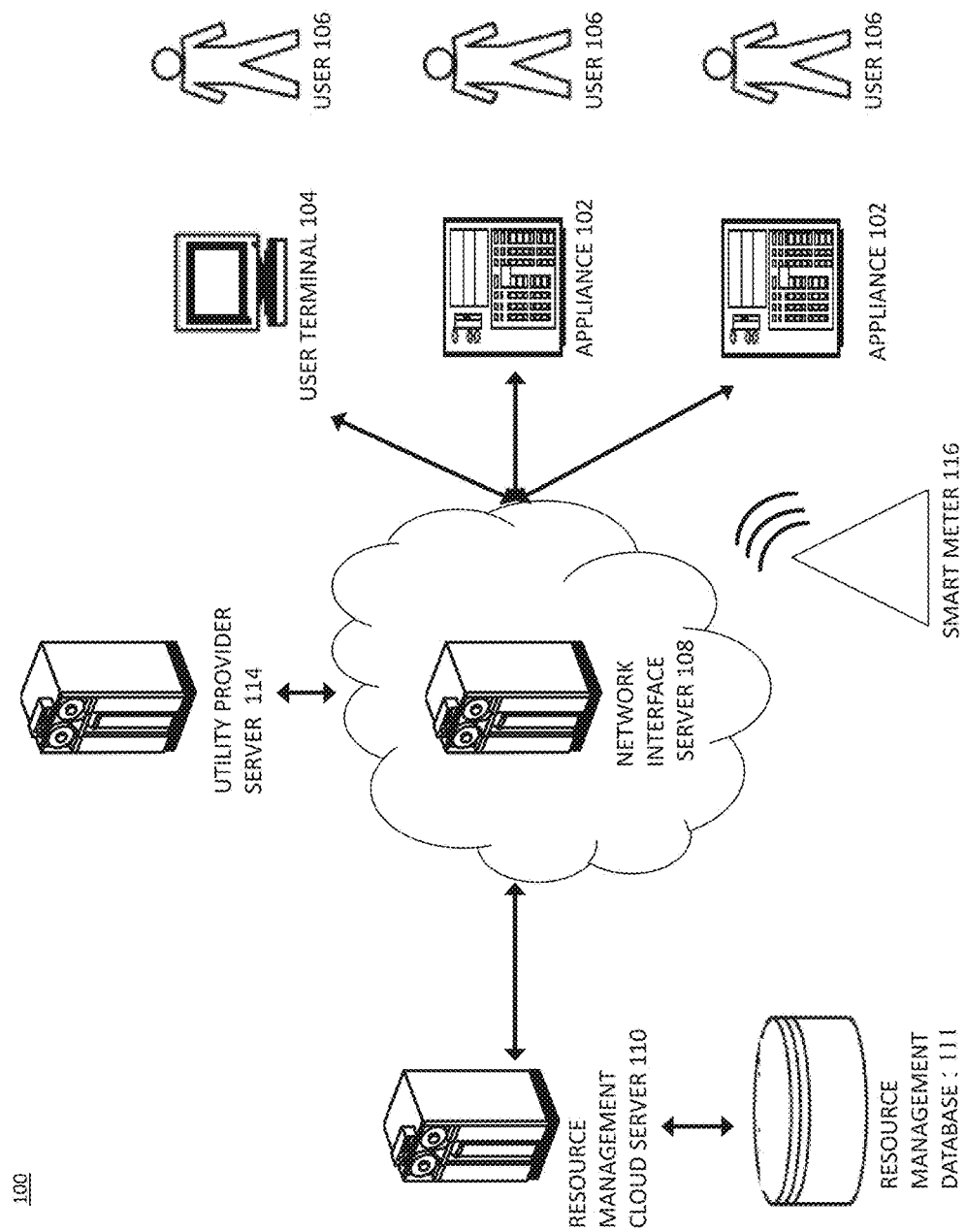
FIG. 1 is a schematic representation of a resource management system 100 including a smart appliance and network environment in an exemplary embodiment of the disclosed subject matter.

FIG. 1, illustrates an exemplary data communication network environment 100 in which the smart appliance 102 of the present disclosure operates. The resource management cloud-based servers 110 are the hub of the network environment 100, which enables user 106, smart appliances 102, user terminals 104, resource management servers 110, smart meters 116, network interface servers 108 and utility provider servers 114 to interact as described herein over a data communication network, such as the Internet. The resource management server(s) 110 may be one or a group of distributed or centralized network computer servers. Such servers, like any common personal computer, include well-known processors, electronic memory, network communication hardware, user interfaces, input/output devices, operating system software, and application software suitable for accomplishing the functions described herein. A suitable computer server may be one or more enterprise network servers of the type commonly manufactured by CISCO, DELL and IBM. The resource management server(s) 110 may be configured to perform the functionalities described herein through suitable programming in C++, PHP, JAVASCRIPT or the like, and may include a resource management database 112 for storing the data described herein and database management software, for example, similar to the Structured Query Language (SQL)-type databases distributed by ORACLE. The resource management server(s) 110 may be centrally located or may be distributed among a variety of geographical locations, and may cooperate to enable to social networking functions described herein. The resource management server(s) 110 may act as a "cloud" service to a plurality of users and utility providers.

The network environment 100 includes one or more utility provider servers 114, which are operated by a provider of a resource, such as an electric company or a water company. The utility provider servers 114 may be any type of computer network server of the type described in the preceding paragraph, that are operative to enable data communications over a computer network, such as the Internet. Users will typically maintain an account with the utility provider. Such an account will be registered. In addition to user account information, such as usage and monetary amounts due for resource usage, the utility provider may also provide utility pricing rates for historical, present and future times. Such data is obtained and used by the system 100 as described herein.

User Terminals 104 may be one or more separate consumer computing devices that are operative to communicate data bi-directionally with the network server(s) 110 over a computer network, such as the Internet. The user terminals 104 may be owned and operated by separate and distinct users. Users may be assigned a login to access the resource management server(s) 110. When interacting with the resource management server(s) 110 over the Internet, a display of the user terminal 104 may be changed and updated to enable the customer to directly interact with the network server(s) 110 in the manners described herein.

User terminals 104 may be any suitable computing or communication device used to accomplish the processes described herein. They may be, for example, a personal computer, laptop computer, notebook computer, mobile telephone, smartphone, tablet, personal digital assistant or like device of the type commonly manufactured by IBM CORP, DELL CORP. and APPLE CORP., and having suitable operating system software (i.e., WINDOWS XP, WINDOWS 8, WINDOWS 10, MAC OS X, SUN OS), application software, visual displays, processors, electronic memory, network communication hardware, user interfaces (such as a visible display), and other suitable input/output devices, as are well-known and suitable for accomplishing the functions described herein.

The network environment 100 includes one or more smart appliances 102, the features of which will be described herein in more detail below. The network environment 100 further includes one or more smart meters 116 which may communicate wired or wirelessly with the smart appliance 112 and/or network interface servers 108.

In certain embodiments, the network environment 100 is implemented over a publicly-accessible computer network, such as the Internet or World Wide Web, via network interface servers 108, which may be any type of server mentioned above. The disclosure is not limited to implementation in any specific network configuration, and is readily contemplated to include the use of any wireless and/or hard-wired devices operating in conjunction with satellite, microwave, fiber optic, copper, local area networks (LANs), wide-are networks (WANs), WIFI, IEEE 802.11-based protocols, WIMAX and/or other network configurations. It is readily apparent that the network environment 100 may be implemented in any type of system comprising interconnected computers configured to communicate data with each other using messages transmitted electronically or via other means, without limitation.

Data may be transmitted between the computers, devices and servers shown in FIG. 1 using any of the variety of data formats including, but not limited to, Hypertext Transfer Protocol (HTTP), file transfer protocol (FTP), or any other suitable data transmission protocols. Data transmissions may also be encrypted with any of a variety of known technologies, including secure socket layer (SSL) topologies.

Figure 2:
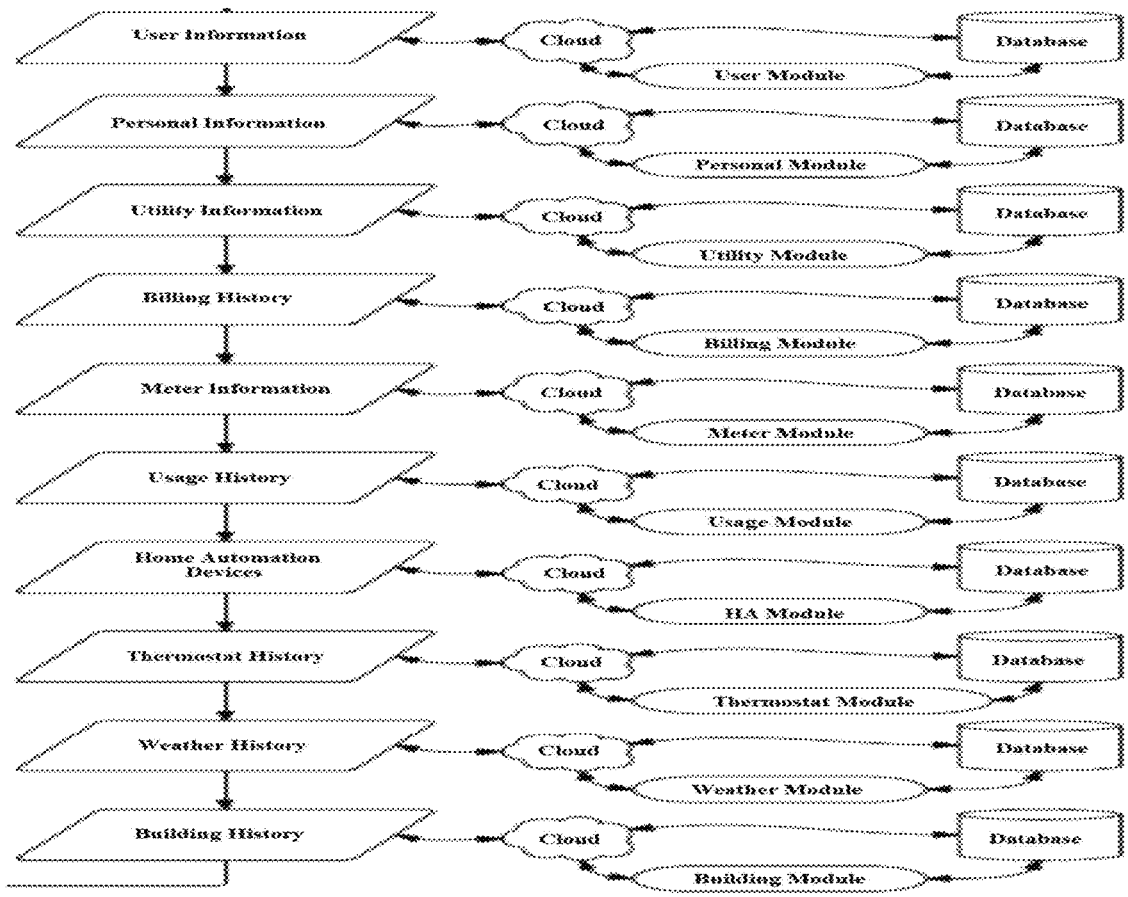
FIG. 2 is an illustration of an exemplary logic module of a resource management server 110 shown generally in FIG. 1.
Figure 3:
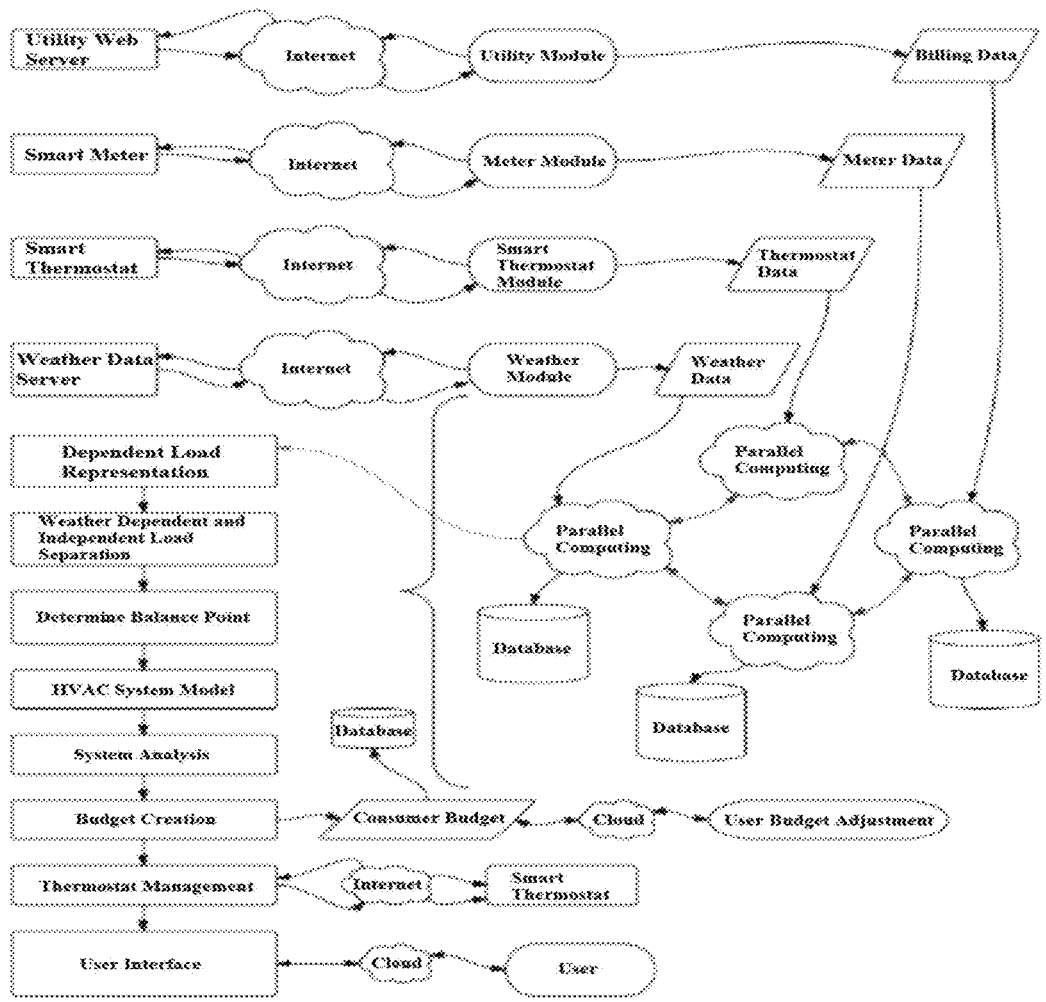
FIG. 3 is a system diagram showing interconnected components of a resource management server 110 shown generally in FIG. 1.

Turning now to FIGS. 2 and 3, an Embodiment may include a Snapshot Model, described in the following flowcharts, determines the cost of an individual energy product, which can include present-day options and future-day when combined with Present-Day and Futures Market Modules. All these possible combinations form a decision tree that can then be analyzed mathematically. What the decision tree does is permute through all the available choices and then recursively follows one choice to all potential future choices through time. For instance, consider just month-to-month contracts projected a year in advance. If, based on a user's geographic location, they had access to an average of 25 month-to-month contracts it may set n=25. Embodiments may set out depth, d, to 12. This results in 5,200,300 unique branches in the decision tree. In practice, branches may be composed of a mix of contracts with varying term lengths.

Additionally, the effect of the decision tree may vary depending on the consumer's usage profile. In terms of options the decision tree may be the same for all consumers, based solely on the market, however the value of each branch within the tree may vary from consumer to consumer. The Decision Tree may generate Outcome Profiles (OP), which may then be combined with Consumer Usage Profiles (CUP) to yield Impact Profiles (IP) which are unique to each consumer. The best impact profile wins. A particular impact profile may then be directly associated with a branch in the decision tree, which may then determine the short-term decision that should be made for the user, among the available options (Choose New Contract, Renew Existing Contract, Let Contract Expire, Shutoff Service).

In real-time, the system may constantly be reevaluating the environment, tracking the current energy market, predicting future energy market, tracking the consumers usage patterns, weather etc. and putting all this data into a system model which behaves as a kind of artificial intelligence. As the data in the model changes, it may be reconstructed, adjusting the decision tree, and regularly generating new impact profiles for each consumer. If a new impact profile has been detected which has a better value than the current one in place, a decision may be executed on behalf of the user.

The decision tree is a distributed algorithm. Due to the vast number of possible permutations the algorithm is distributed in a custom cloud that allows for distributed parallel processing. Branches within the tree are broken up and distributed. Machine learning techniques are used to identify recurring patterns and pre-filter and evaluate branches to optimize the creation of impact profiles for consumers. Similar pattern recognition is also applied to group similar users with each other.

FIG. 2 is a representation of a consumer module logic component used by the resource management server of FIG. 1. The consumer module manages consumer-related data, which includes data provided by a user as well as data collected from third party sources on behalf of the user. The consumer module receives or monitors and then stores the following data for each user or residence subscribed to the system 100: user information (name, location, contact information, payment information), utility information (name, utility type, utility rates), billing history from various utilities, meter information from smart meters or the like, usage history, registration of home automation devices, thermostat operation and history, weather data and historical weather information, and building history of the residence or the like occupied by a user. This information may be gathered and stored in various fields of the resource management database 112.

FIG. 3 is a representation of the interconnected components of the resource management system including the resource management server 110 of FIG. 1. As represented therein, an embodiment may take inputs from utility servers 114, smart meters 116, smart appliances 102 (such as a smart thermostat), and third-party information such as weather from weather servers available over the Internet. Such data may be stored in the database 112 for use by the system 100. The resource management servers 110 use this information to generate Dependent Load Representation, Weather Dependent and Independent Load Separation, Balance Point Determination, HVAC system modeling, other system modeling and analysis, user budget creation, appliance and thermostat management and presentation of information to a user on a user interface, such as a display. Such functions and computations are discussed in more detail with respect to FIGS. 18-21 below.

Figure 4:
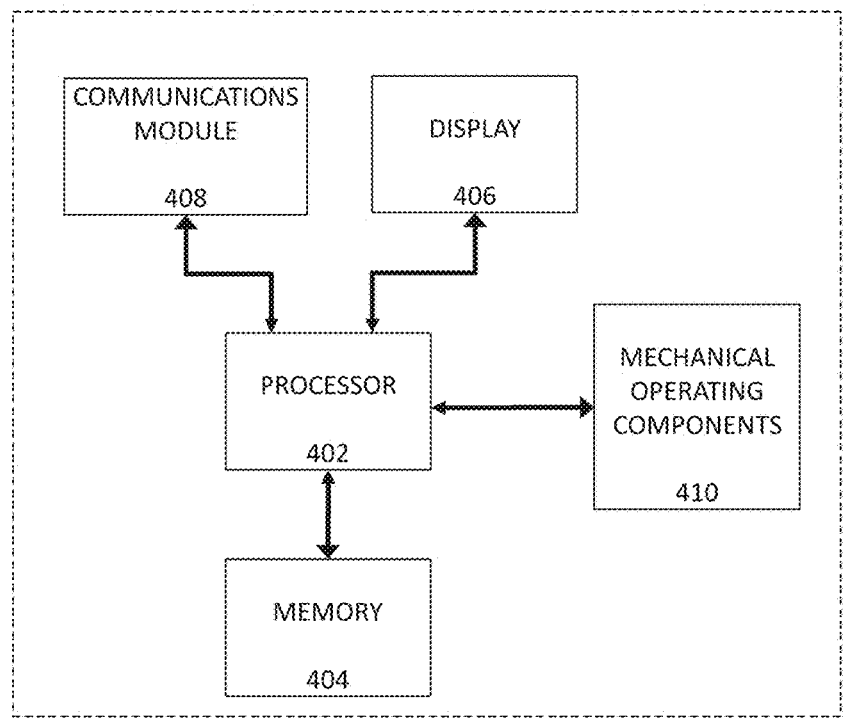
FIG. 4 is a schematic block diagram of the operating components of the smart appliance 102 shown generally in FIG. 1.

FIG. 4 is a schematic block diagram of the operating components of an exemplary smart appliance 102 of FIG. 1. In general, the smart appliance may be any consumer, household, residential or consumer appliance that utilizes a resource (such as energy or water) to change the state of an object or objects from one state to another using various mechanical operating components 410. The smart appliance 102 may accordingly include, without limitation, a refrigerator, a dishwasher, a clothes washer, a clothes dryer, a water heater, heating/ventilation/air-conditioning equipment, a thermostats, an oven, a microwave oven, and lawn watering equipment. The smart appliance 102 may be any such commonly used appliances that are further enhanced and improved with the following components to enable the functionalities described herein: a processor 402, a memory 404, a display 406, and a communication module 408.

The processor 405 may be any type of integrated circuit processor or microprocessor commonly used in computing technologies, such as: an APPLE A5 processor, an INTEL CORE 17 processor, AMD's PUMA CPU, and the like. In lieu of a processor used in conjunction with operating instructions stored in a memory, the processor 405 may instead be implemented as an Application Specific Integrated Circuit (ASIC) or other single purpose integrated circuit (IC) device.

The memory 404 may be any type of electronic memory device including, but not limited to: random access memory (RAM) IC chips, read-only memory (ROM) IC chips, dynamic random access memory (DRAM) chips, static random access memory (SRAM) chips, first-in first-out (FIFO) memory chips, erasable programmable read-only memory (EPROM), electronically erasable programmable read-only memory (EEPROM) chips, a hard disk drive (HDD), a compact disc, a digital video disc (DVD), a memory stick, a cloud storage device, and the like.

The display 406 may be any devices suitable for presenting information visually to a user. Accordingly, the display 406 may include an LCD or LED device or an electronic ink display of the kind employed by AMAZON's KINDLE device. The display may also include options for communicating with the handicapped by using sound or tactile presentations in place of visual displays of data. Other types of display devices may be used with the smart appliances 102. The size and type of display may vary with the type of smart appliance on which it is mounted.

The communications module 408 may be any type of data communication device that may be used to transmit computer-readable data between the smart appliance 102 and the other components of the network environment 100. In the case where the smart appliance 102 is hard-wired to the network environment 100, the communications module 408 may include a computer modem, such as a digital subscriber link (DSL) modem a cable modem, or other type of hard-wired network modem device. In the case where the smart appliance 102 may communicate with the network environment 100 wirelessly, the communications module 408 may include a wireless fidelity (wifi) modem, an IEEE 802.11x device, a BLUETOOOTH module, a cellular communications module and the like, without limitation. One of ordinary skill in the art will readily appreciate that the size and type of communication module w408 will depend on the size and type of smart appliance 102 in which it is embedded.

Figure 5:
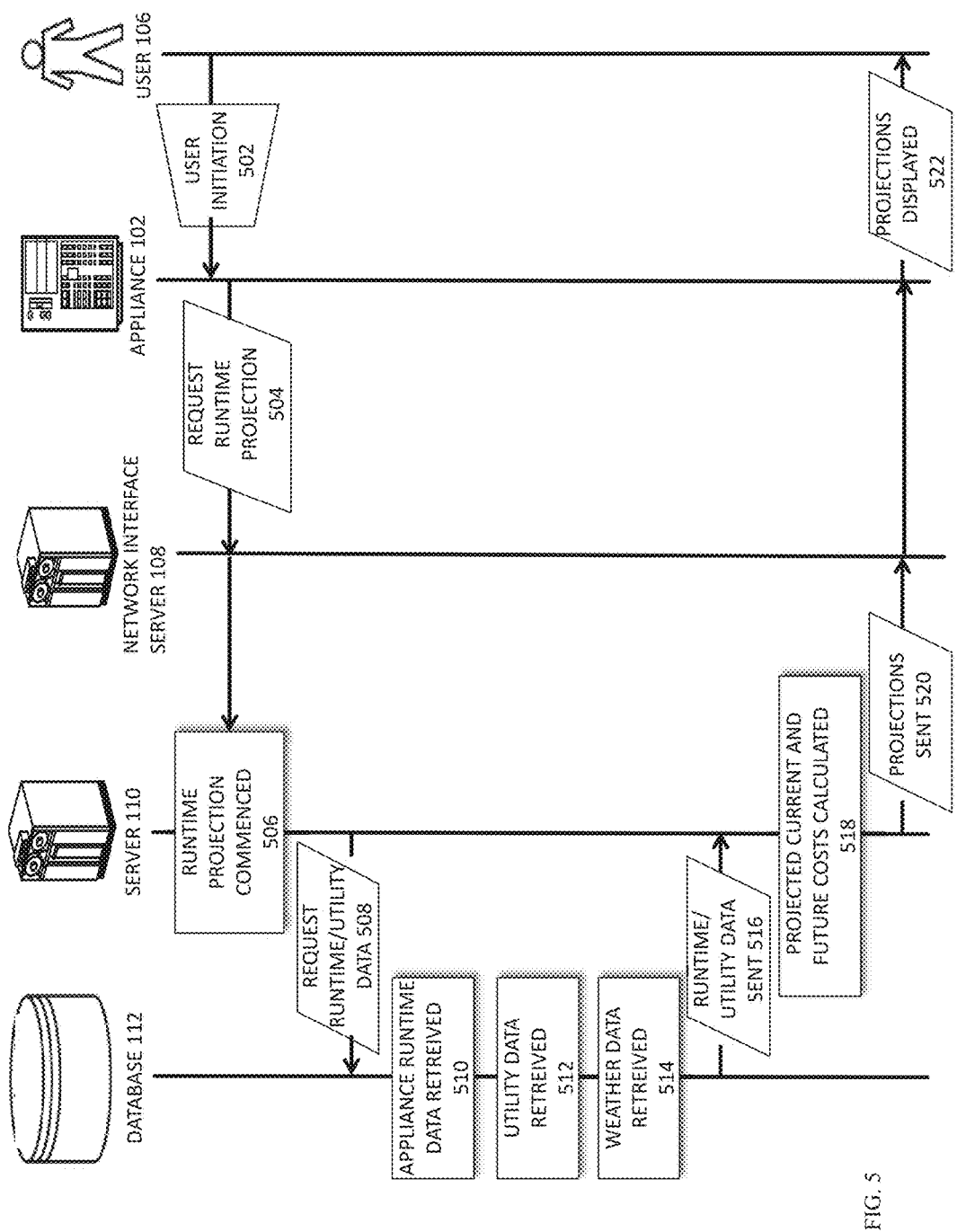
FIG. 5 is a simplified datagraph illustration of network communications between a smart appliance 102 and the resource management server 110 shown generally in FIG. 1.

Turning now to FIG. 5, an exemplary datagraph illustration of the network communications between the smart appliance 102 and the various components of the network environment 100 is shown. Commencing at step 502, a user initiates operation of a smart appliance 100. An initiating event may be a scheduled operation, or a command to change a room temperature change, and the like. An embodiment may offer a user defined schedule or automate a schedule based on a desired outcome (such as a fixed budget). Responsive thereto, the smart appliance 102 requests runtime information from the resource management server 110 (step 504). In particular, the smart appliance requests information on the amount and/or cost of a resource that it consumes during the type of run cycle that the user is requesting at a current time and based on current utility rates. For example, the user may be initiating a wash cycle of a dishwasher, that uses electricity and water to clean dishes placed therein using various mechanical components. Projected Runtime may be based on an algorithm that takes multiple historical data points (i.e. operating conditions past/present) that contributed to HISTORICAL RUNTIME and determines future runtimes.

In one embodiment, the smart appliance may provide the following example request, substantially in the form of a HTTP(S) GET message including XML-formatted data, as provided below:

```
GET/Index.html HTTP/1.1
Host: www.energybill.com.
Content-Type: Application/XML
Content-Length: 667
<?XML version="1.0" encoding="UTF-8"?>
<auth_request>
<timestamp>2020-12-31 23:59:59</timestamp>
<user_accounts_details>
<user_account_credentials>
    <user_name>Name@energybill.com</account_name>
    <password>abc123</password>
</user_account_credentials>
</user_accounts_details>
<EnergybillRunCycleProjection>
Request Run Cycle Projections
</EnergybillRunCycleProjection>
</auth_request>
```

In response to the request, the resource management servers 110 commences an analysis of the projected runtime costs for the smart appliance 102 (step 506) using data on the runtime of the appliance 102 that may be stored by one or more of the appliance 102, the resource management database 112 or the manufacturer of the appliance 102, which may be available from a server on the Internet. The projected runtime costs are also determined using current utility costs for a resource used by the smart appliance. The current and projected future utility rates may be provided by utility provider servers 114 and stored by the resource management server 110 in resource management database 112 continuously, on a periodic basis, or as needed (i.e., on demand).

Next, the resource management server requests the current runtime/utility data for the smart appliance from database 112 (step 508). In various embodiments, the request may take the form of a SQL database query having the following exemplary form:

```
<?PHP
header('Content-Type: text/plain');
mysql_connect("245.39.179.112", $DBserver, $password); // access database 112
mysql_select_db("APPLIANCERUNTIME.SQL");    //
select database table to search
$query="SELECT appliance_id, file_location, file_format FROM ApplianceRunTimeTemplate WHERE run cycle_type LIKE '%' $normal wash";
$result=mysql_query($query);   // perform the search query
mysql_close("APPLIANCERUNTIME.SQL");    // close database access
?>
```

Next, in response to the request above, the appliance runtime data is retrieved from database 112 (step 510). Likewise, the current and future utility rate data for the resource used by the appliance is retrieved (step 512). Finally, weather data and other external data, such as occupancy, runtime of other appliances, user's established budget and the like is retrieved from the database 112 (step 514).

Next, the retrieved appliance runtime and utility cost data is provided to the resource management server 110 (step 516). Responsive thereto, the resource management server 110 calculates current and future runtime costs for the run cycle selected by the user (step 518). For example, a Current Cost Algorithm determines computations of projected cost for a current run time using load disaggregation and current utility rates. An Optimal Cost Algorithm determines computations of projected lower costs for future runtime based, for example, on lower rates, weather, a user's energy budget, projected occupancy status, and schedule of other appliances that may be run. Other manners for making these determinations with respect to certain smart appliances are depicted and described in more detail with respect to FIGS. 18-21 below.

Next, the resource management server 110 sends the calculated projections to the smart appliance 102 via the network environment 100 (step 520). Responsive to the reception of the information, the smart appliance displays the current and future runtime cost data to the user 106 on a display 406 of the smart appliance 102 (step 522). The user 106 may then choose to run the smart appliance 102 at a current or future time based on the presented costs.

It will be readily appreciated that suitably programmed smart appliances 102 may perform all the runtime calculations and computations described above locally instead of relying on the resource management server 110 to do so.

Figure 6:
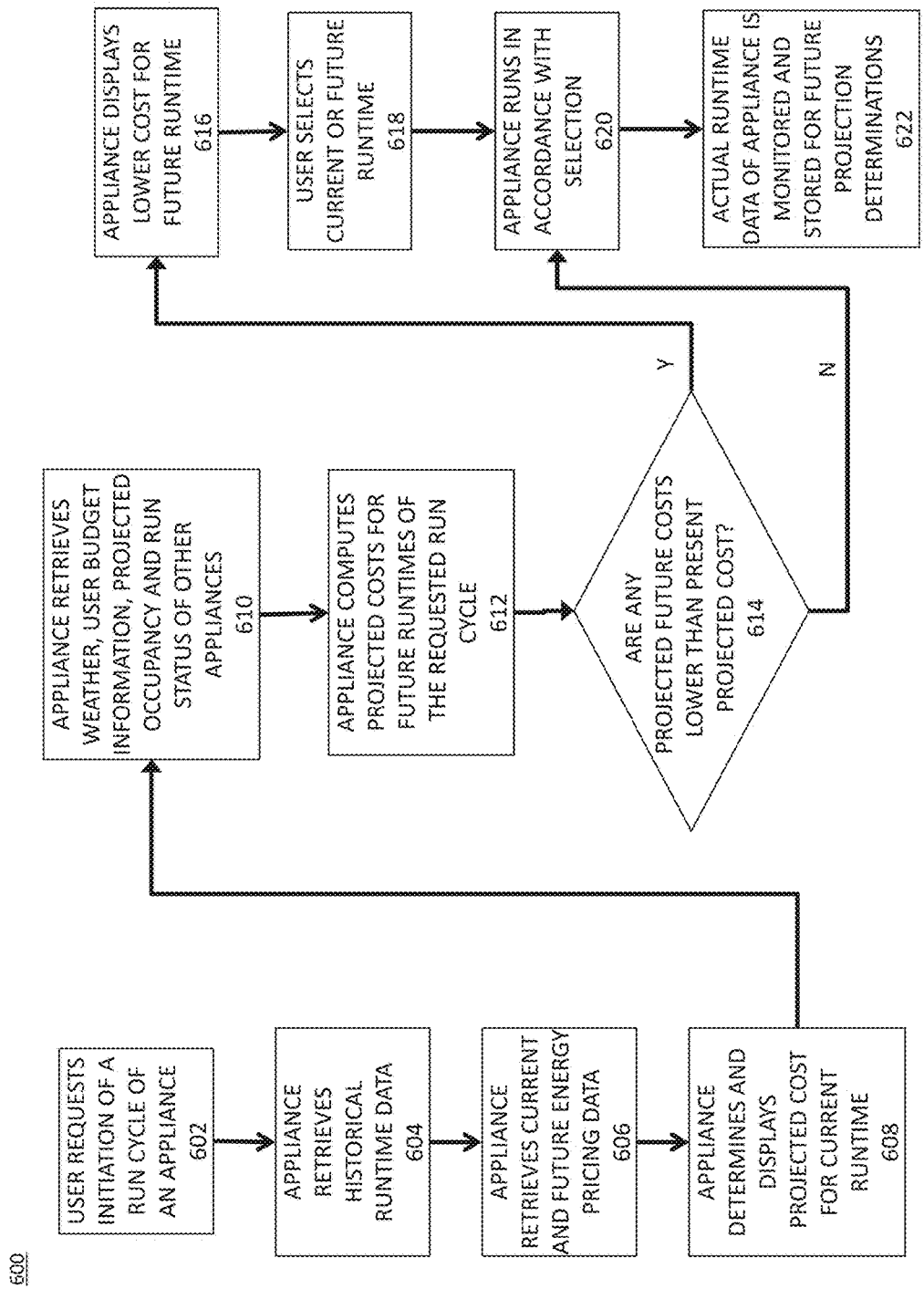
FIG. 6 is a flowchart of a runtime projection process 600 in an embodiment.

Turning now to FIG. 6, therein is depicted a flowchart of a runtime projection process 600 performed by the smart appliance 102 of FIG. 1. First, a user requests initiation of a run cycle of an appliance (step 602). Next, the appliance 102 retrieves historical runtime data of the selected operating cycle (step 604). Such retrieval may be from a local database or remotely from the database 112 via the network environment 100. Next, the appliance 102 retrieves current and future resource pricing data from the utility that provides the resource used by the appliance 102 (step 606). Such retrieval may be from a local database or remotely from the utility provider server 114 or the database 112 via the network environment 100.

Next, the appliance 102 determines and displays the projected costs for a current runtime (step 608). Such projections may be calculated according to FIGS. 18-21 either locally, where the smart appliance 102 is suitably programmed or by calculations performed remotely by the resource management server 110.

Next, the appliance 102 retrieves weather, user budget, projected occupancy and runtimes of other appliances of the user (step 610). The appliance may need to choose the desired future run time to meet some other user settings, such as running the oven before dinner or the water heater before bed, etc. The appliance then computes projected costs for future runtimes of the requested run cycle based on these external factors (step 612) in the manner depicted in FIGS. 18-21.

Next, the appliance 102 determines whether any projected future runtime costs are lower than the projected cost for a current runtime (step 614). If so, the process 600 continues to step 616 below. Otherwise, the process 600 continues from step 614 to step 620, described later below.

Figure 7:
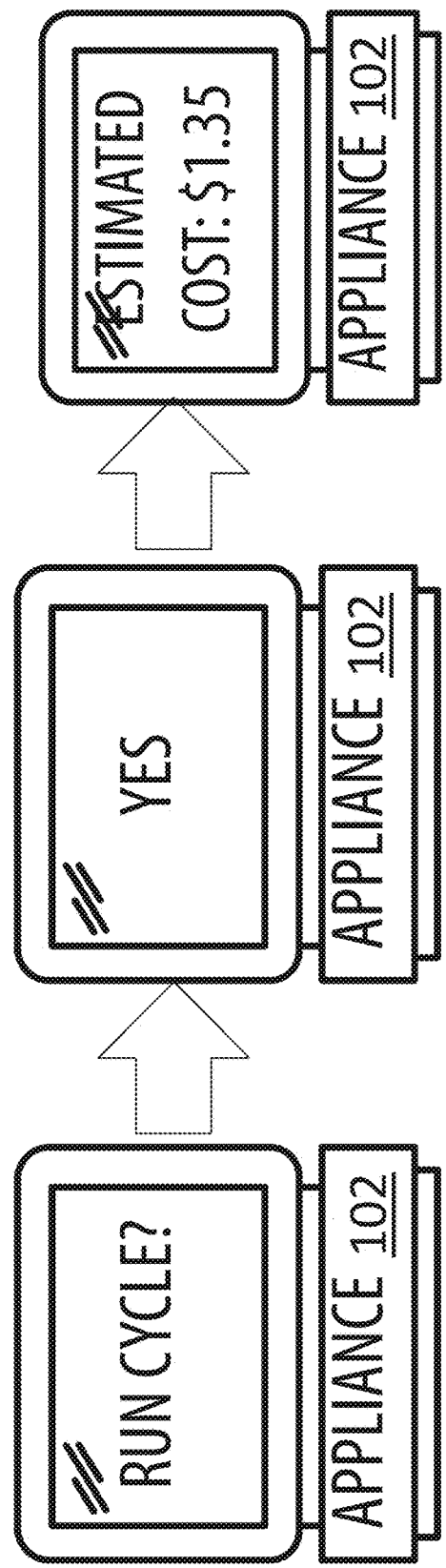
FIG. 7 is an illustration of displays that may be presented to a user of a smart appliance 102 shown generally in FIG. 1.

At step 616, the appliance 102 displays the lower cost for a future runtime to the user 106 on a display 406 (see, e.g., FIG. 7). The user 106 may then select a current or future runtime (step 618). Next, the appliance 102 runs in accordance with user selection of a run cycle (step 620).

Finally, the actual runtime data and resource usage of the appliance is monitored during the run cycle in order to update models of appliance resource usage for making better future projections (step 622). This instance of the process 600 then terminates.

FIG. 7 is an illustration of the displays of information that are presented to a user of the smart appliance 102, as described herein.

Figure 8:
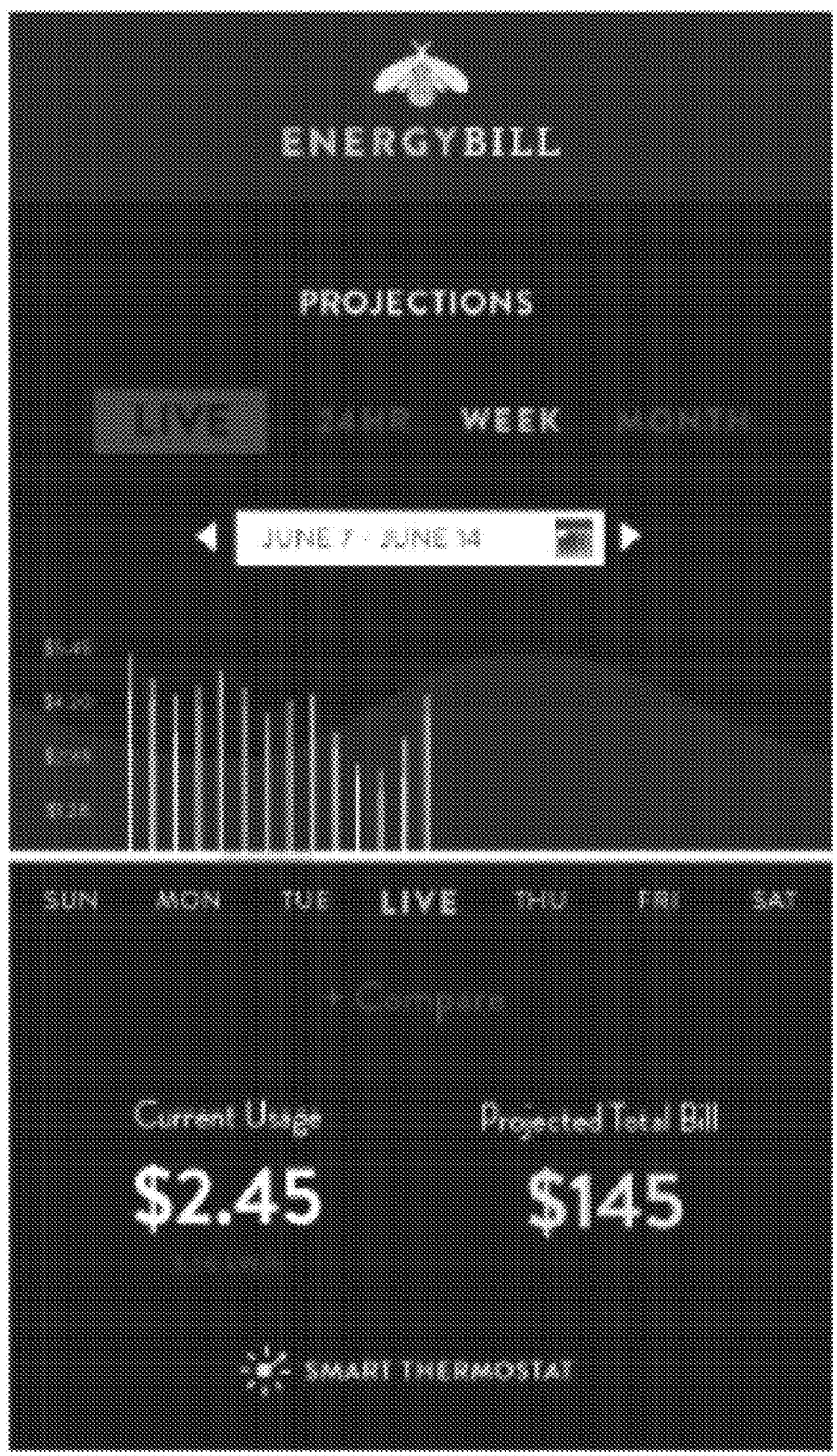
FIG. 8 is an illustration of a screen display of a smart appliance in an exemplary embodiment.

FIGS. 8-12 are illustrations of further screen displays that maybe be presented to a user by the smart appliance 102 or a user terminal 104. In FIG. 8, therein is depicted a screen display of a resource usage projections determined for a user, which may be accessed via user terminal 104. As shown therein, the user may be presented with current resource usage, historical resource usage and a projection of total monthly costs for the resource based on such usage, as determined by the resource management server 110.

Figure 9:
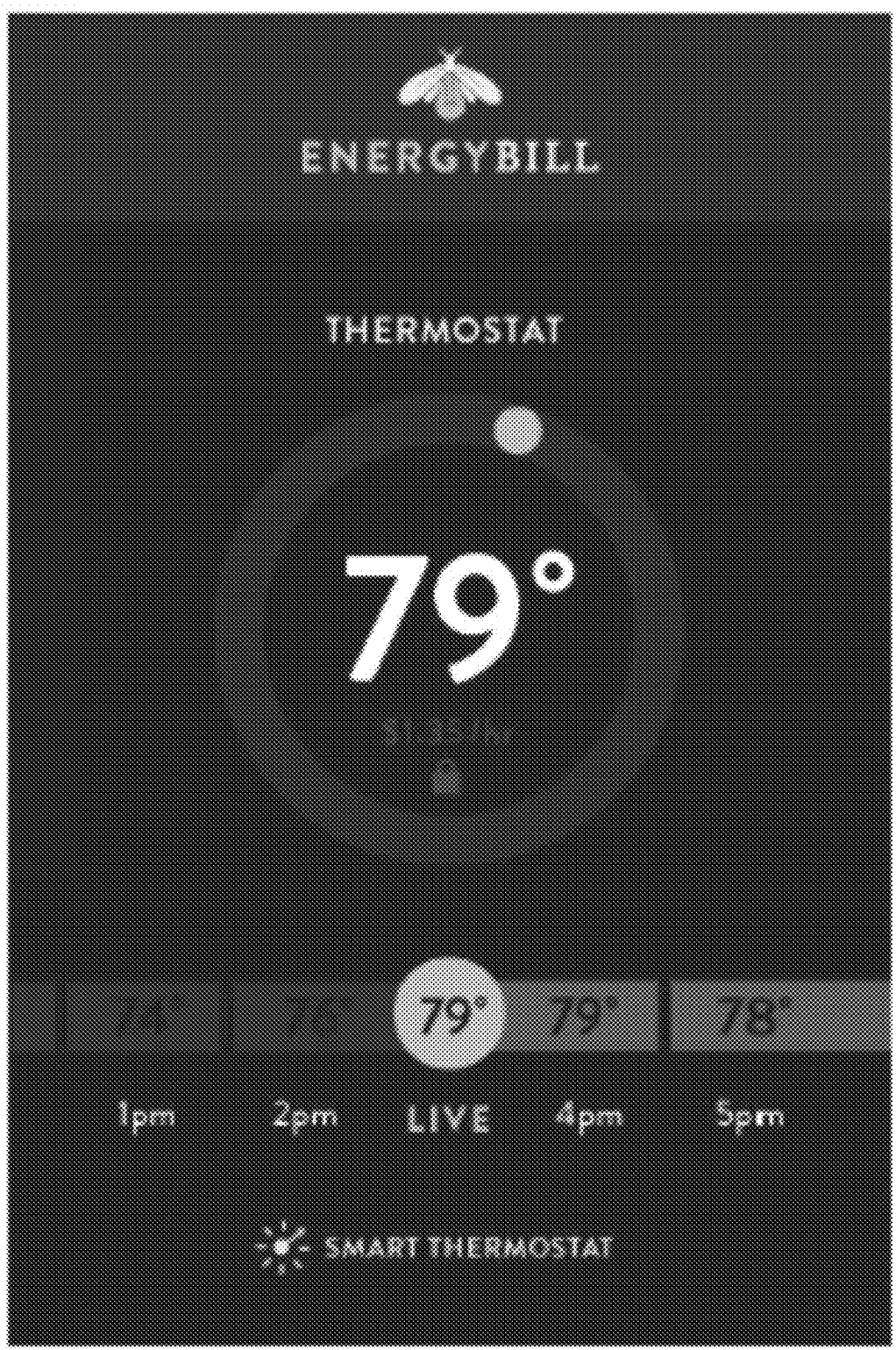
FIG. 9 is an illustration of a screen display of a smart appliance in an exemplary embodiment.

FIG. 9 shows an exemplary appliance interface screen display that may be presented to a user on user terminal 104, where the smart appliance 102 is a smart thermostat. Accordingly, the user may be presented with the current temperature setting, the current temperature readings and historical or projected future temperatures. Options for changing thermostat setpoints may also be presented.

Figure 10:
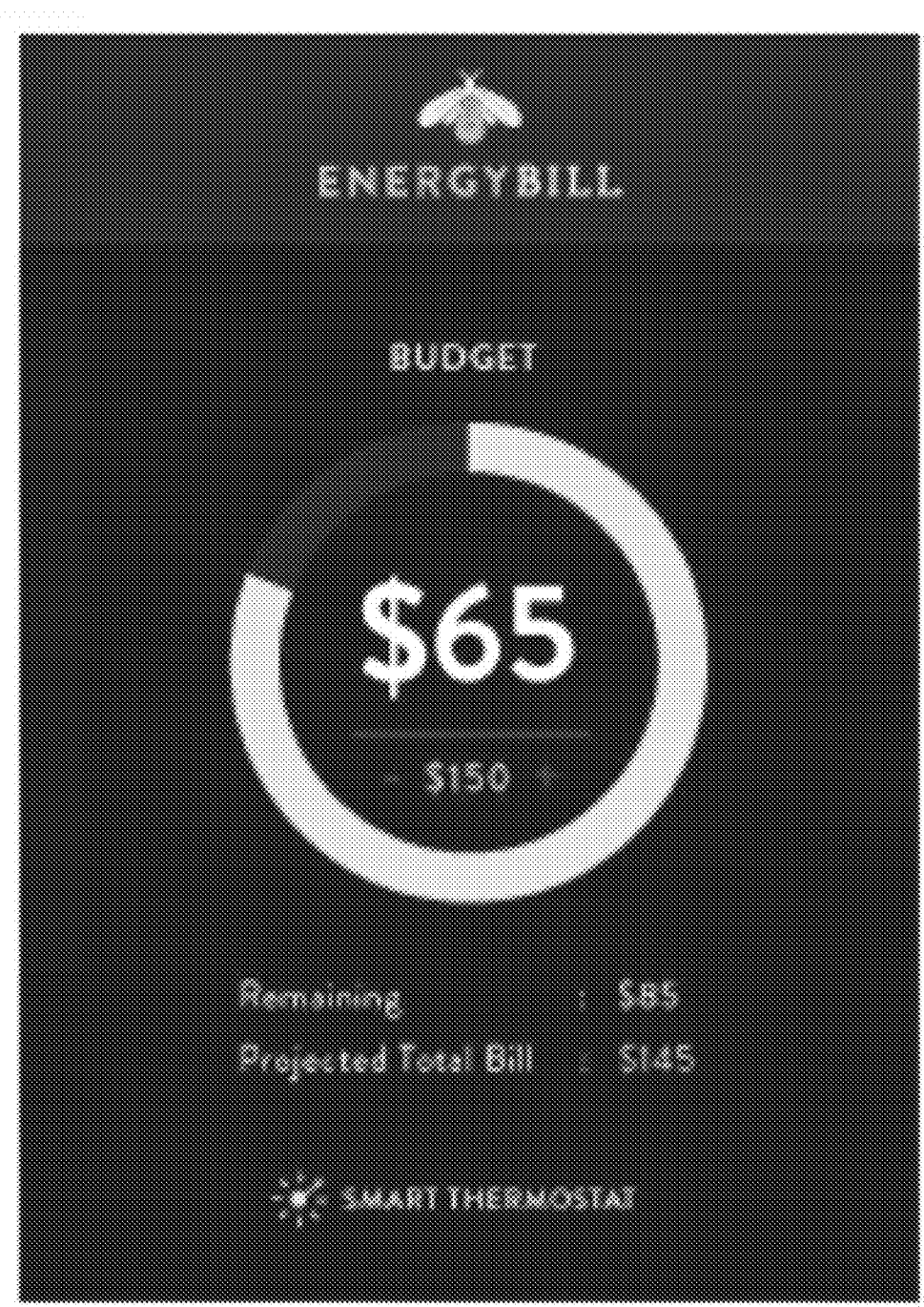
FIG. 10 is an illustration of a screen display of a smart appliance in an exemplary embodiment.

FIG. 10 shows an exemplary resource budget screen that may be presented to a user 106 on the user terminal 104. The display may include a monthly budget established by the user, and a current cost of the resource actually incurred for the month. The user 106 may thus monitor resource usage over the course of a month (or other selected time period) in a manner that is readily intuitive to most users.

Figure 11:
FIG. 11 is an illustration of a screen display of a smart appliance in an exemplary embodiment.

FIG. 11 shows an exemplary resource usage interface screen display that may be presented to a user on user terminal 104 by system over the network environment 100. This is a proof of a user interface screen for consumer usage information. On this screen the user is able to see the trend of all their historical and current usage, with weather dependent and independent loads separated. Comparisons may then be made between window in time and another. With the current billing information consumption data is presented to the user in terms of cost. Based on all the historical data, projections are made for future usage patterns, shown in orange in the proof. Current data being measured in real-time from each data source is then used to predict what future usage patterns may be, and what the cost of those predicted patterns are. Based on historical trends, and feedback from the user, a budget is automatically created for the user 106, helping them to monitor their daily, weekly, and monthly consumption and make effective and practice pattern changes to work towards saving energy and money.

Figure 12:
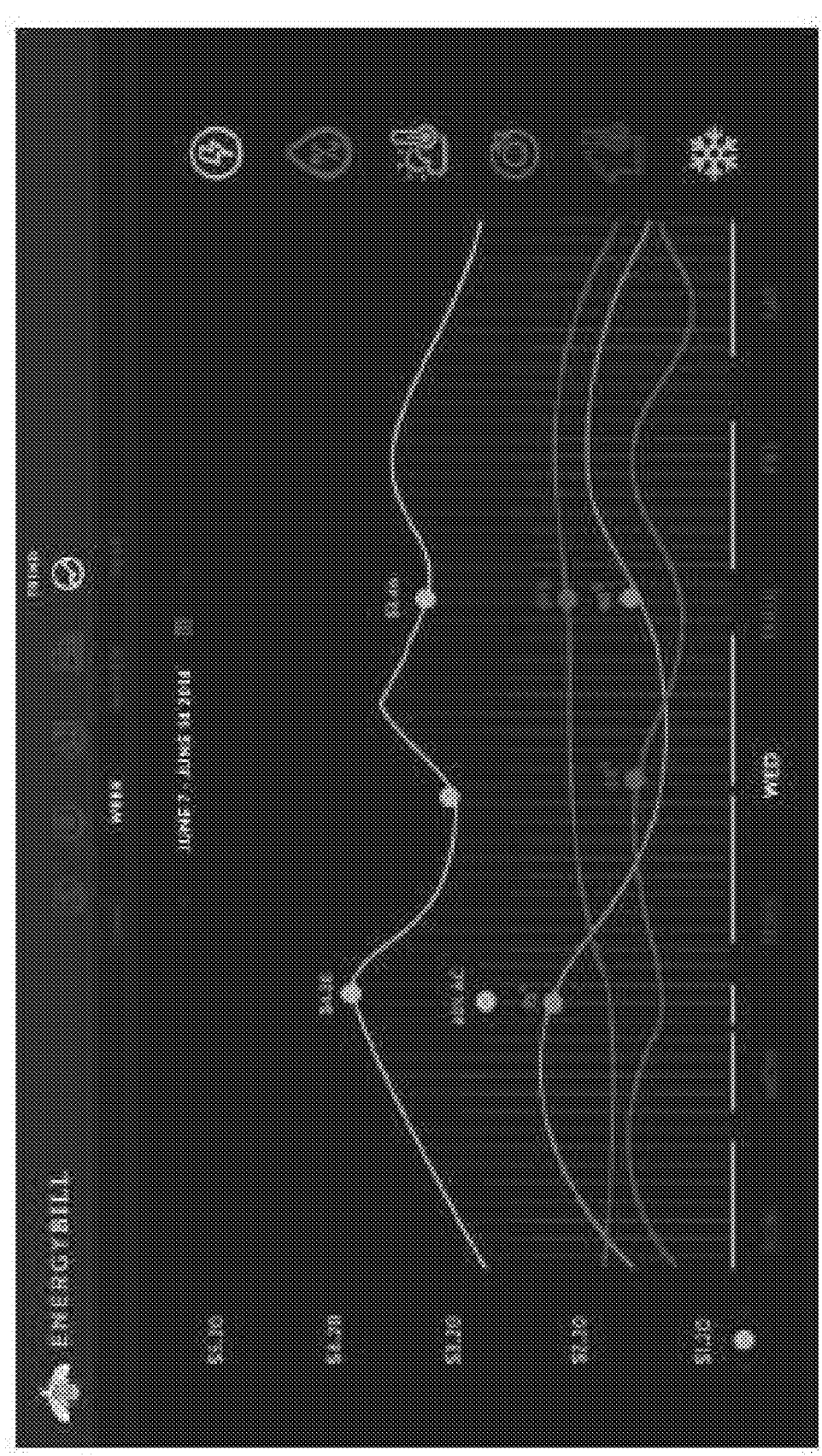
FIG. 12 is an illustration of a screen display of a smart appliance in an exemplary embodiment.

FIG. 12 shows an exemplary thermostat forecast screen display that may be presented to a user on user terminal 104 by an embodiment over the network environment 100.

Figure 13:
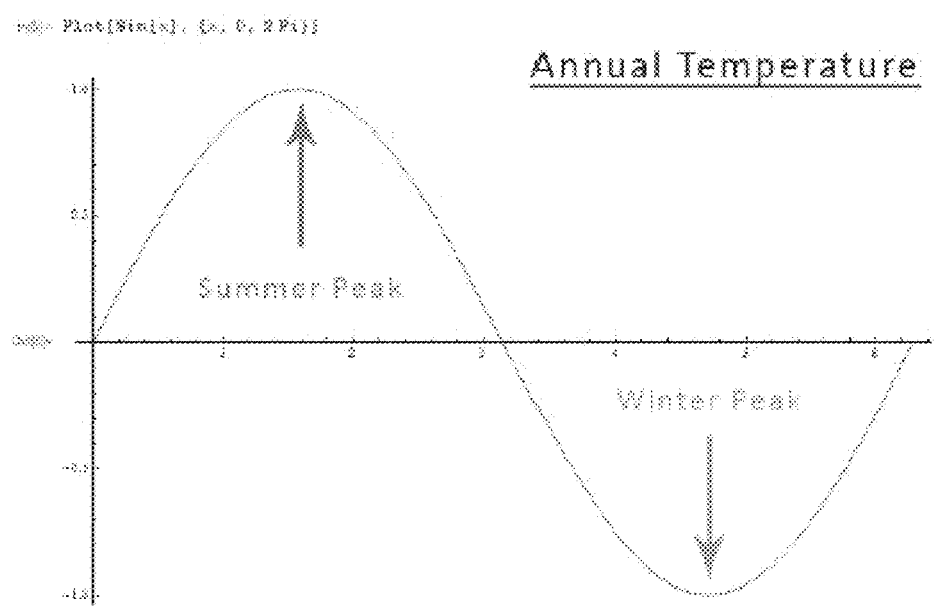
FIG. 13 is an illustration of cyclical data that may be analyzed by a resource management server as shown generally in FIG. 1.
Figure 14:
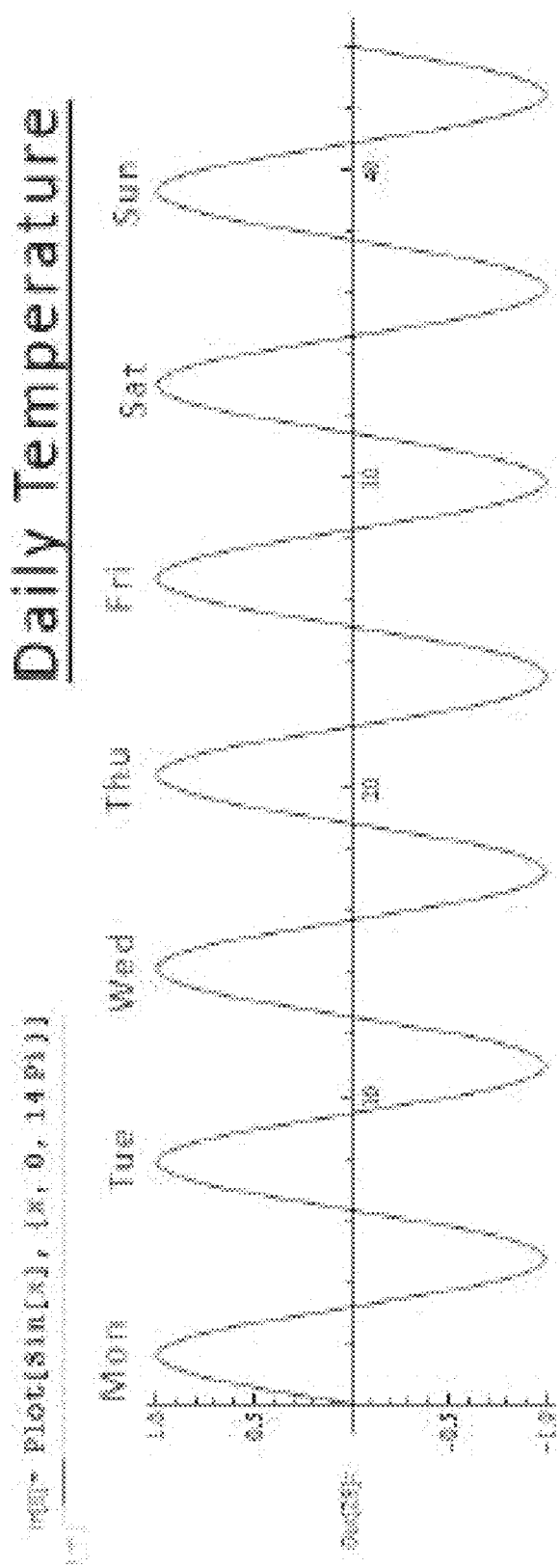
FIG. 14 is an illustration of cyclical data that may be analyzed by a resource management server as shown generally in FIG. 1.
Figure 15:
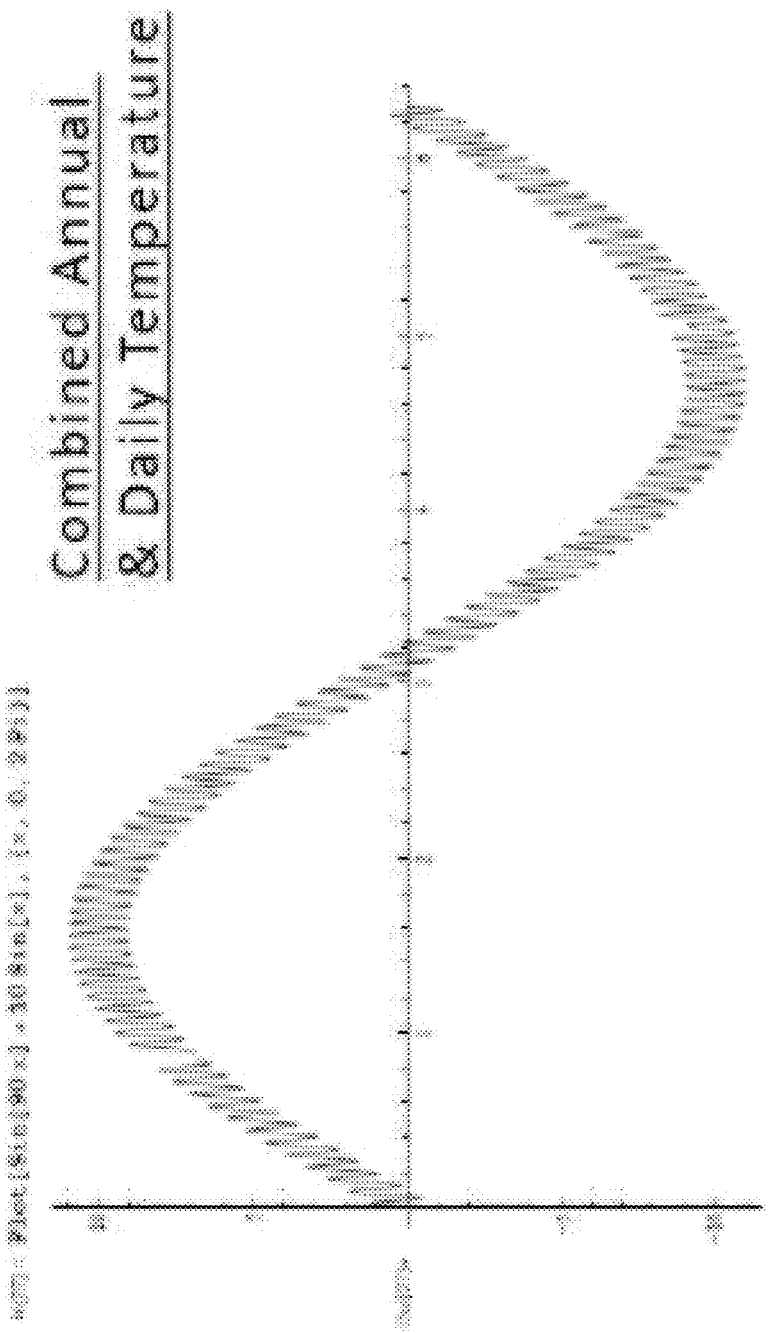
FIG. 15 is an illustration of cyclical data that may be analyzed by a resource management server as shown generally in FIG. 1.
Figure 16:
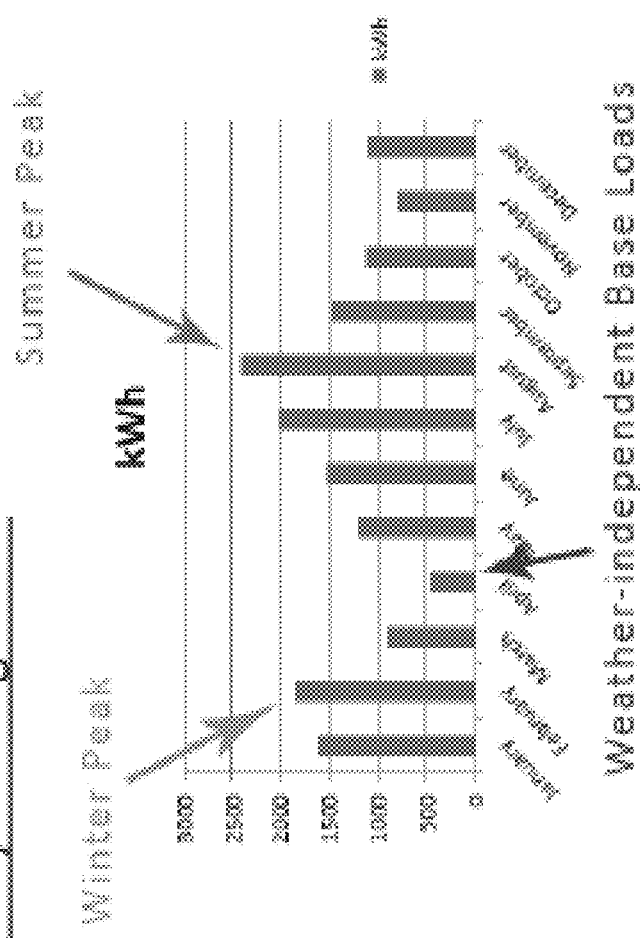
FIG. 16 is an illustration of cyclical data that may be analyzed by a resource management server as shown generally in FIG. 1.

FIGS. 13-17 are illustrations of cyclical data analyzed by the resource management server of FIG. 1 to determine operation of the smart appliance. FIG. 13 shows the cyclical variation of annual outdoor temperatures measured for a geographic location of the user 106. FIG. 14 shows the cyclical variation of daily temperature measured for a geographic location of the user 106. FIG. 15 shows a combination of the data from FIGS. 13 and 14, in which an annual profile of oscillating daily temperatures is measured throughout the year. FIG. 16 shows how the temperature variations in FIGS. 13-15 affect a user's load profile on a monthly basis with respect to resource usage. For example, the HVAC system usage may vary over the course of a year in accordance with daily and annual temperature oscillations.

Figure 17:
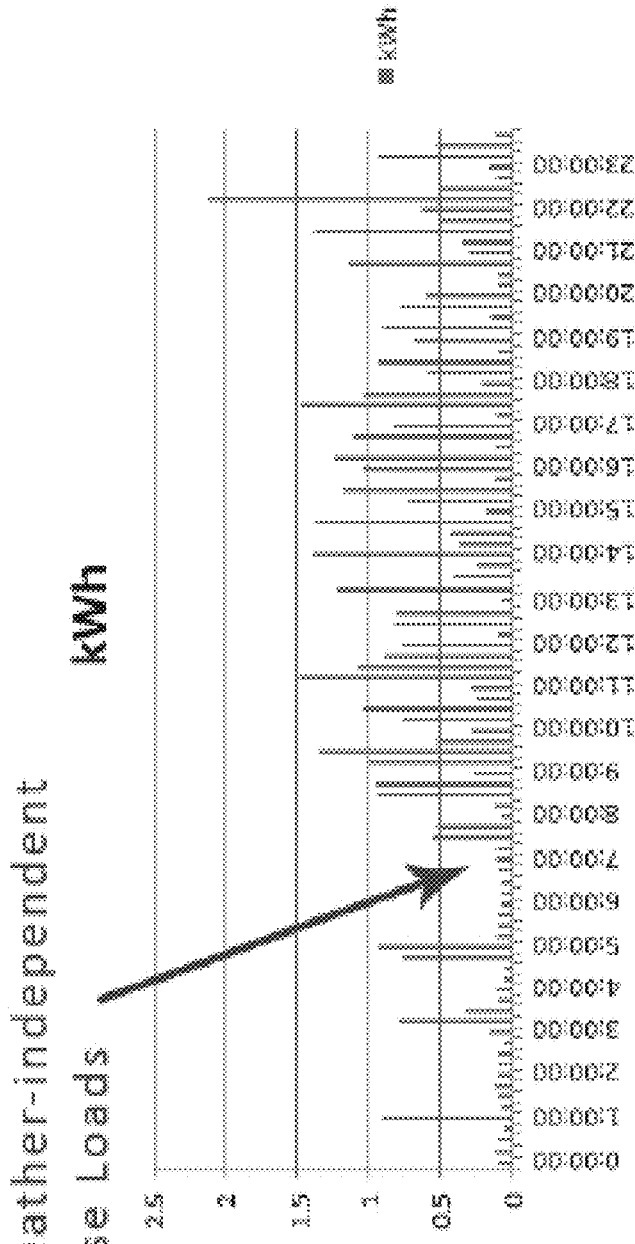
FIG. 17 is an illustration of cyclical data that may be analyzed by a resource management server as shown generally in FIG. 1.

FIG. 17 shows interval data of resource usage as may be monitored by smart meters 116. With resolution of, say, fifteen minutes, an embodiment may be able to identify weather dependent and independent loads. The weather independent load, in turn, is a good estimate of internal heat gain (IHG) as used in later calculations described below.

Continuous monitoring of such data allows models to be built of resource usage based on weather. Load disaggregation for identifying the contributions of individual appliances 102, as well as determination of other weather-dependent and independent variables are performed according to the calculations depicted in FIGS. 18-21.

Turning now to FIGS. 18-21, therein are illustrations of model calculations used by the resource management server 110 of FIG. 1, in order to, for example, to determine runtime operation and costs of a smart appliance 102. FIG. 18 shows a formula and data variables used to calculate the Weather-dependent load disaggregation of a user's household. FIG. 19 shows the formula and variables used to make a Balance Point Determination for the user's residence. FIG. 20 shows a method for determining Balance Point Depression (BPD) for a user's residence based on collected data. FIG. 21 shows a formula for projecting the runtime of an appliance based on the constants determined from the calculations of FIGS. 18-20.

Figure 22:
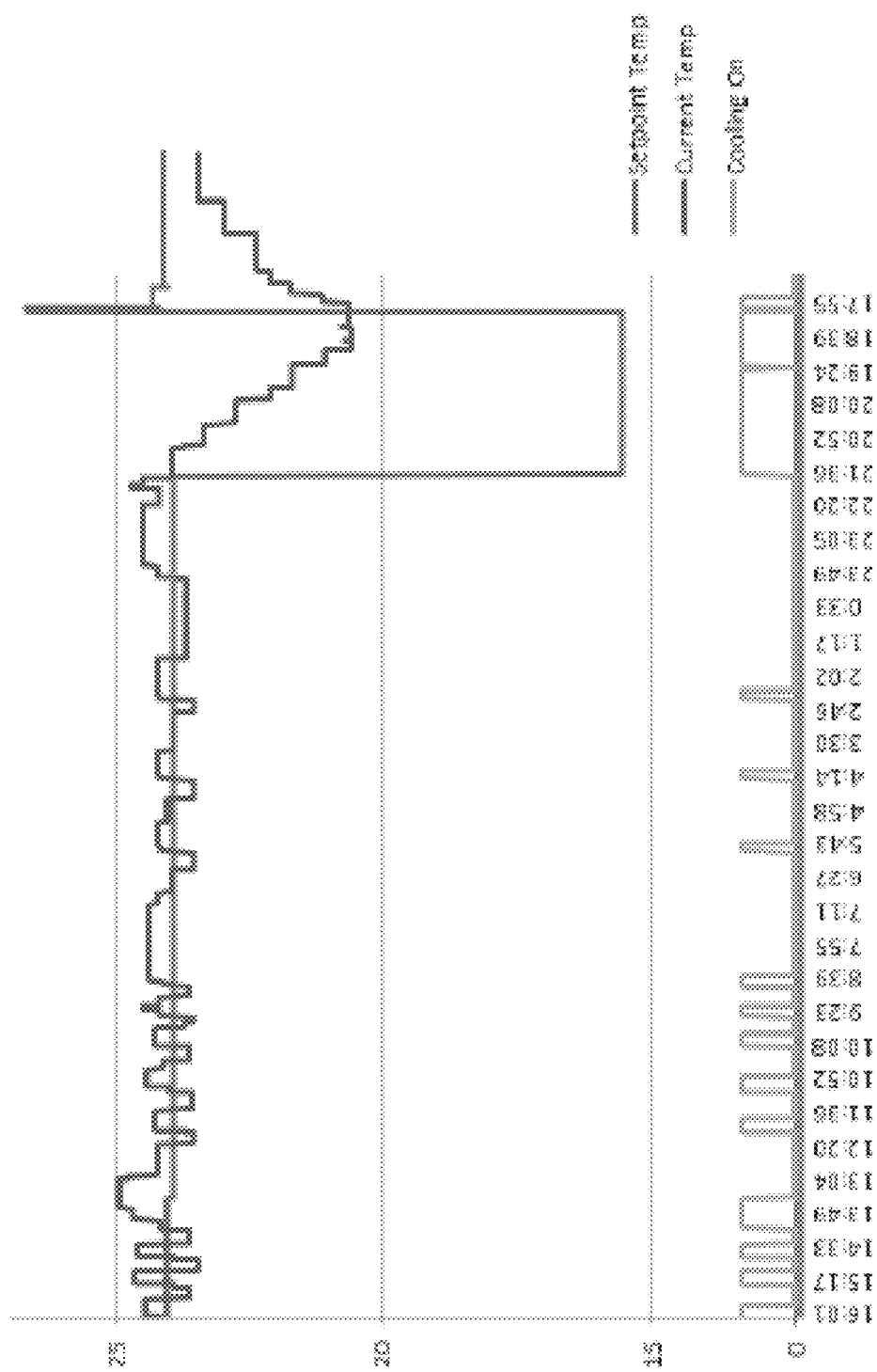
FIG. 22 is an illustration of an exemplary graph of smart appliance operation in accordance with outdoor temperature and setpoint as monitored and generated by the resource management server of FIG. 1.
Figure 23:
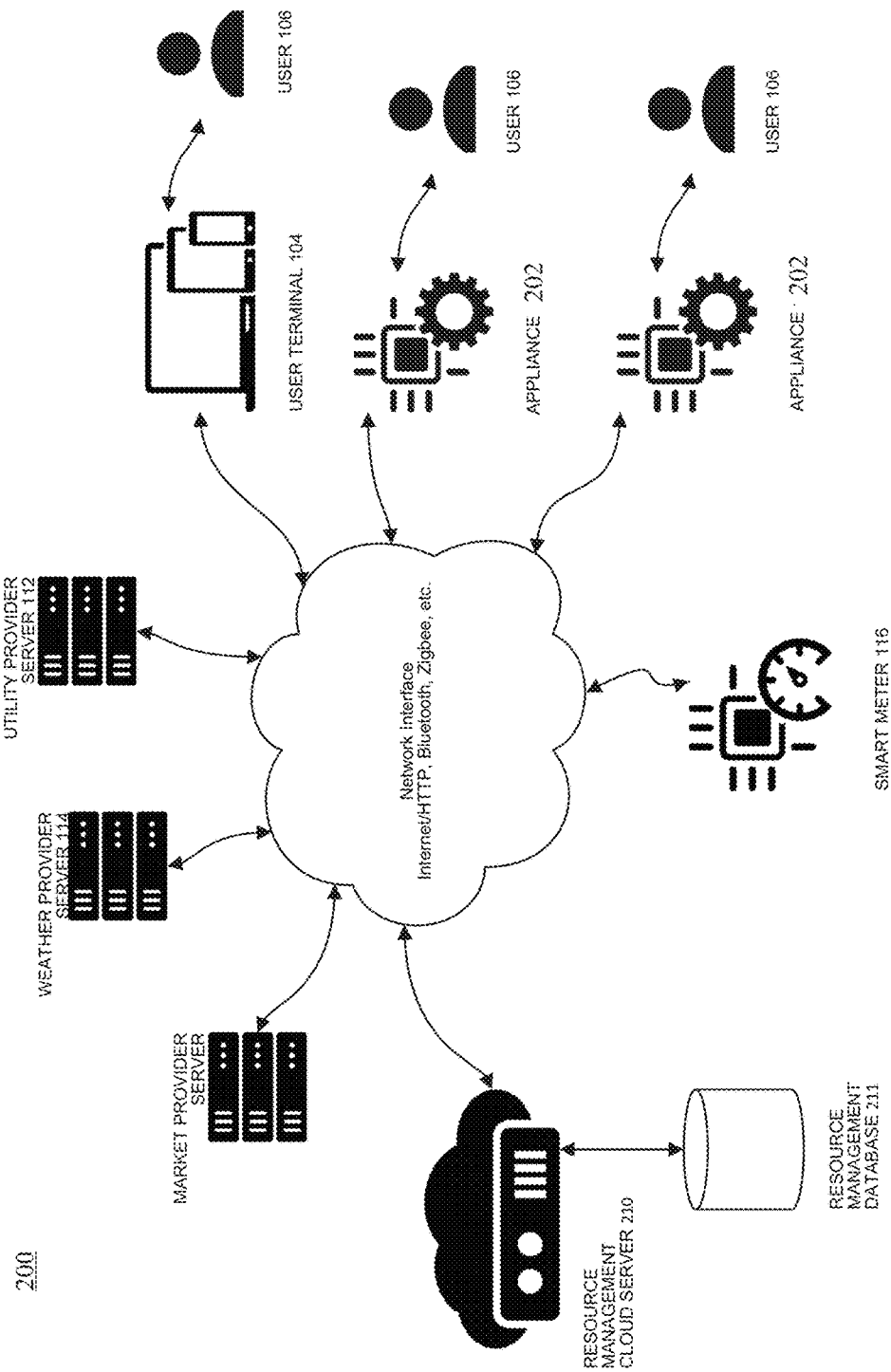
FIG. 23 is a simplified schematic illustration of a resource management system 200 in an exemplary embodiment.
Figure 24:
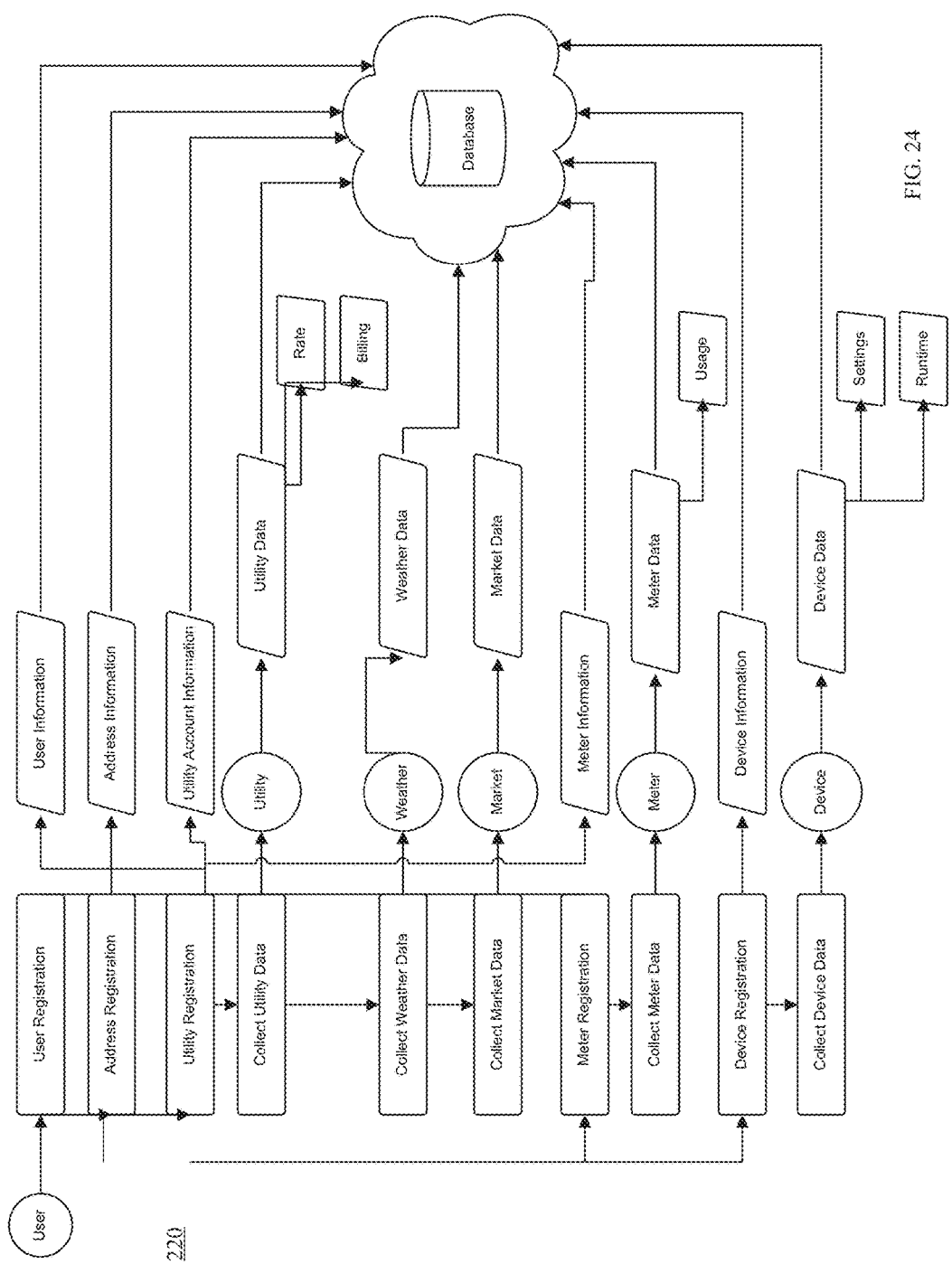
FIG. 24 is an illustration of an exemplary logic module 220 of a resource management server 210 shown generally in FIG. 23.
Figure 25:
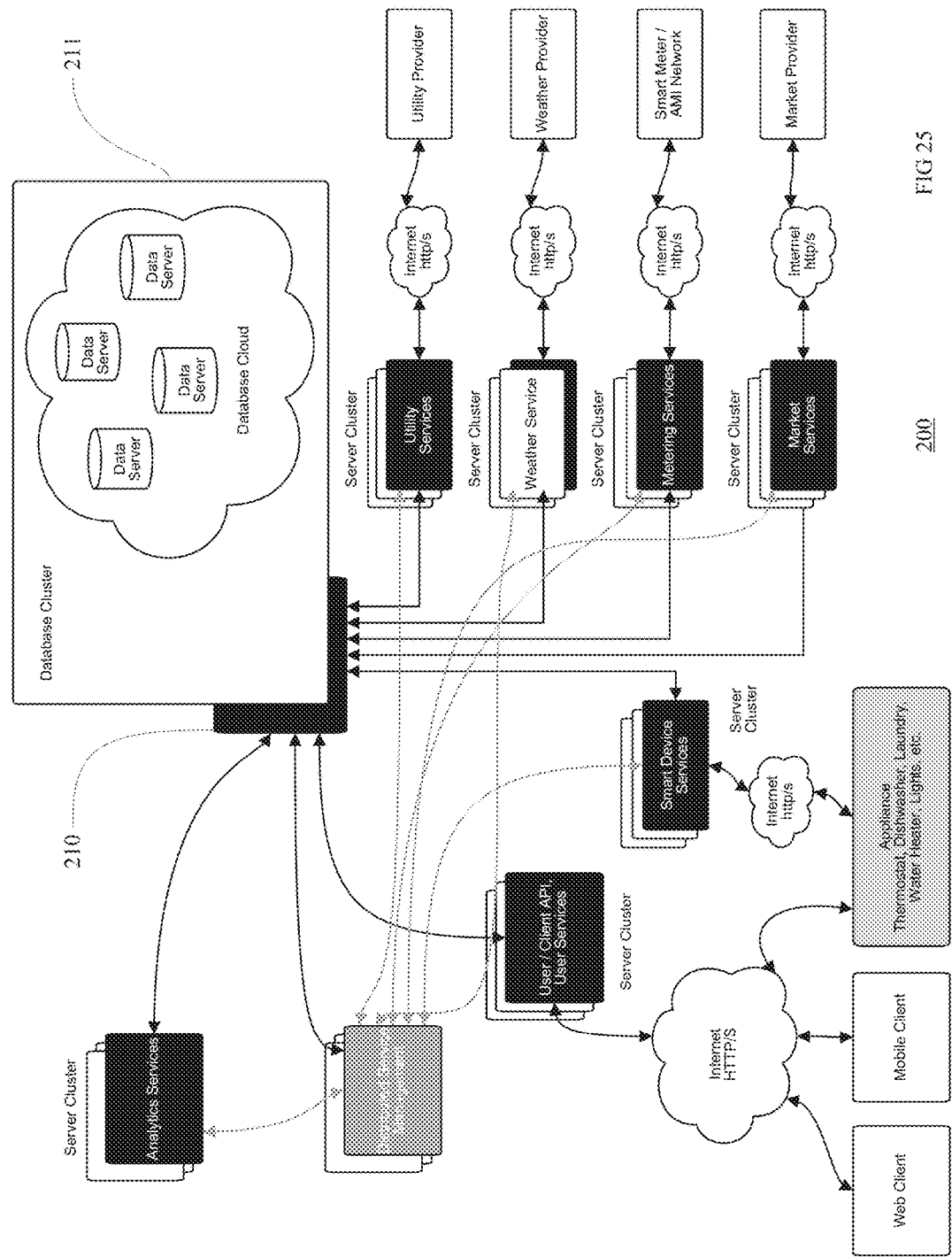
FIG. 25 is a system diagram showing interconnected components of a resource management system 200 shown generally in FIG. 23.
Figure 26:
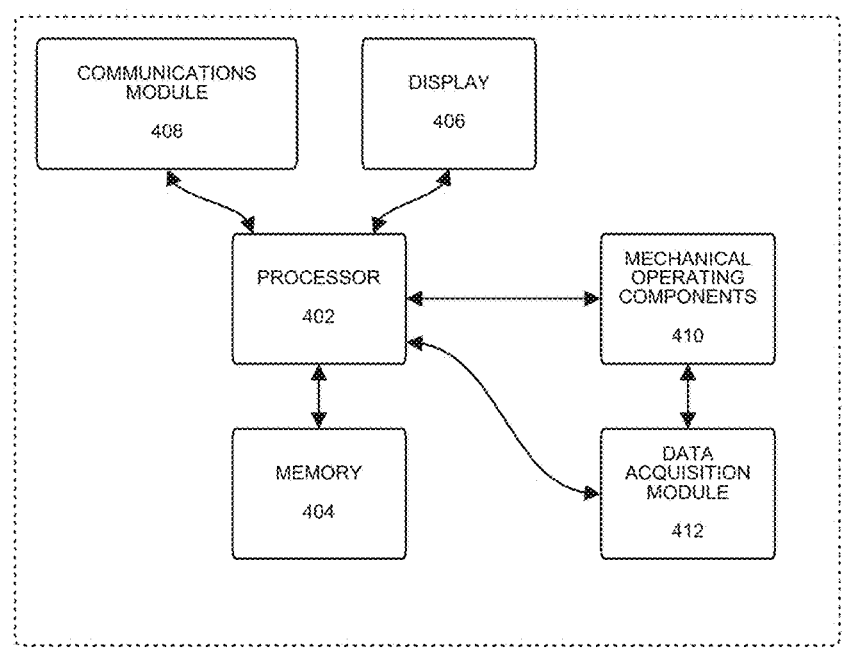
FIG. 26 is a schematic block diagram of the operating components of the smart appliance 202 shown generally in FIG. 23.

FIG. 22 is an illustration of an exemplary graph of smart appliance operation in accordance with outdoor temperature and setpoint as monitored and generated by the resource management server of FIG. 1. This information may be presented to a user 106 system 100 on a display of the user terminal 104. As shown therein, setpoint temperature and current temperature may be displayed against the on/off operating runtime cycle of an appliance, in this case HVAC components. Similar information may likewise be presented for other appliances 102, such as electrical usage in kilowatt-hours (kWh) of a clothes dryer over time. Similar data and modeling maybe performed for each resource-utilizing appliance having weather-dependent and/or weather-independent variables.

Referring to FIG. 31, in an embodiment, a method 660 may include decision modeling such as by providing a mathematical decision model, such as a decision graph as shown, comprised of nodes and arcs that can then be analyzed mathematically. The decision graph shown in FIG. 31 is an exemplary visual representation of a mathematical decision model on a partial, very small scale. This graph represents timebounded decisions over a space that is 12 time unit lengths deep. In our case time units are in months and start from the present day at node 1 and look forward a year into the future. Arcs represent the fixed termlength of a retail energy contract, representing a single 1 month, 2 month, 3 month, 6 month, 9 month, and 12 month contract between nodes in this graph. These timebounded decisions then form into various paths. For example a consumer could follow a path that looks like 1119 or 131313 or 66, or 12, choosing different contracts throughout the 1 year period. For this particular graph, there are 1059 different paths that can be chosen from a relatively small number of total market choices. In the real world where a consumer can have many hundreds of present day choices this can result in a total decision space that is very large. For instance, consider just month-to-month contracts projected a year in advance. If, based on a user's geographic location, they had access to an average of 25 month-to-month contracts we could set n=25. We would set our depth, d, to 12. This results in 5,200,300 unique paths in the decision graph. But, in practice the numbers are many orders of magnitude larger than this. There are actually many thousands of choices, arcs will be composed of a mix of contracts with varying term lengths, not just month to month, and many markets offer term lengths as long as 36 or 60 months which can result in very deep models to consider their value.

Figure 32:
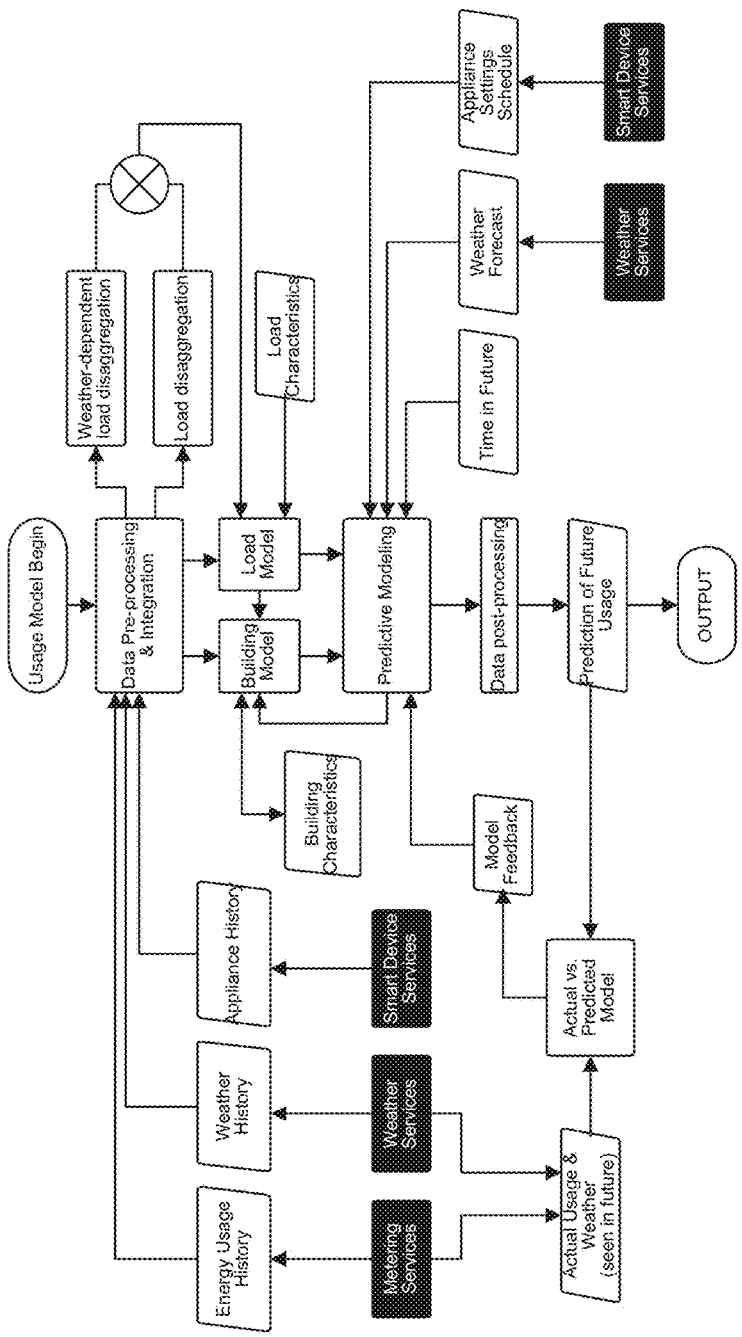
FIG. 32 depicts an exemplary usage process as employed by embodiments of the present disclosure.

In an embodiment shown generally in FIG. 32, method 700 may provide deciding or determining for a consumer a prediction of a best path and an initial decision consistent with completing the predicted best path. Method 700 may include determining cost of an individual energy product including consideration of both present-day options and future-day options. It will be understood that, in an embodiment, present-day options may be provided by reference to historical market data of the retail energy market to provide a model and output prediction of an energy market, such as a retail energy market. It will be understood that, in an embodiment, present-day options may be provided by reference to historical market data of the retail energy market in combination, considered, weighted, or adjusted with, reference to weather data to provide a model and output prediction of an energy market, such as a retail energy market. It will be understood, further, that in an embodiment, present-day options may be determined by reference to historical market data of the retail energy market in combination, considered, weighted, or adjusted with, reference to third-party models and predictions to provide a model and output prediction of an energy market, such as a retail energy market.

Referring to FIG. 32, it will be understood that in an embodiment, method 700 may include a model and output prediction of an energy market such as a retail energy market. It will be understood that a model may work in part by disaggregating individual energy products within the market and utilizing machine learning techniques to forecasting similar but fictitious versions of those products at some time in the future, such as at monthly intervals, based on influencing conditions such as weather, the economy, and other market factors that can have an influence on energy price. The model may provide a probability distribution for different types of energy products. Type variations include things such as retail energy contracts of varying term lengths and distinct rate formulas which taken on different shapes such as flat fixed rate, linear vs nonlinear, timevarying vs. usage-varying, etc, as well as other differences that can and do exist between energy products in in a competitive retail marketplace. For example, the model may predict the likelihood of seeing a retail electric plan with a 3 month term at $0.05/kWh nine months from now, or a similar plan with a 6 month term at $0.045 and a base charge of $12,99/month. The output of the model may provide a distribution of all such potential energy product variations in the future, yielding as a combined space of both present day and future-day predicted retail choices.

Figure 35:
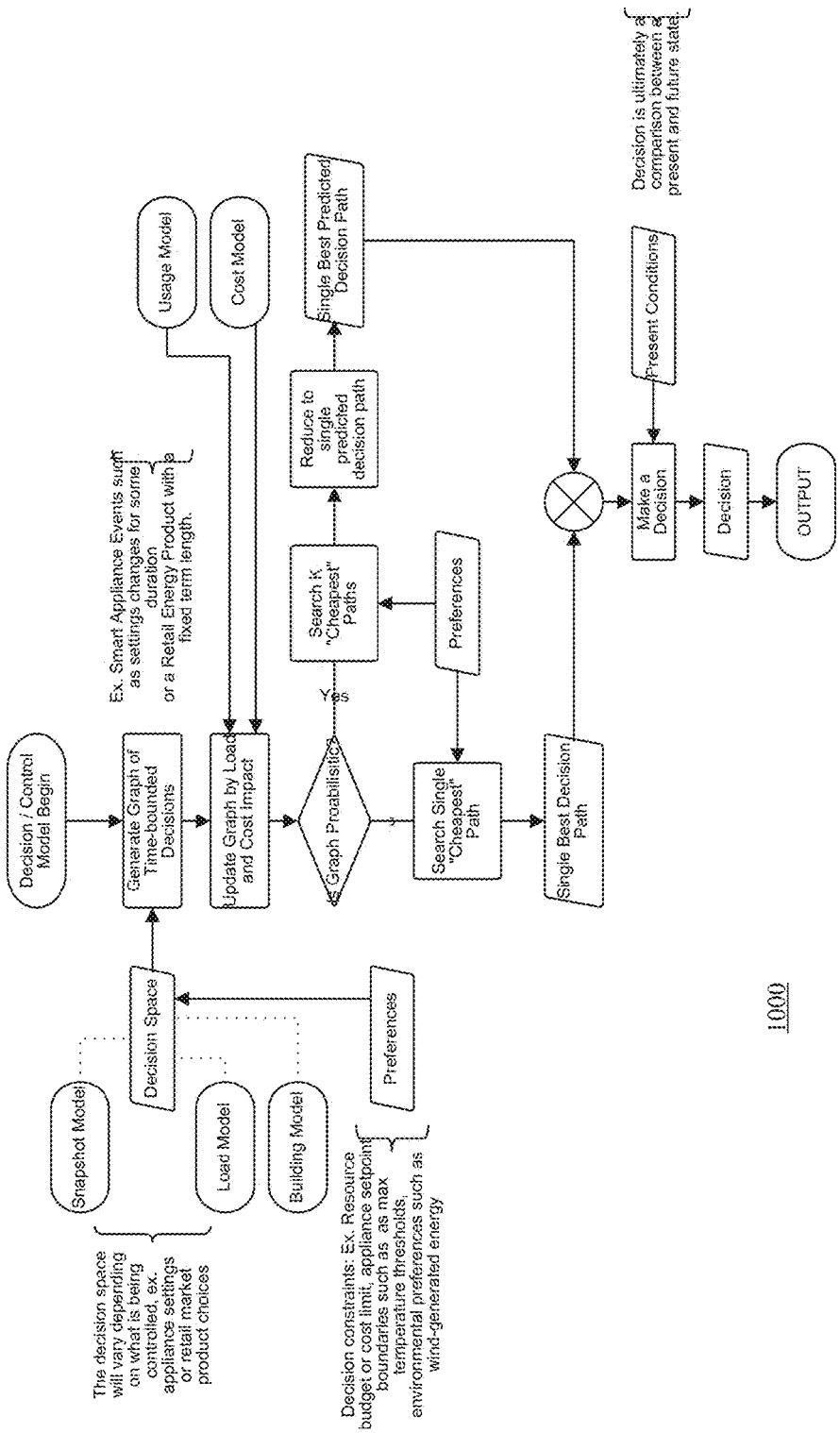
FIG. 35 depicts an exemplary decision control process as employed by embodiments of the present disclosure.
Figure 36:
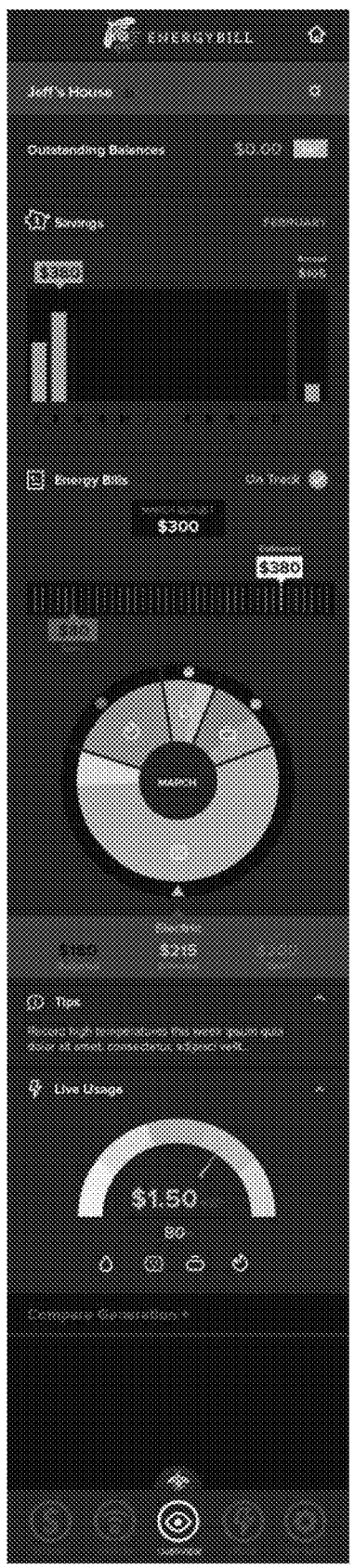
FIG. 36-FIG. 58 illustrate exemplary outputs of embodiments employing the present disclosure.
Figure 37:
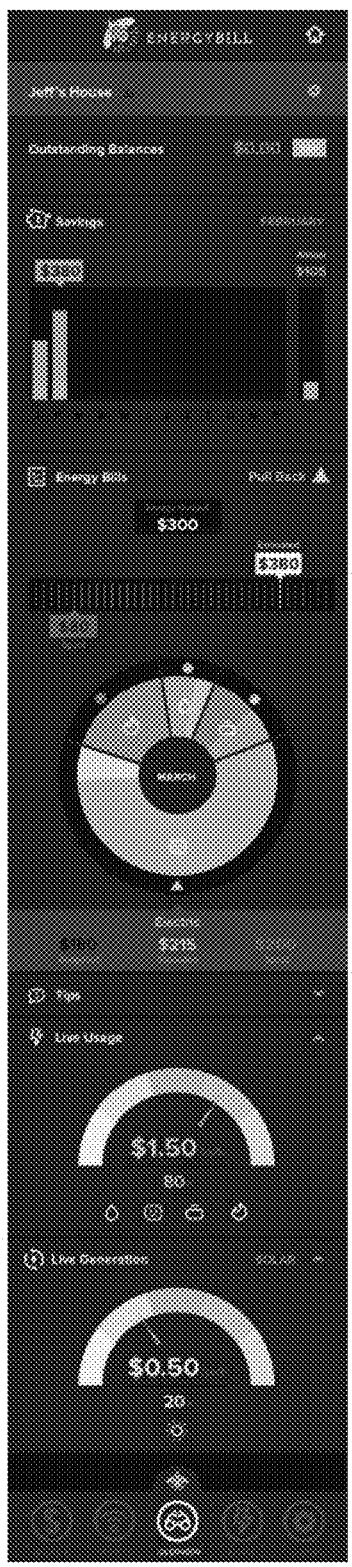
Figure 38:
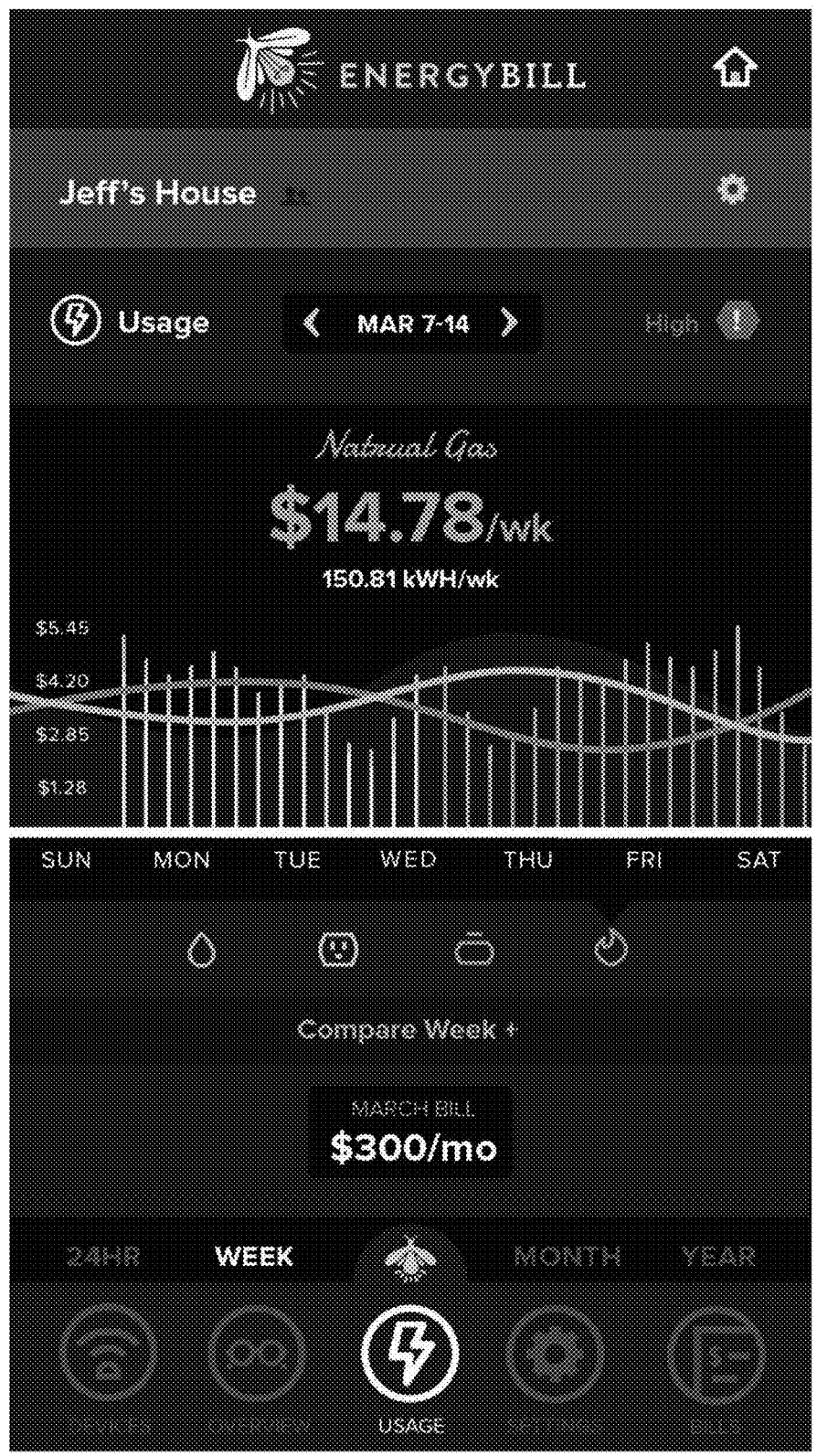
Figure 39:
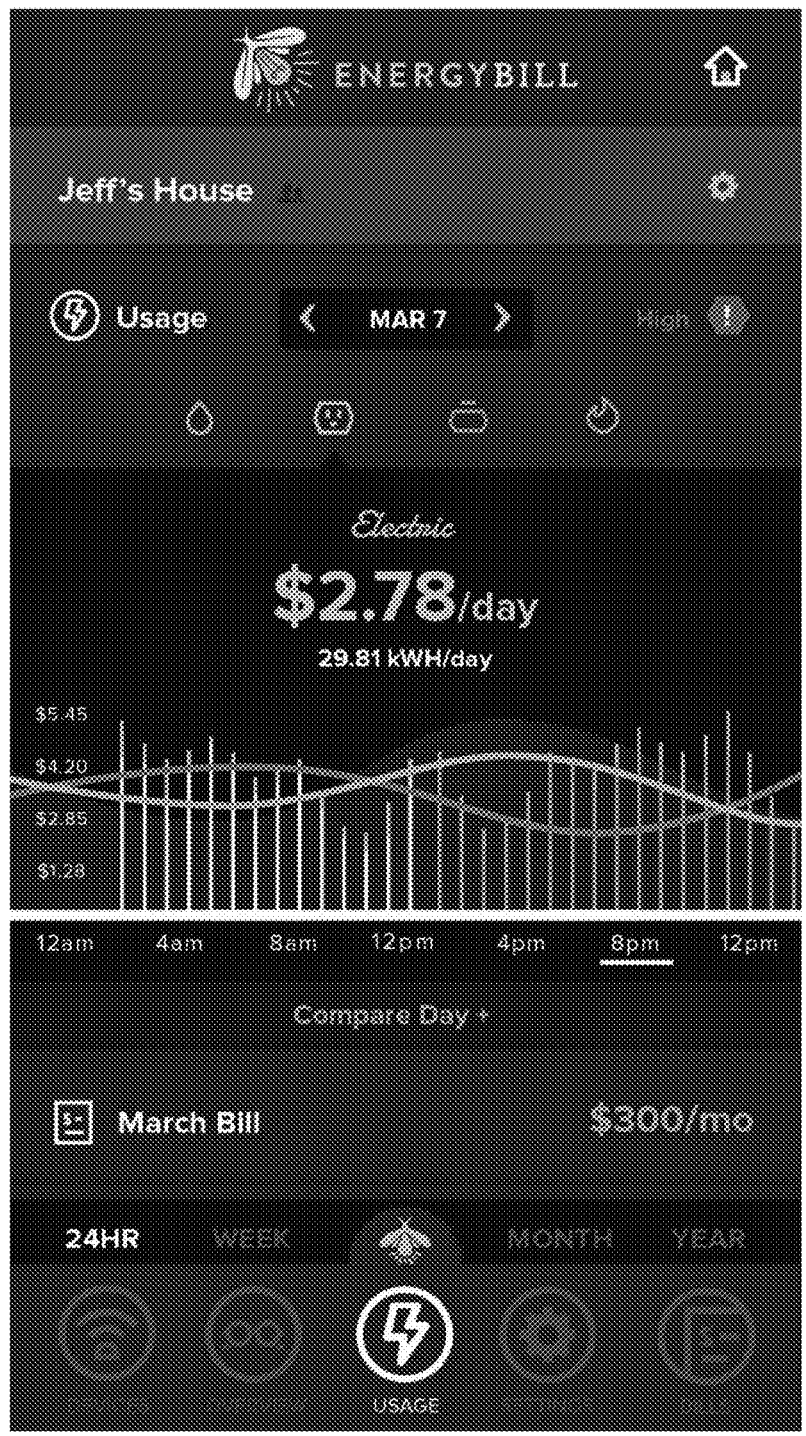
Figure 40:
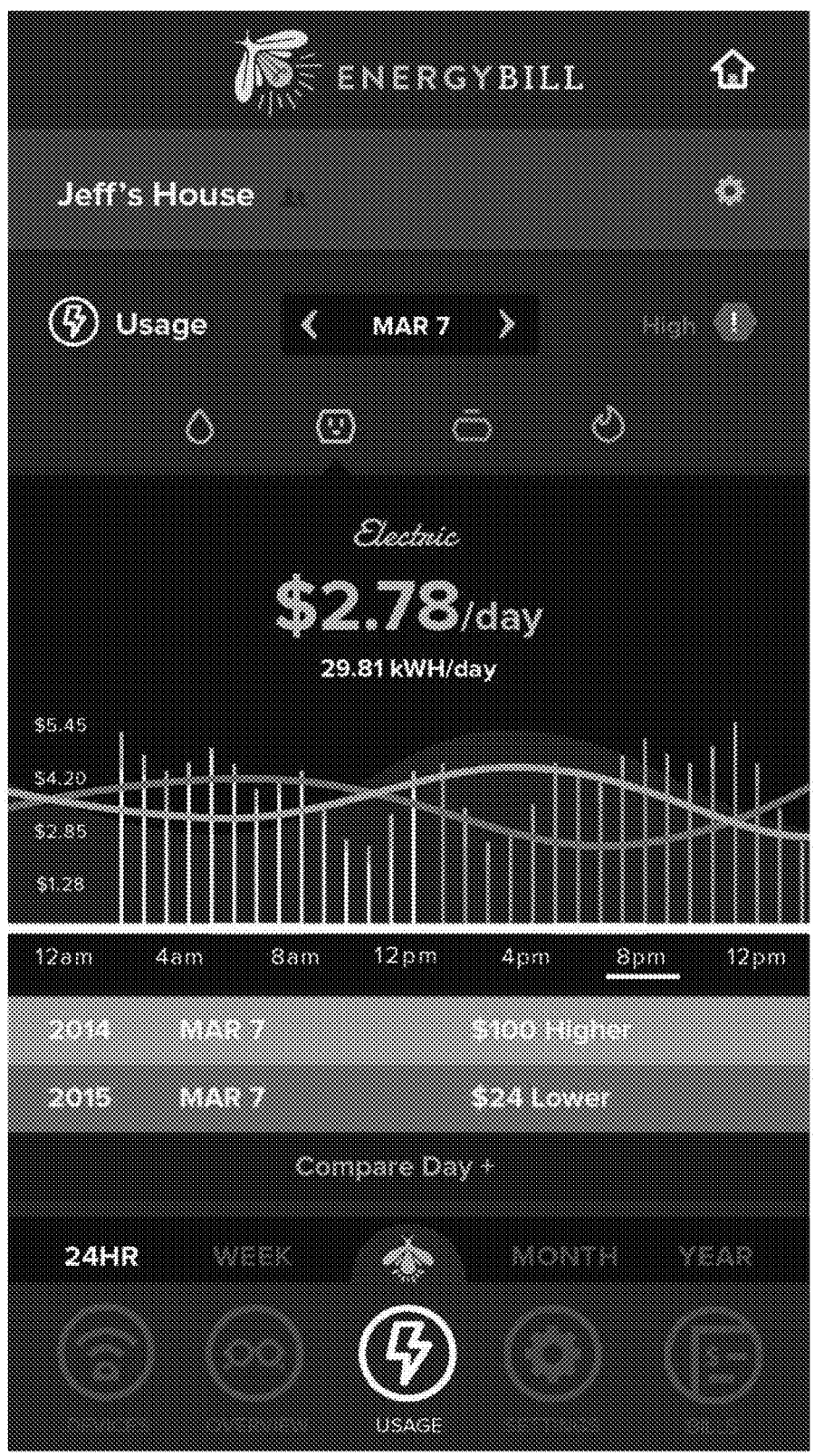
Figure 41:
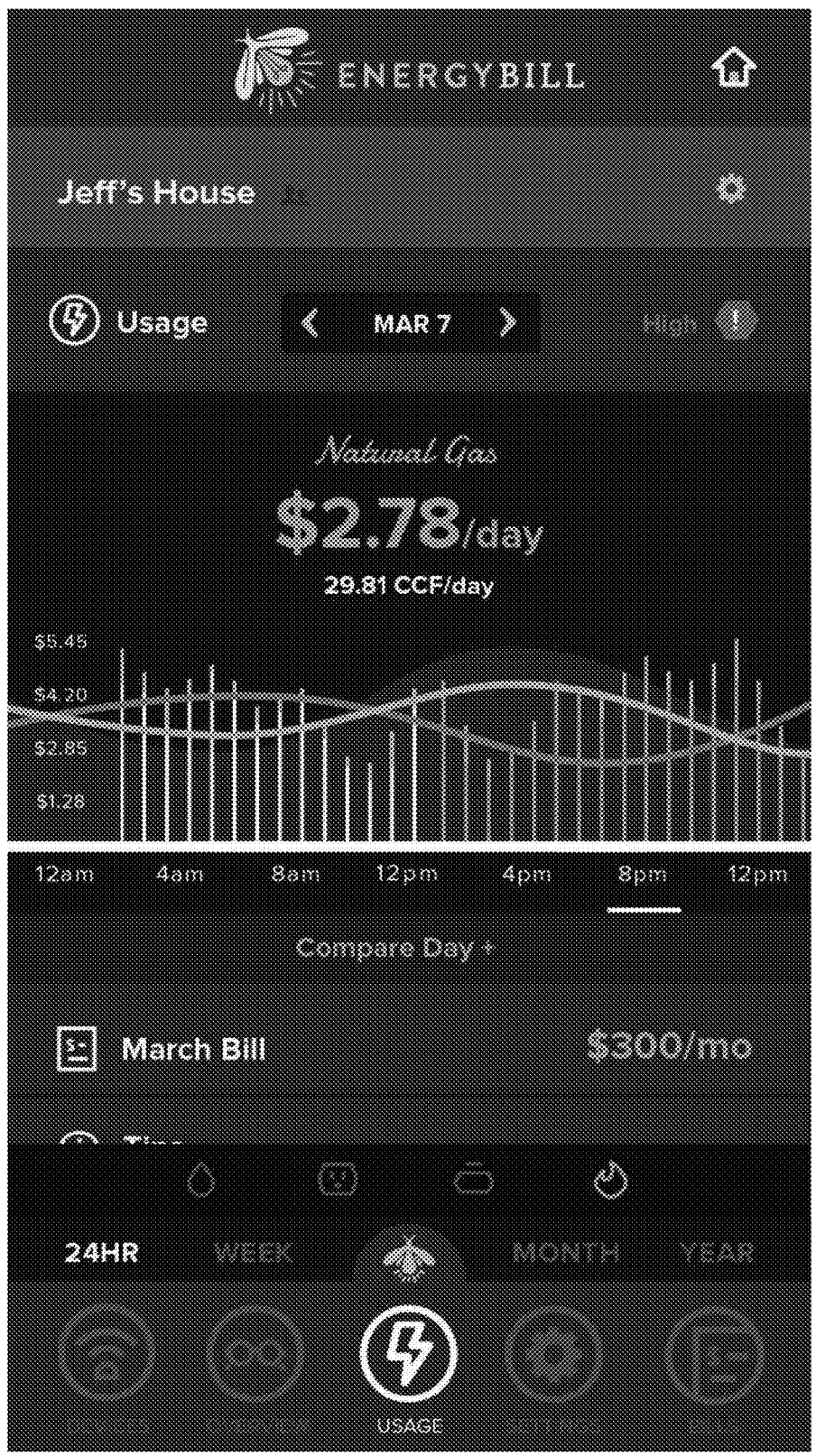
Figure 42:
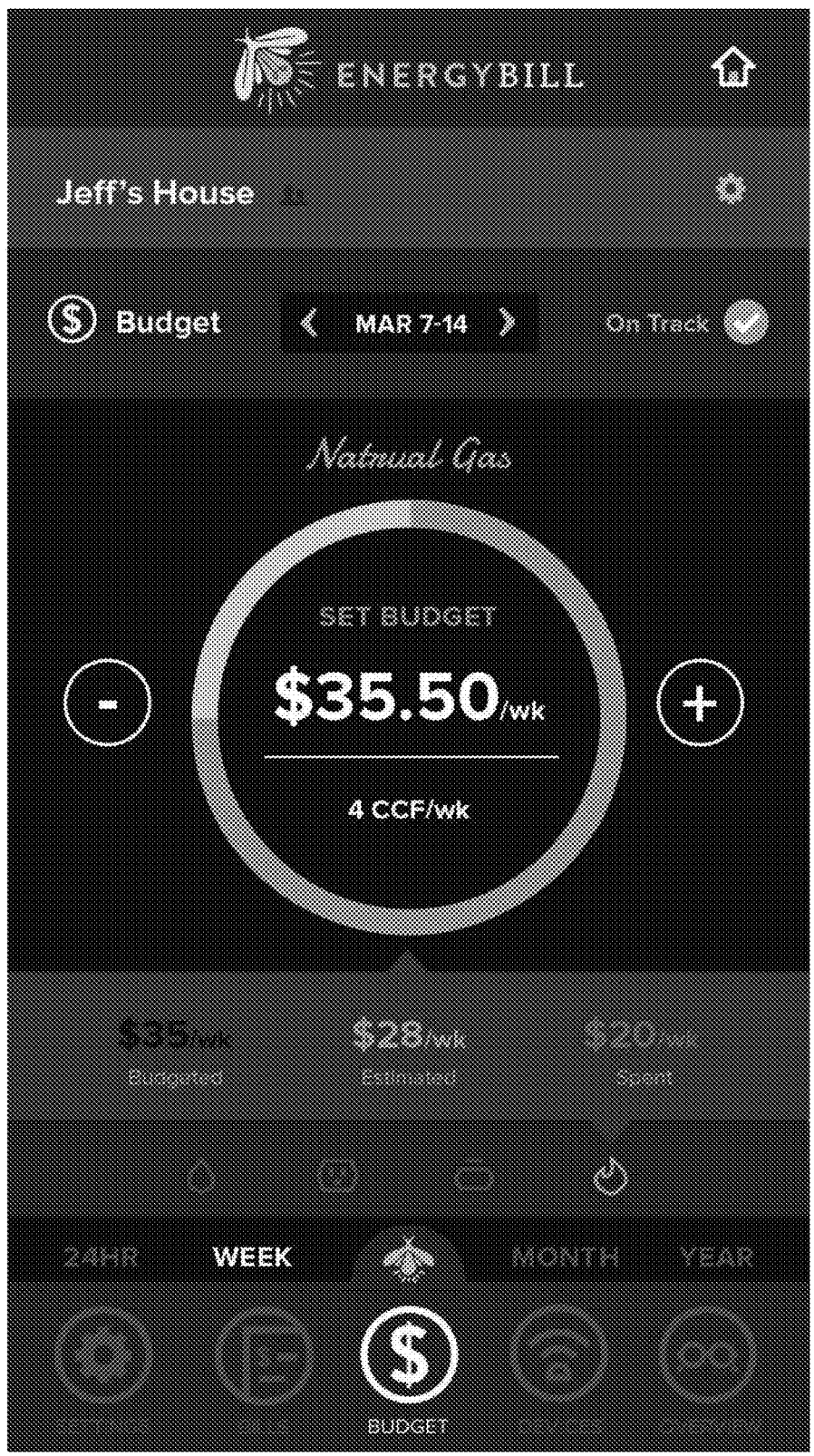
Figure 43:
Figure 44:
Figure 45:
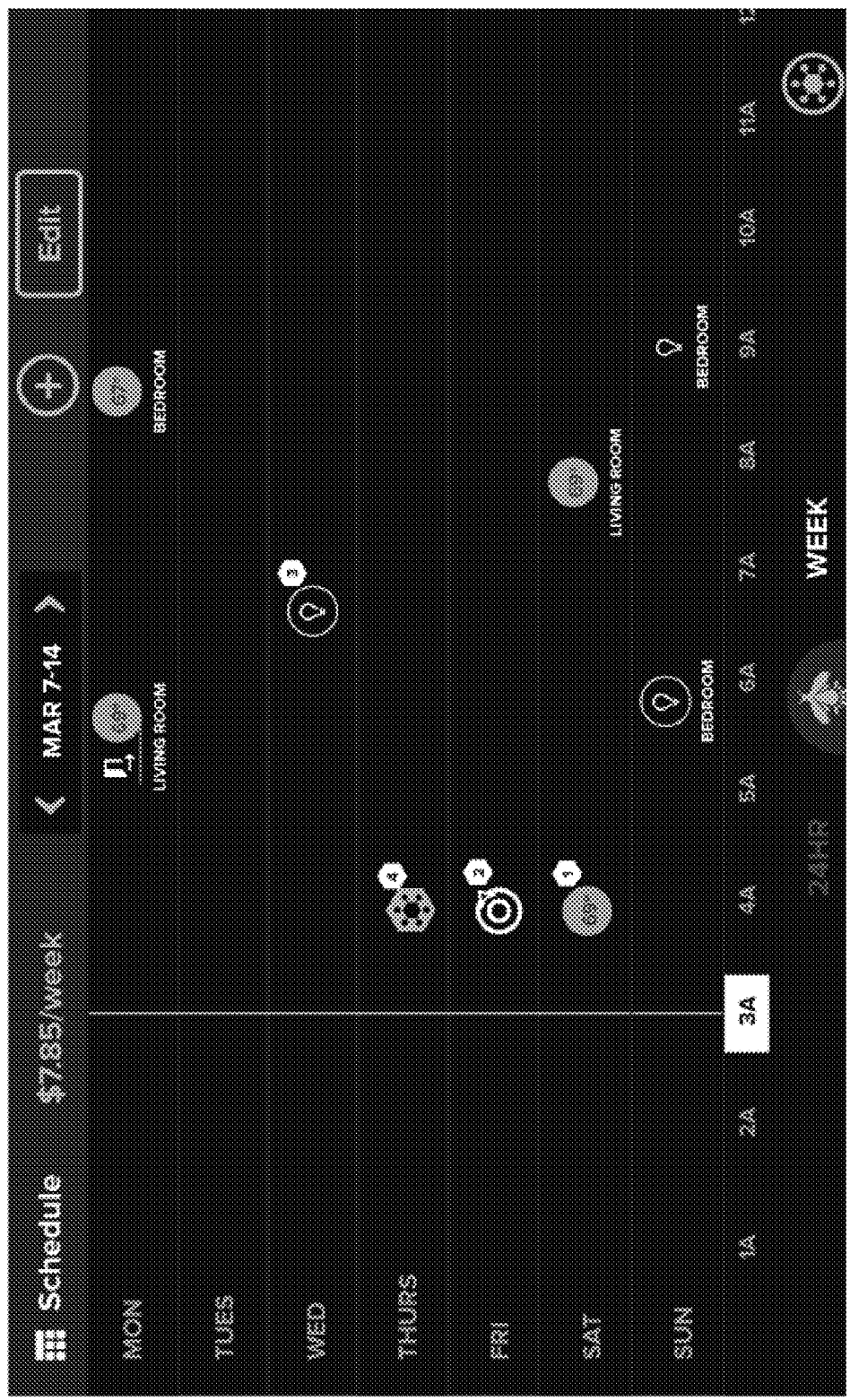
Figure 46:
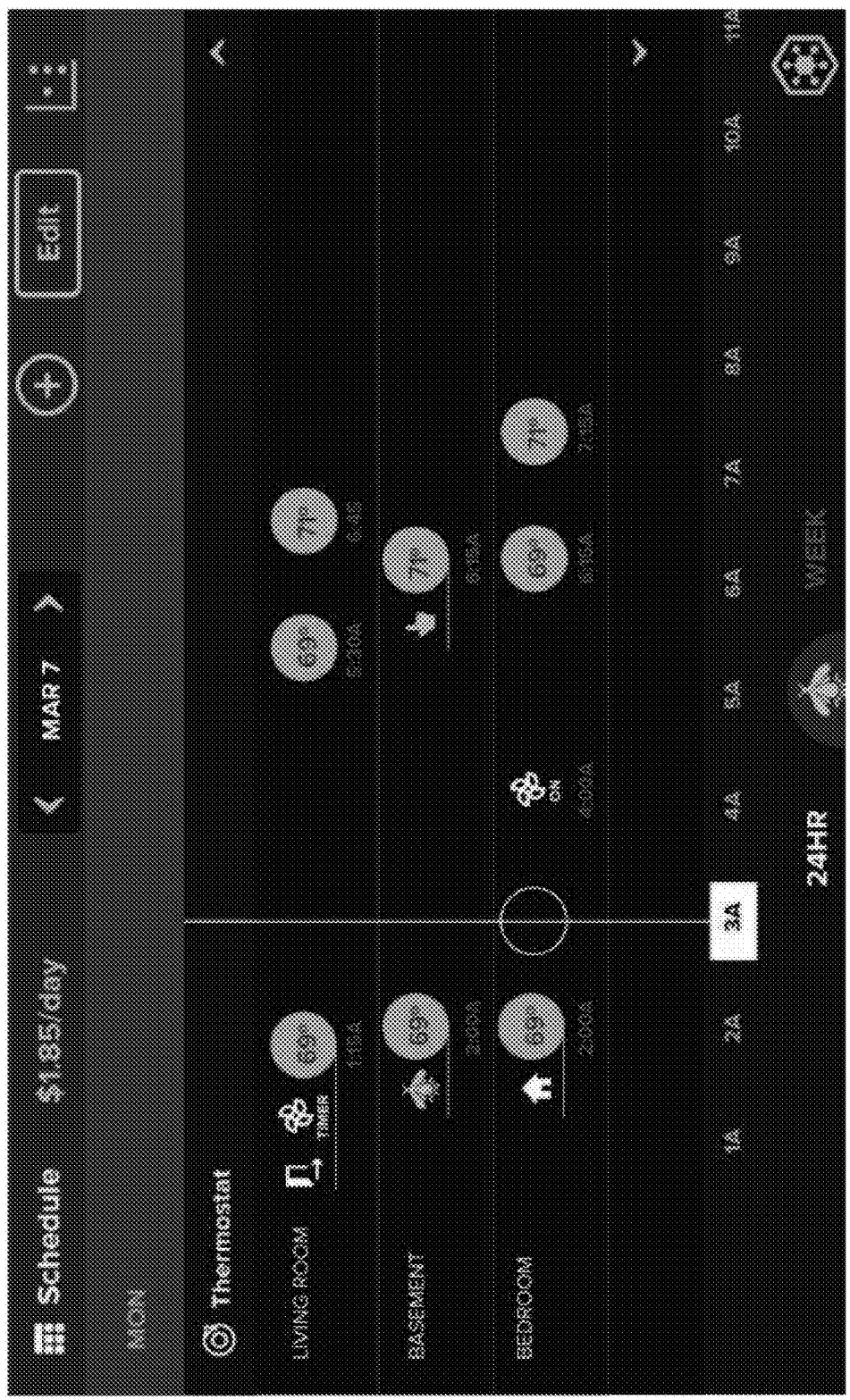
Figure 47:
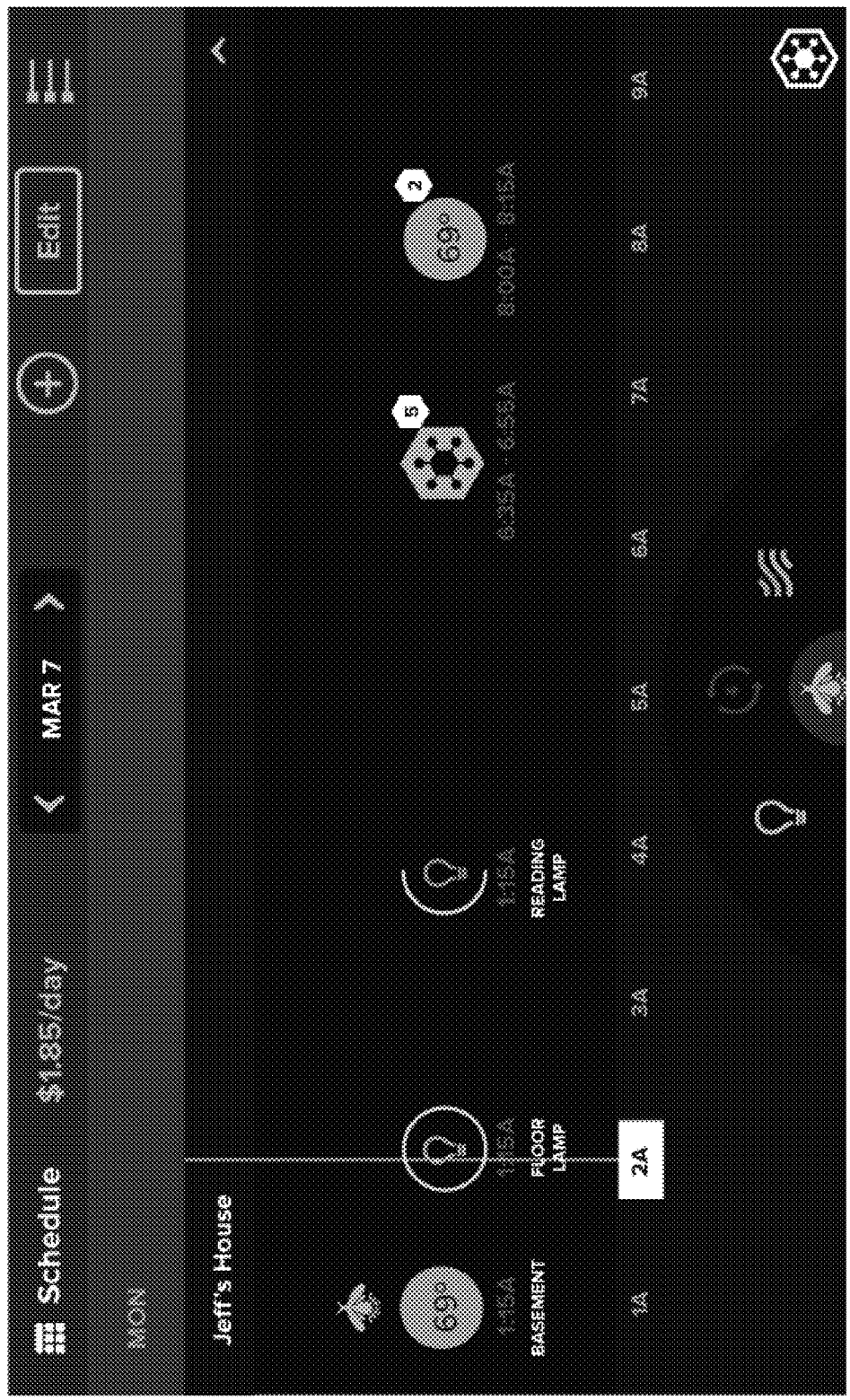
Figure 48:
Figure 49:
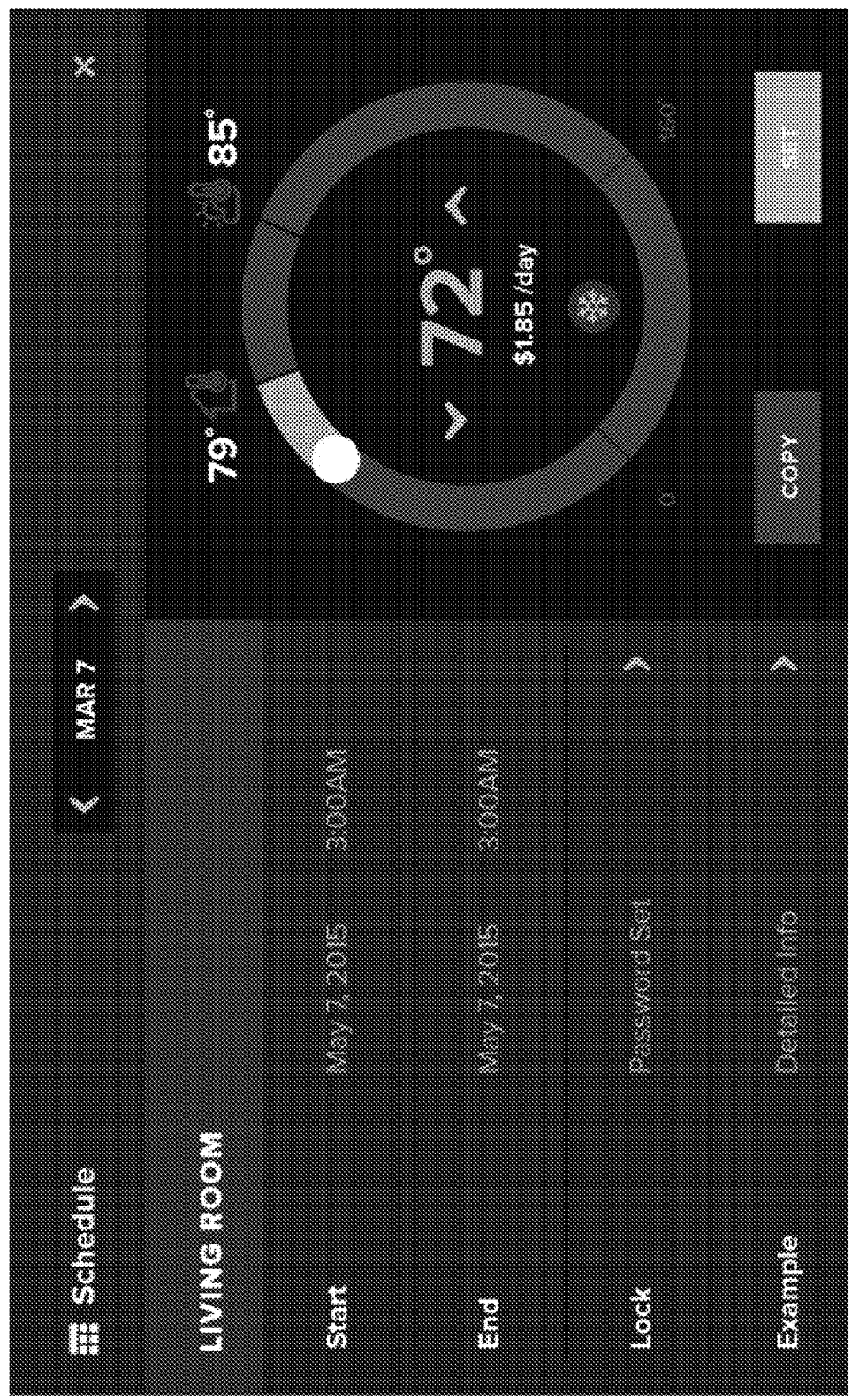
Figure 50:
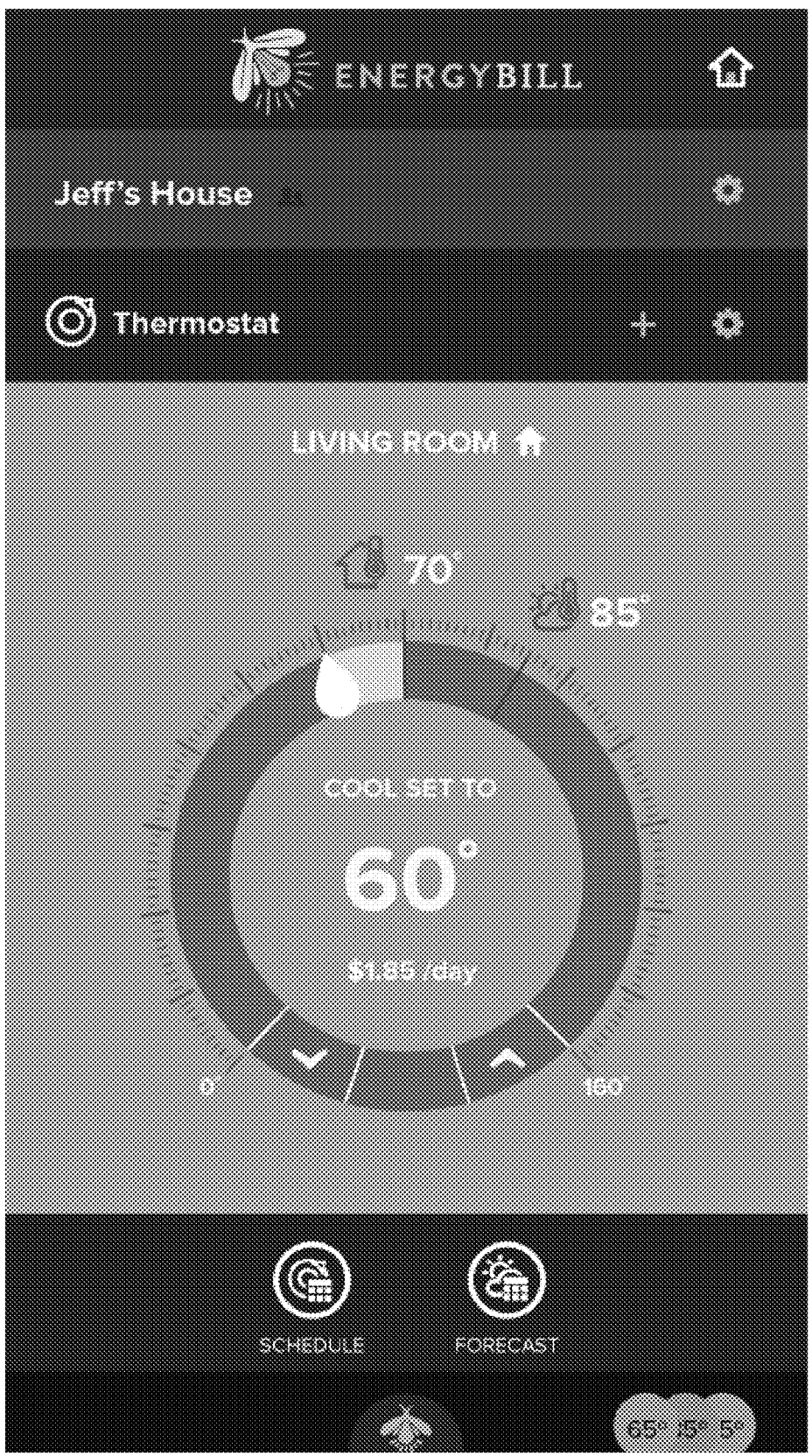
Figure 51:
Figure 52:
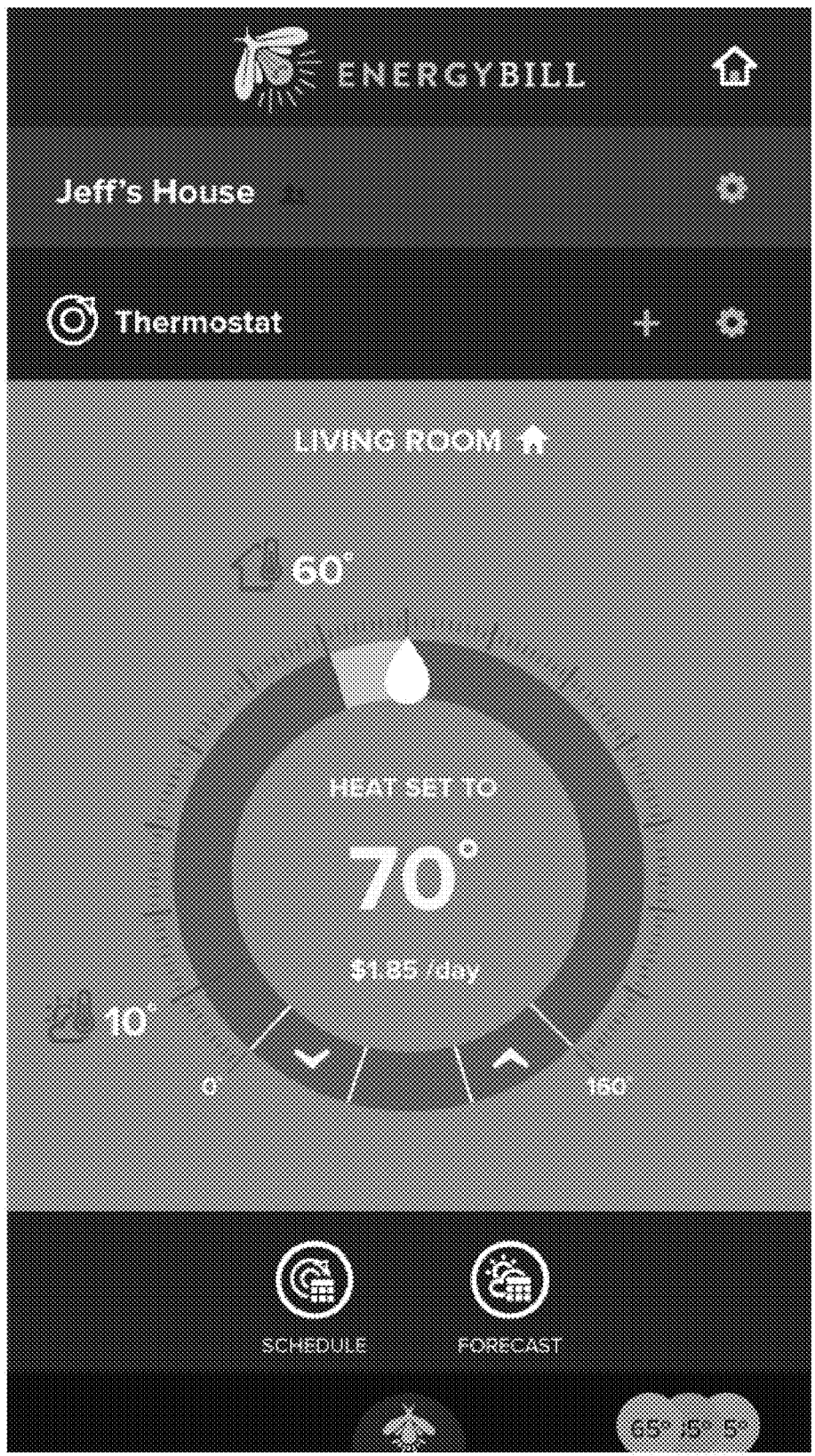
Figure 53:
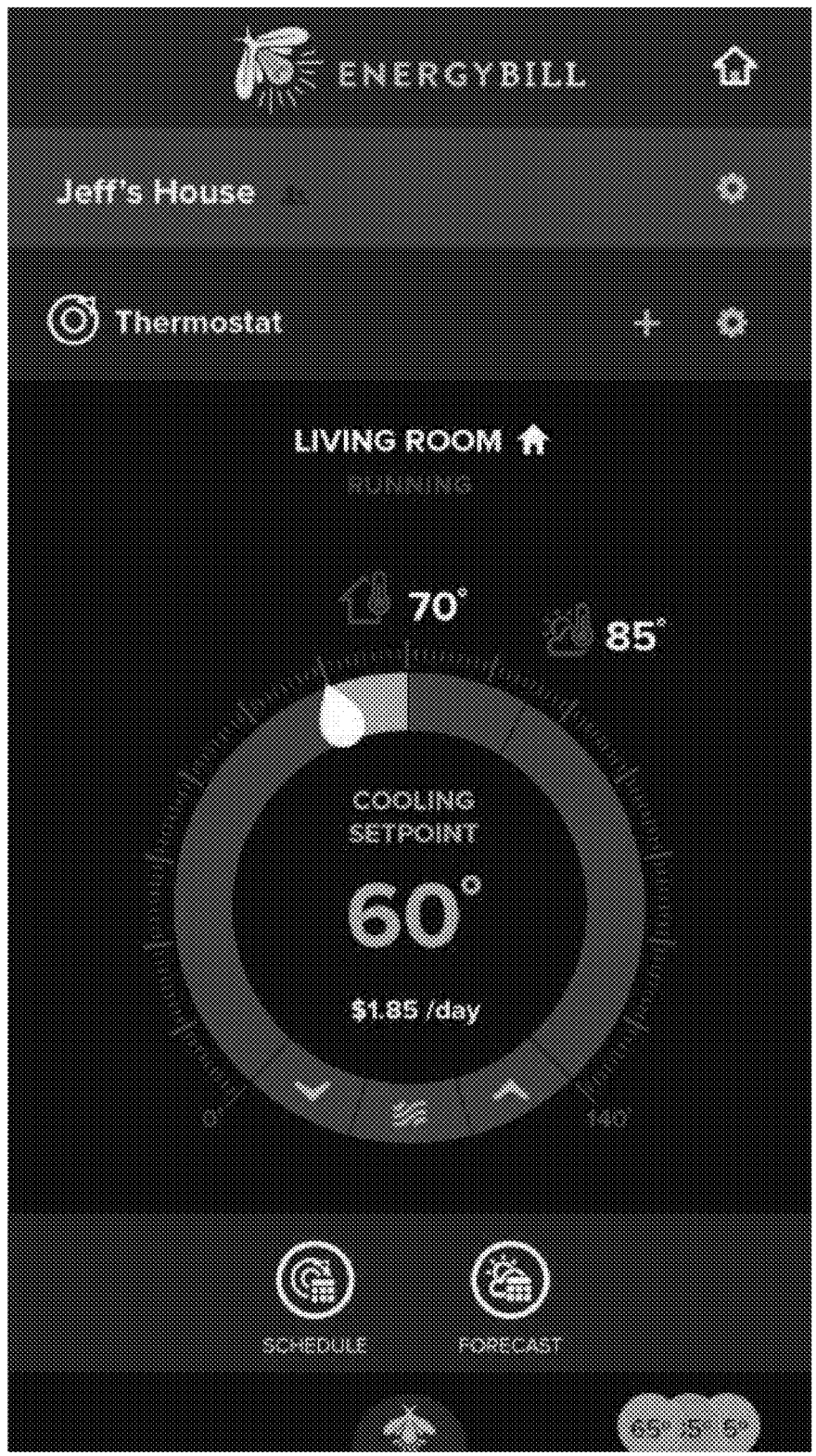
Figure 54:
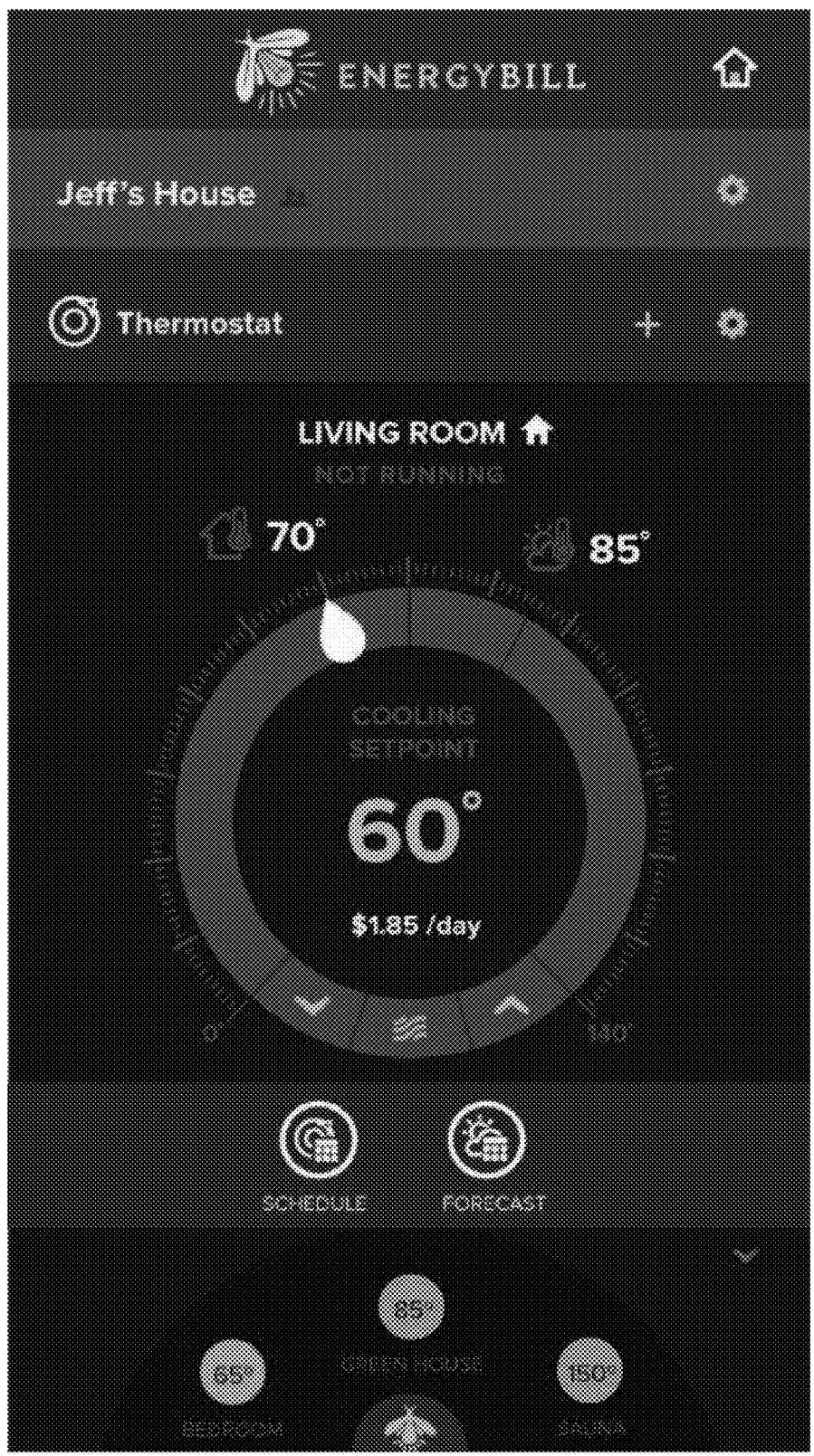
Figure 55:
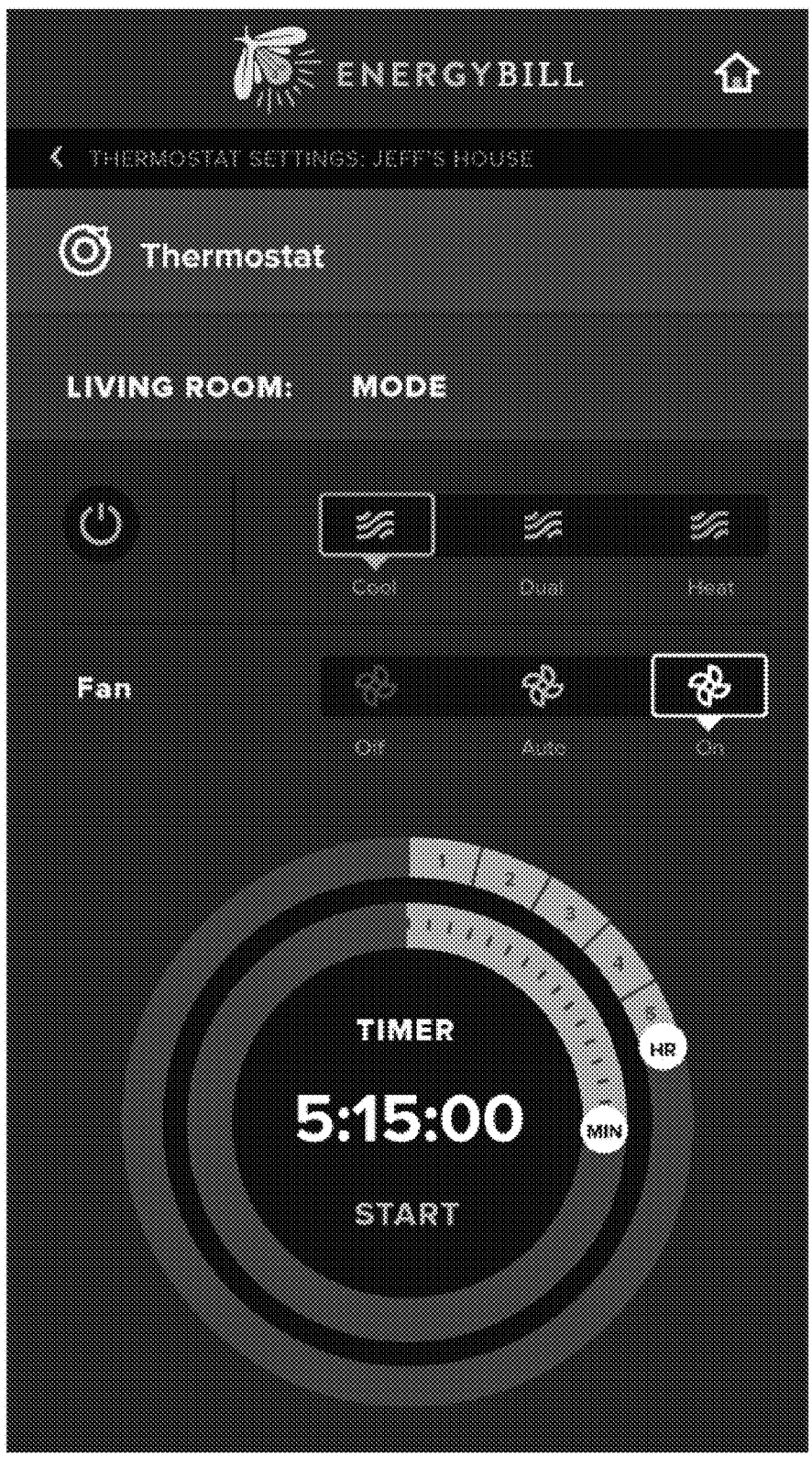
Figure 56:
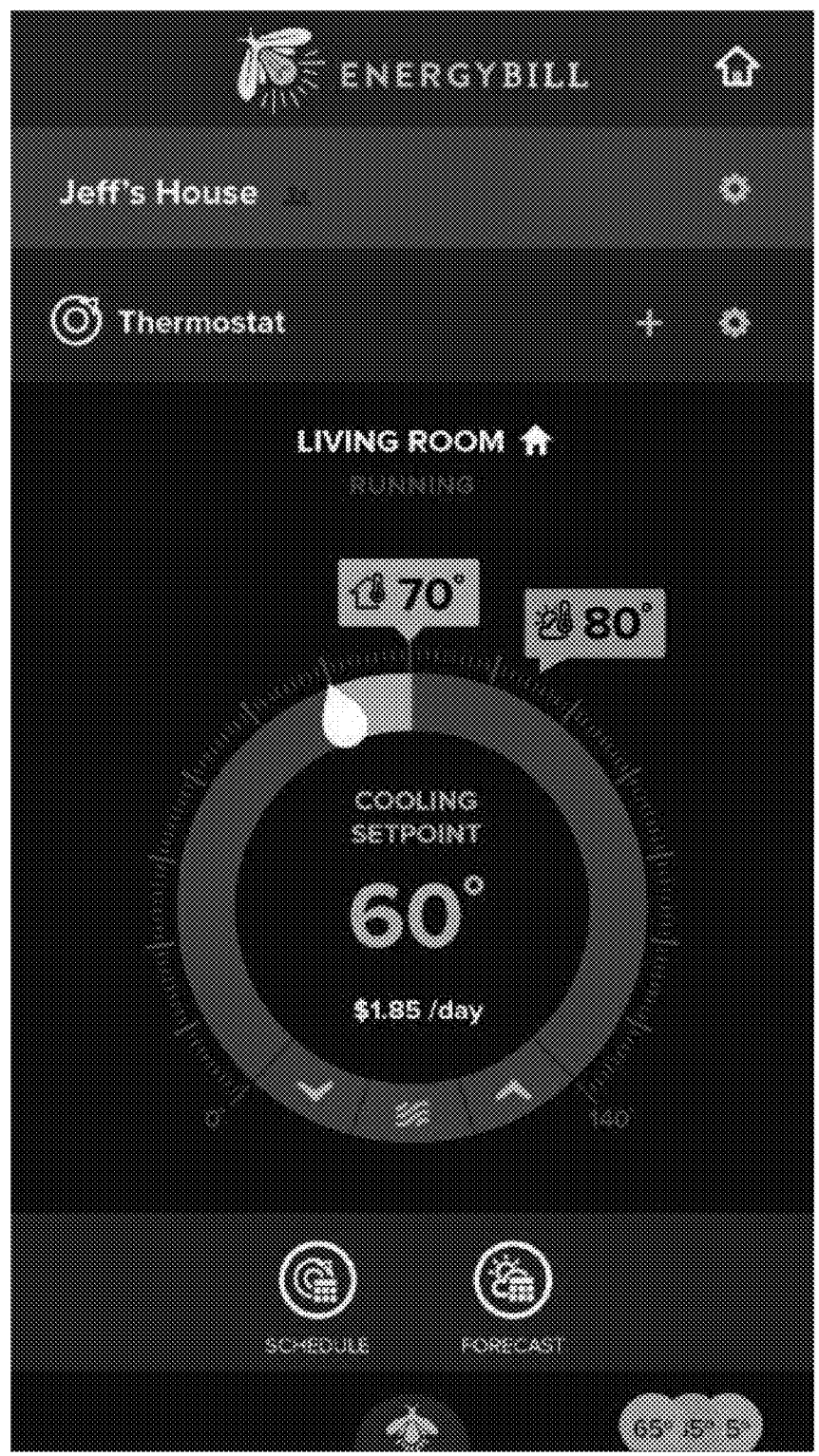
Figure 57:
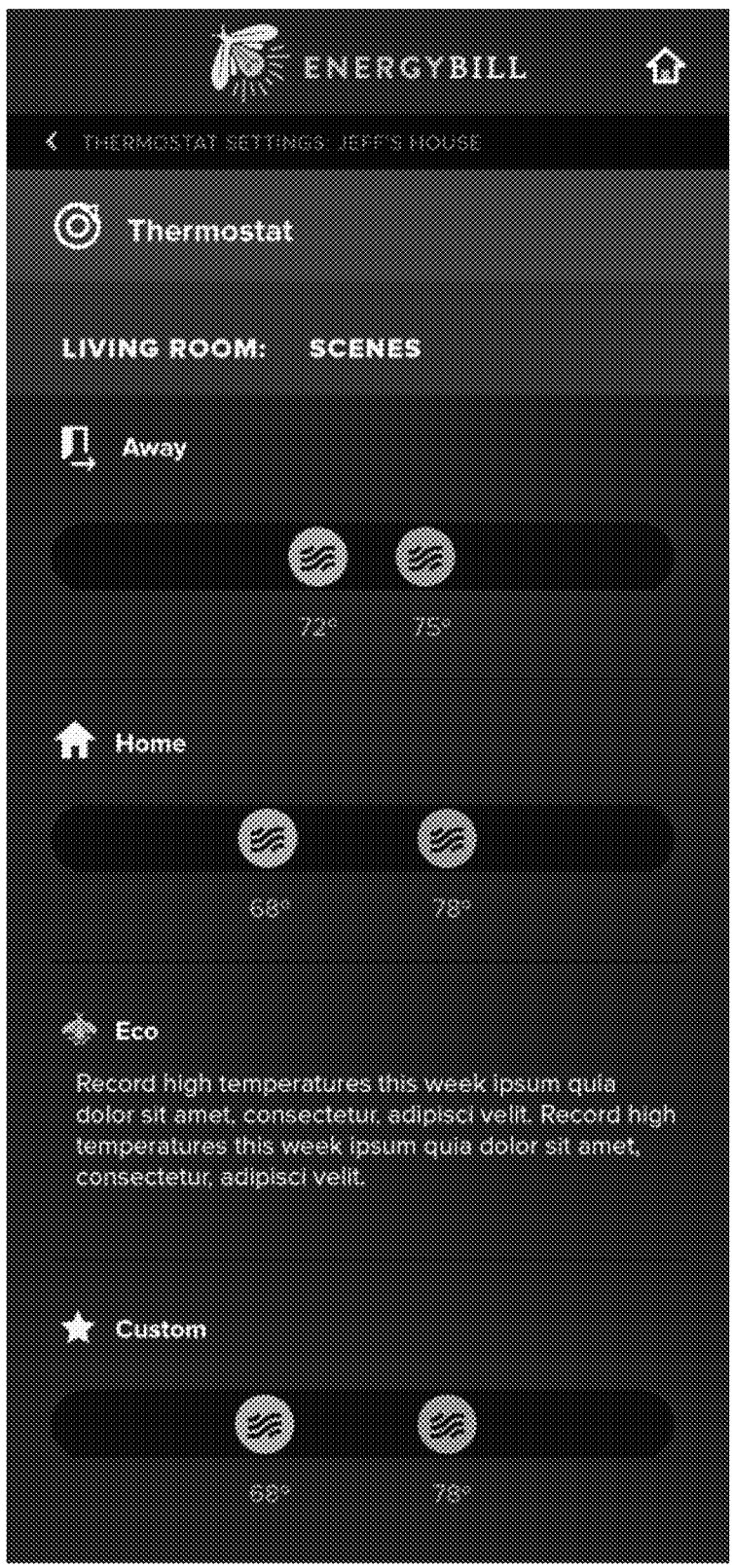
Figure 58:
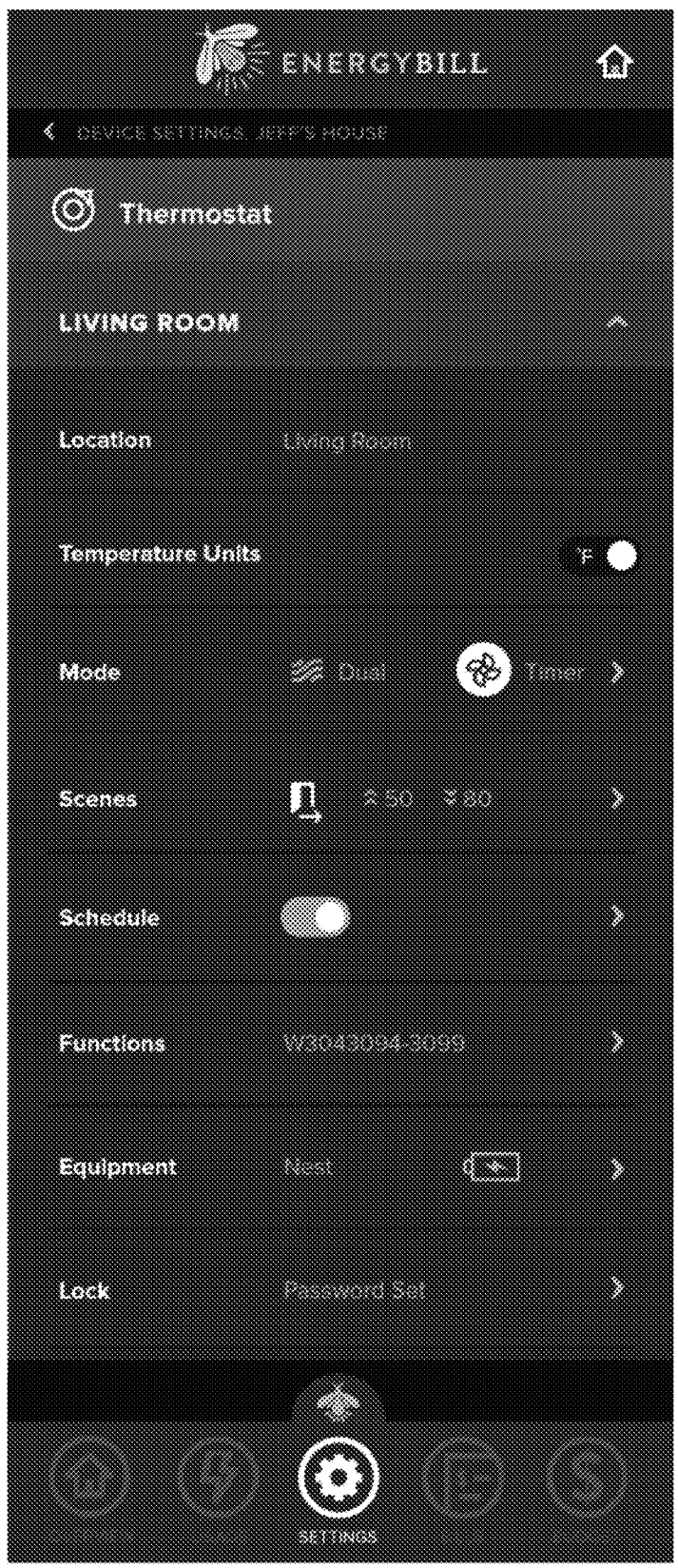

Referring to FIG. 35, in an embodiment, a method 1000 may include analyzing a decision model, such as a decision graph, to identify a best decision path and at least one best initial or short-term decision consistent with the identified best decision path. As shown in FIG. 35, it will be understood that analyzing may be achieved by processing a decision model with a suitable combinatorial optimization decision processing algorithm such as, for example, a single-shortest path (SSP) or kshortest path algorithm (KSP). Due to the large decision space, such decision processing algorithms may be engineered to run both parallel in high performance computing (HPC) environments such as CUDA by Nvidia, as well as distributed in a cloud of interconnected servers. Additionally, the effect of the decision graph will vary depending on the consumer's usage profile. In terms of options the decision graph will be the same for all consumers, based solely on the market, however the value or cost of each arc within the graph will vary from consumer to consumer. It will be understood that a system may include a decision module that may generate a final graph that is weighted unique to each consumer. This final graph may then be searched for the topK paths in the graph, which are further processed to yield a final prediction of a single best path. This is a best path that takes into account the usage profile of the user, utility rate structure, monthly bill and budget, smart appliance schedule and setting preferences, as well as other influencing factors like weather and a dynamic energy market. Ultimately the decision may include a comparison between a present-day and future-day state, for which can then be determined the shortterm decision that should be made for the user, among the available options. Choices may include, for example, an initial or short-term decision of entering a new (different) contract, renewing an existing contract, allowing a contract to expire, or shutting off service.

Figure 33:
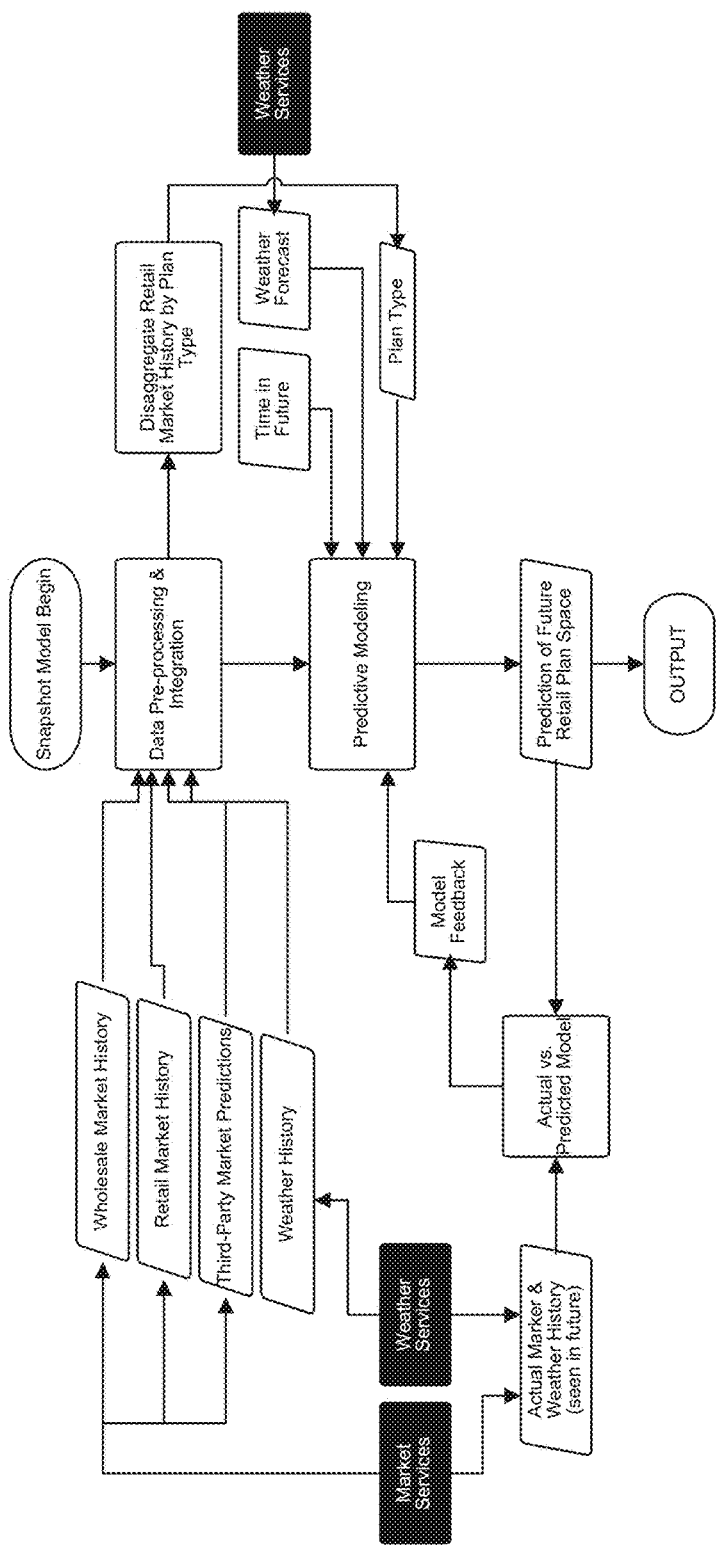
FIG. 33 depicts an exemplary snapshot process as employed by embodiments of the present disclosure.
Figure 34:
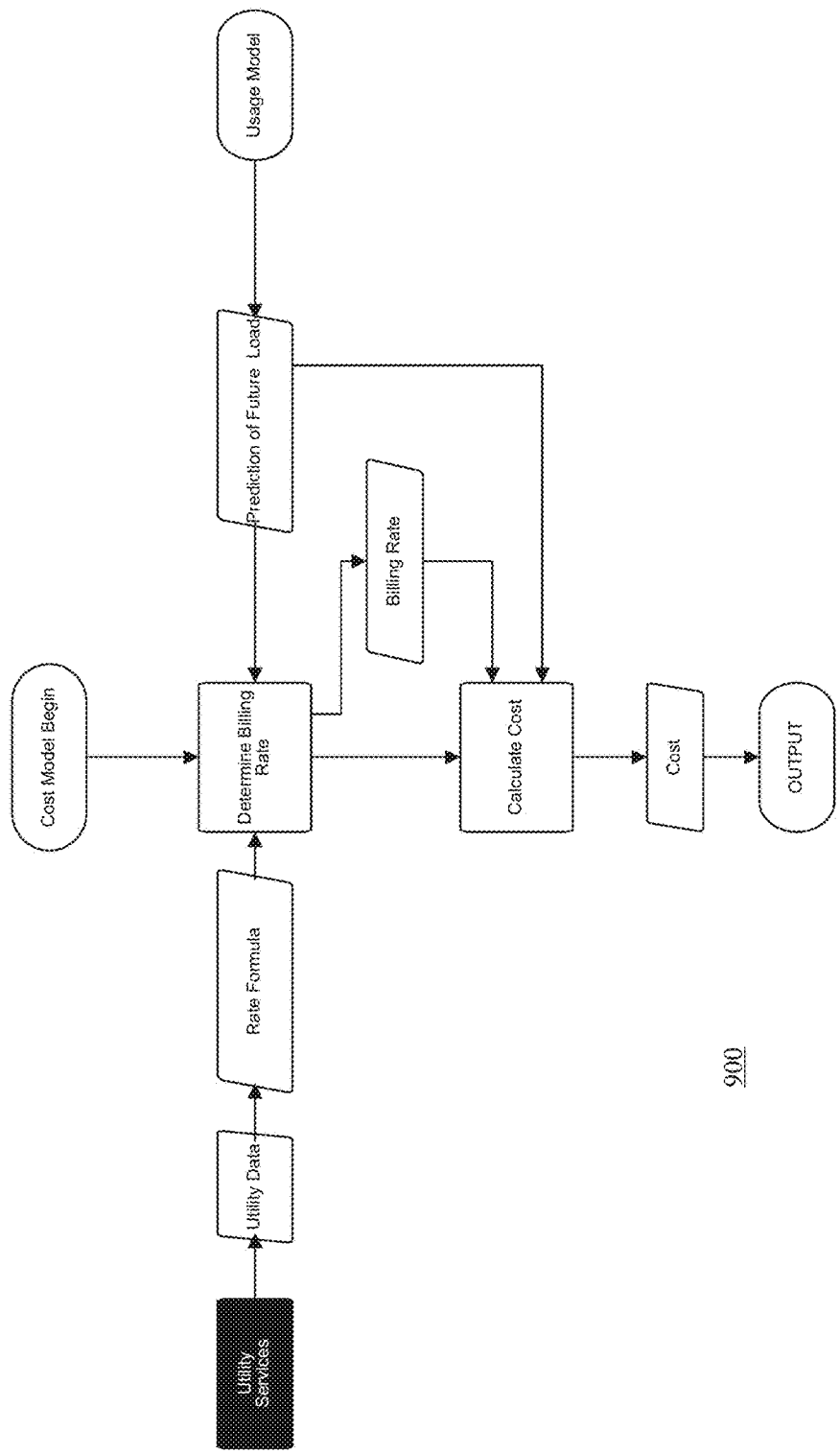
FIG. 34 depicts an exemplary cost process as employed by embodiments of the present disclosure.

Referring to FIGS. 33 and 34, in an embodiment, a method 800 may include repeatedly updating and re-determining or reconstructing a decision model. It will be understood that such reconstructing may be continuous or substantially continuous. Method 800 may include reevaluating the environment, tracking the current energy market, predicting future energy market, tracking the consumers usage patterns, smart appliance settings and schedule, weather etc. and putting all this data into a system model which behaves as a kind of artificial intelligence. As the data in the model changes, it will be reconstructed, adjusting the decision graph, and find a new best path to compare the present state. If a best path has been detected which has a better value or cost than the current one in place, a decision will be executed on behalf of the user.

Referring to FIG. 27, in embodiments, a method may include controlling a smart appliance according to a budget. It will be understood that such controlling may be similar to selecting a contract as elsewhere described herein. A decision model or decision graph may be generated, based on relevant criteria. The time scale for controlling a smart appliance may be in minutes or seconds, and a timebounded decision may include, for example, running a smart appliance for some operation cycle or a combination of operation cycles. Like a deregulated contract, this arc in the network will have a cost associated with it. By traversing the potential control choices for the appliance (like a thermostat), in an embodiments budgetary goals and environmental preferences and constraints may be maximized or facilitated by following a particular control path for the smart appliance. The decision/control module includes aspects of both decision identification for contract selection and control of smart appliances.

It will be understood that, in embodiments, a smart appliance may run irrespective of the user monitoring events, and may self report. Third party events, such as weather change, may cause changes, and analytics may be performed. Analytics modules may include, for example and in part, Usage Module, Cost Module, and Decision/Control Module. It will be understood that when analytics are performed, each time they are updated, a simple model is generated and is provided to the smart appliance. In an embodiment, final cost may be reported by model running locally on a smart appliance. This may prevent the smart appliance from having to constantly go back and forth to the server. Data exchanges may occur only when necessary, or according to schedule, and may allow cost to be reported instantaneously to the user without the delay of waiting on analytics to calculate. In an embodiment, accordingly, cost may be precalculated. So locally on the smart appliance a relatively simple model, like a simple formula, may be processed with basic variables such as device settings (wash cycle or whatever) to provide cost. In an embodiment, cost might be reported in various ways such as, cost for a single cycle or aggregate cost for a day for maintaining a particular temperature setpoint. Depending on the type of smart appliance, cost may be reported in a variety of ways for meaningfulness.

In an embodiment, a runtime model may include a formula, an automated rate sheet or menu updated menu wherein prices change. A smart appliance may utilize or may be controlled according to such a runtime model, which is executed locally on the device/appliance, to present a cost to the user. Such a model may be produced from all the complex analytics that may result in a formula which may be performed on the smart appliance. From time to time, as events happen (weather, market, other appliance in the home, new usage data from the smart meter, etc., and whatever), the backend system will detect some new information that warrants we rerun our various analytics models, Usage, Cost, and so on. After this happens, a new runtime model would be generated, and then that would get pushed down to the appliance if/when data connectivity is available. IoT devices often have spotty connections, and they likely sit behind routers and firewalls. So rather than the server pushing down to the appliance, in an embodiment, a smart appliance may periodically checks for a new runtime model. In an embodiment, a smart appliance may pushes update up to the server for runtime history. But, this may be performed separately, or alone, or on periodically such as hourly.

In an embodiment, a smart appliance may interact with other 3rd party devices while offline. For example, in an embodiment, a smart appliance may interact with other smart appliances or devices for improving reporting accuracy, such as while offline or between updating of runtime models from the server. Thi may occur, for example, where highly unpredictable consumer usage or weather patterns are presented or encountered, or where internet communications are down so as to prevent updating of the runtime model and system for a long period. and the system couldn't update.

In addition to the foregoing solutions, an embodiment may also offer the following functionalities:

An embodiment in contrast to providing a cost for running an appliance, may provide an incentive for not using the appliance, not using energy, or supplying energy back to the grid by the appliance. An embodiment may employ a combination of cost and incentives. Incentives may include for example: cash rebates.

An embodiment may facilitate a social network for energy consumers, allowing energy consumers to compare themselves with others in their area and connect online. Users may be able to share their energy consumption stats, as well as savings stats when changes in usage patterns are detected to create a "crowd-saving" effect. Users may then connect with each other to share and discuss what they did to save energy and reduce their bills, offer or ask for advice, etc. An embodiment may also embed into and interface with existing social networking sites like FACEBOOK and GOOGLE+.

An embodiment may be a cloud-based software system for performing whole-building residential and commercial energy audits using mobile devices. This software is based on an existing desktop software technology that was widely used by and sold to utility companies and regarded as superior to and a replacement for the Department of Energy's DOE-2 simulations, as used in the past. The improved system offered may allow residential consumers to manually or automatically self-perform energy audits of their home with ease using their user terminals and mobile devices.

An embodiment may serve as a kind of ANGIE'S LIST for energy-related service providers with some additional caveats that are patent-pending. An embodiment may allow providers to be listed by area and reviewed by users. If energy saving services are provided, such as HVAC replacement, additional insulation, installation of DER or appliance upgrades, an embodiment may track the before/after energy consumption for this user based on the date of service and use this data to additionally rate the service for its measured effectiveness. An internal rating system may be applied based on the effect of the service to the consumer's energy bill. Highly effective services may be given priority ranking in the system and recommended to other users.

In conjunction with all other services provided, various informational areas may be maintained to aggregate and offer energy education to the public ranging from general to advanced-level. Educational programs may also be offered to increase public awareness and promote the services to the general public and through public schools.

Energy product choices vary by geographic location and time. At any given point in time, day-to-day, month-to-month, the number of options may change, and this is usually counted in the dozens to hundreds for a consumer. As of now, just in the Texas electrical power market there are over 1,500 different product choices. A consumer who resides in zip code 77486 has access to about 200 of those.

The best, lowest-cost, choice is not a simple matter but requires time-varying analysis which takes into account the consumer's usage patterns, market predictions, and the impact of present-day choices on future-day choice options. This can be thought of as a kind of "butterfly effect," where the small variance in initial conditions may have a dramatic effect on the outcome further down the timeline. In order to make the best choice today, the long-term impact of each choice must be considered. What seems like a good choice today may be a very bad choice in the long-run.

For instance, a user today may have the option of signing up for a month-to-month, 3 month, 6 month, 12 month, 24 month, or 36 month energy contract. And the rate ($/kWh) for each varies by usage patterns month-to-month (as described previous). Based on usage patterns alone it may be more cost effective for a consumer to alternate between various short-term contracts. This is complicated even further however by the impact of present-day choice on future choice options.

If a user were to sign a long-term contract in the summer this is very likely a bad choice. While the contract being chosen may seem like the best rate today, the rate is likely very high because it's during peak-load market conditions. Rather than choosing the long-term contract now, it may be more cost-effective long-term to choose a shorter term contract now, which may have a higher rate, and then plan on choosing a longer-term plan next month or a few months later after electrical load on the grid eases and market prices drop. Long-term choices may also bring early termination fees and other considerations which impact future options.

Determining the best choice requires modeling a series of choices back to back. For instance, if the consumer goes month-to-month, what may their product choices be one month from now when that one month term expires? Depending on the depth of projection (e.g., one month vs. thirty-six months in the future) models may use a mix of actual versus predicted data.

For reasons of cost and in-house technical ability, utilities companies and city and state governments have been unable to provide advanced technology services to energy consumers. Minimum services are provided for things such as account management, energy management or budgeting, Distributed Energy Resource (DER) management and utility and bill payment, which are sometimes unreliable and usually lacking in advanced features that would be useful to consumers for energy management. Utility companies in regulated markets know that customers have no choice in their provider, so they have little incentive to improve the array of services customers have access to. Even in deregulated markets, it is not necessarily in the monetary interest of the utility companies to help customers save energy, resources and money. There is little direct-cost benefit for the utility companies to invest in energy savings programs other than what is required by governing entities. Embodiments of the disclosure provide unique hardware and software products that may fill this gap in the market and empower consumers to capitalize on real-time or future energy consumption decisions or opportunities.

Deregulated utility market consumers are left to their own devices to determine which energy contract to choose among a pool, which may include potentially hundreds of different contracts offered by a growing multitude of different providers, varying by the particular market. The decision of which contract to choose, whether they should renew or extend, or switch contracts or providers, and when, is very difficult. The variable factors that go into optimizing their rate plan opportunities is comparable with trading stocks on the stock market, requiring an advanced understanding of the energy market and the energy consumption characteristics of the residence.

Embodiments of the present disclosure provide a solution including an automated professional evaluation of available energy rate plans and renewal of deregulated energy products to save users money by maintaining energy bills below the average for their respective markets. Embodiments may automatically trend and evaluates the energy market, matches energy consumers with the best provider and available rate plan based on the characteristics of their residence, their personal usage profile and market history and projections, and then sign consumers up, execute contracts, and facilitate account management. The savings may be measured by monitoring the energy usage characteristics of the user's residence and retail price paid per energy unit versus the average retail price paid for that energy product in that market (a trailing twelve month, TTM). The TTM data and retail/wholesale market projections is compiled from various national data sources (e.g., Energy Information Administration (EIA), Federal Energy Regulatory Commission (FERC), Department of Energy (DOE), etc.) and real-time energy pricing from regional energy authorities (i.e., Texas Electric, ERCOT, and the like).

An embodiment may utilize historical meter data a model or profile of a consumer's usage pattern of the resource. An embodiment may utilize this data along with TTM data and other predictive indicators to determine the most informed decision on behalf of users for rate plan optimization, so as to maintain below-average energy bills when compared to average/mean/median users in their market.

As another problem in the current marketplace, customers are burdened with having to learn how to use a new web site every time they change energy providers, which may be quite frequently, often several times per year in deregulated markets. They may also have to maintain multiple accounts at once, such as for water, electricity, and gas utilities. An embodiment may provide one account to manage all utility bills. Users may have a single sign in (SSO) account that they may log into in order to manage electric, natural gas, water contracts, bills, payments and history. Users may access and manage all of their accounts through one central service. Historical account data may be preserved even as providers change, archiving all data indefinitely and making it accessible to appropriate users. While this service is primary targeted for deregulated markets where service changes are more frequent, it may also be available to regulated and mixed markets. Multiple users may also be able to access a shared account, such a multiple people in a single household or residence. Shared account access may empower other stakeholders in a shared accountability and/or energy monitoring role.

Another problem in some deregulated energy markets occurs when users switch providers, wherein access to all historical usage information is typically lost to the user after the change. This also occurs in regulated markets when customers move and change residences. Also in both deregulated and regulated markets, the level of data users are provided access varies by the specific utility, but is typically lacking in comparison to the level of historical analysis. An embodiment may include long-term archiving of historical billing (monthly costs), users actual retail price per energy unit (by month and year), historical average retail prices paid in the market and monthly savings (comparison of price paid versus average retail market price). This service may also be available to regulated customers whose providers may not offer such a service, and who also may want to maintain historical data between residences after moving or want to benchmark long term energy efficiency changes at their residence.

There is currently no way to aggregate usage data across multiple providers in deregulated markets. As users change providers, access to historical data is lost, and data cannot be trended across multiple providers. Also, even in regulated markets, historical data is often archived for only limited periods of time, and a user's ability to access that data is highly limited and usually not particularly useful to the customer. An embodiment, may gather historical monthly energy usage from past and present monthly bills, which may be archived and continuously compared for both deregulated and regulated users. This information can be used to identify usage trends and create monthly and annual usage profiles, which may aid in deregulated contract decisions, usage and cost projects, and also energy audits for savings analysis. Advanced tools may be provided which allow consumers to view and analyze their usage trends, viewing data in graph and spreadsheet form, and perform relevant math functions such as estimate future bills based on historical trends.

According to the US Energy Information Administration (EIA), in 2012, five hundred and thirty-three electric utilities had over forty-three million advanced "smart" metering infrastructure (AMI) installations. Smart meters allow usage data to be accessed remotely and upon request by the utility owning them. As another problem in the current marketplace, though, many customers have smart meters that are installed at a residence to monitor usage of a resource, but most users either do not have access to smart meter data or don't know how to access it. The information gap to gain access to it is too large for most people, or the data isn't available in a format that is friendly or useful to the consumer. Even in those rare instances where smart meter data is accessible by users, its usefulness is limited to the experience of the person accessing it. Average consumers do not typically understand the meanings of kilowatt-hours and are thus unable to understand and make use of the smart meter data.

An embodiment may aggregate data at regular intervals and log it with the user's account. Smart meter data is retrieved at the meter's available capacity, such as fifteen-minute intervals, thereby allowing quarter-hour, hourly, daily, weekly, and monthly profiles to be created. Such detailed usage profiles may aid in creating models to be used in deregulated contract decisions and facilitate off-peak billing options. These models also accommodate more advanced energy audits and personal energy analysis and education, allowing for analysis based on hourly and daily usage rather than just monthly. The data may instantly be pulled into web and mobile tools that allow customers to analyze it, using it to better understand their bill, energy usage characteristics, and how to save resources and money on their utility bill. An embodiment may employ tools to allow users to study the impact of specific loads in their home, such as contributed by an HVAC component or other appliance.

An embodiment may allow users to track their energy usage in real-time and project their end-of-month bill based on usage patterns. Users may be able to set budget limits and then be guided to tailor their consumption so that they don't exceed that budget. Smart devices, IoT and Distributed Energy Resources (DER) can also be interfaced with and automatically controlled to manage the budget for all utility bills and to maximize the overall benefit of the user.

Another problem in the current marketplace is that an increasingly large number of homes are equipped with "smart" thermostats and other home automation devices, but these devices are not typically well utilized and tend to just be expensive gadgets with excessive scheduling capabilities, offering capabilities that are ultimately unused. Smart thermostats, other smart devices (IoT), and Distributed Energy Resources (DER) need to be utilized in the context of overall energy bill management.

Responsive to this issue, an embodiment's software may remotely monitor and control smart thermostats such as NEST, ECOBEE, and HONEYWELL WIFI ST, as well as other home automation devices currently planned for the market. Comparable with smart meters, smart thermostat data may be polled at regular intervals and logged, allowing for historical trends. In areas where smart meter data is available this may be an especially powerful combination, allowing HVAC operational parameters and use patterns to be correlated with overall energy consumption. Consumers may then be able to set specific parameters limiting their total energy consumption, and an embodiment may be empowered to regulate HVAC use in order to maintain a specific energy bill. A consumer may for instance set a budget of $200 for their monthly bill, and an embodiment may then regulate the temperature in the home and schedule other appliance usage as necessary to not exceed this bill.

Another common problem in the current marketplace is that there is not currently any industry-wide standardization for home or building automation systems. In order to provide automation and control capabilities, device and appliance manufacturers are forced to venture into territory that they frankly have no expertise in. Companies with expertise in designing and manufacturing home appliances, like air conditioners and clothes washers, are typically not experts in software and the web, which is necessary for home automation networks. Because of this most appliances with home automation end up offering limited functionality in comparison to its potential. For home automation and control to be truly useful, it needs to be combined with resource/energy bill information, such as consumption data from smart meters, billing information from utilities, individual usage profiles, generation rates, transmission rates, weather forecasts, market forecasts, etc. A home automation device by itself is really just a gizmo, and only becomes powerful when it is employed within the context of total resource management.

Additionally, device makers are currently all acting independent of one another, and this creates a burden which is simply unfeasible. Makers end up reinventing the wheel with each device that they engineer, resulting in lower quality products and substantially increasing their own engineering costs, and ultimately, the costs to their consumers. From the consumer's perspective things get even worse. Each competitive device may have its own unique software system for controlling it. So users then have to keep track of differing software functionality and operation. Currently there is no way to centralize all home automation and resource management into one central software system.

To address these issues, an embodiment of the present disclosure may support all existing and future Home Area Network (HAN) or other Home Automation devices. Through use of the present disclosure, users may be able to register devices and control them through the system. Embodiments may serve as a "virtual" operating system that allows users to easily control all the smart devices in their home through one centralized system. These devices can then be used in the context of their whole energy bill and as a Distributed Energy Resource (DER).

An embodiment may also provide a marketplace to help promote third-party home automation and control devices. An embodiment may let users review devices and, in conjunction with their metering data, may measure the effectiveness of those devices and be able to rank them internally.

Presently, there is not currently any technology that allows consumers to separate loads and correlate this with billing data, allowing consumers to understand their usage patterns and ultimately the associated cost of use. Consumers are not empowered with the ability to understand the cost of energy use before they use it and only see the results of their energy consumption on the energy bill. The inability to monitor individual loads and associate a value makes it difficult for energy consumers to intelligently save money or effectively conserve energy for a maximum benefit for both the user and the energy market. Companies who are currently working on load disaggregation and other real-time metering devices lack standardization, access to utility and billing data, and the ability to perform energy analysis on metered data. There is a lot that can be done with metering data beyond simply identifying loads. By itself load disaggregation is not particularly useful to consumers, and the technology is inherently limited in its accuracy.

Load disaggregation is where electrical loads are disaggregated, or separated, individually on a particular circuit from a single measurement point. For example, a smart electric meter can monitor the power consumption for an entire house. An electrical load is anything that draws power, such as an air conditioner or dish washer, television, or cell phone charger. Through a variety of mathematical methods, discussed below, and depending on the resolution of the metering data, individual loads of various separate appliances within a residence can be readily identified. Similar methods of load disaggregation can be used for other types of resources such as gas usage and water usage.

By separating loads utilizing load disaggregation algorithms, an embodiment may then monitor and profile the power consumed by each appliance. For instance, an embodiment may tell the consumer what percentage of their overall energy bill is contributed by the HVAC versus the clothes washer. Consumers would be able to see exactly how much their clothes washer costs to run, to the penny, and not just over an extended period of time, but down to the cost of an individual cycle of clothes. Consumers may also see how much it costs every time they open the refrigerator door. This may empower consumers to make energy use decisions in advance, for example, whether it's worth it to wait to wash the dishes until the whole dishwasher is full rather than doing a half load, or whether it's worth it to set the temperature at 72 degrees in the middle of the summer instead of 74. The impact of such decisions may be presented to consumers in real time. Customers may be able to make informed decisions and choose what they are buying or selling in advance. Utility bills may be presented in receipt-style like a grocery bill, separating each electric load and the associated cost. Disaggregation of energy data may also allow for very advanced systems modeling, which would also be useful for troubleshooting or new appliance recommendations. For example, determining whether an HVAC is operating at decreased deficiency and should be serviced or replaced altogether, or whether there is a toilet continuously running water and needs to be repaired. Real-time energy data can be combined with our calculation engine for automated energy analysis. Based on the consumer's home usage profile, embodiments may automatically simulate their entire home and project how much they would save if they switched to a different model appliance and what the real projected payback period would be using real utility rates and energy use characteristics.

An embodiment may utilize Circuit Signal Acquisition Meter (SAM), which allows for load disaggregation. Circuit SAM was developed as an electronic device that energy consumers may self-install on their homes or commercial facilities, allowing them to identify and separate electronic loads. Circuit SAM is a non-intrusive, load-monitoring (NILM) device that is operated by using multi-dimensional signal processing to analyze the energy consumed by a home or facility. Loads are separated through harmonics on the power curve. Loads generate electrical signatures that can be identified through pattern recognition, i.e., power consumption fingerprints.

Although the best methodologies have been particularly described in the foregoing disclosure, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. A smart appliance for use by a user within a household, the smart appliance comprising:
   a mechanical component for transforming the state of an object from a first state to a second date by expending a resource;
   an actuator for initiating operation of the mechanical component;
   a display for information to the user;
   a wireless communication module for accomplishing bi-directional data communication over a data communication network with at least one of: a utility smart meter, a utility provider server and an energy management cloud-based server; and
   a logic component including a stored series of instructions enabling the smart appliance to:

receive an input of the actuator from the user;
responsive to the input, retrieve historical runtime data of the appliance;
responsive to the input, retrieve a current utility rate for the resource;
determine a projected monetary cost for the resource to be used by the smart appliance during a current runtime based on the historical runtime data of the appliance and the current utility rate for the resource;
present the projected monetary cost for the current runtime to the user on the display;
accessing a weather model for the household;
construct an appliance model of use of the resource by the appliance;
construct a household model of use of the resource by the household, the household model considering the appliance model and the weather model;
determine projected use of the resource by the household in a future runtime by reference to the household model with the weather model determined for the future runtime;
managing operation of the appliance in by reference to the following: actual use of the resource by the appliance determined in real-time, projected use of the resource by the appliance determined for the current runtime, and projected use of the resource by the appliance determined for the future runtime.

2. The smart appliance of claim 1, the logic component further enabling the smart appliance to:
determine a projected monetary cost for the resource to be used by the smart appliance during a future runtime based on the historical runtime data of the appliance and a future utility rate for the resource; and
present the projected monetary cost for the future runtime to the user on the display.

3. The smart appliance of claim 2, wherein the user may select a current or future runtime based on the display of the projected monetary cost for the current runtime and the projected monetary cost for the future runtime.

4. The smart appliance of claim 2, where at least one of the projected monetary cost during the current runtime and the projected monetary cost during the future runtime is further based on at least one of: a current weather condition, a future weather condition, a resource budget of the user, a projected occupancy status of the household, and a schedule of other appliances within the household that will be run.

5. The smart appliance of claim 1, wherein the historical data is retrieved by the wireless communication module from at least one of the smart meter, the utility server and the energy management server.

6. The smart appliance of claim 1, where in the current utility rate is retrieved by the wireless communication module from at least one of the smart meter, the utility server and the energy management server.

7. The smart appliance of claim 1, where in the historical runtime data is determined based on a load disaggregation algorithm applied to the resource usage by the smart appliance and other appliances within the household.

8. The smart appliance of claim 1, wherein the logic component comprises at least one of: an ASIC and an EEPROM.

9. The smart appliance of claim 1, wherein the logic component comprises a processor and a memory for storing processing instructions to be executed by the processor.

10. The smart appliance of claim 1, wherein the display comprises at least one of: a light-emitting device and an electronic ink display device.

11. A system for energy management, comprising:
a mechanical component for transforming the state of an object from a first state to a second state by expending a resource;
an actuator for initiating operation of the mechanical component;
a display for displaying information to the user;
a wireless communication module for accomplishing bi-directional data communication over a data communication network with at least one of: a utility smart meter, a utility provider server and an energy management cloud-based server; and
a logic component including a stored series of instructions enabling the smart appliance to:
receive an input of the actuator from the user;
responsive to the input, retrieve historical runtime data of the appliance;
responsive to the input, retrieve a current utility rate for the resource;
determine a projected monetary cost for resources to be used by the smart appliance during a current runtime based on the historical runtime data of the appliance and the current utility rate for the resource;
present the projected monetary cost for the current runtime to the user on the display;
access a weather model for the household;
construct an appliance model of use of the resource by the appliance;
construct a household model of use of the resource by the household, the household model considering the appliance model and the weather model;
determine projected use of the resource by the household in a future runtime by reference to the household model with the weather model determined for the future runtime;
manage operation of the appliance in by reference to the following: actual use of the resource by the appliance determined in real-time, projected use of the resource by the appliance determined for the current runtime, and projected use of the resource by the appliance determined for the future runtime.

* * * * *